US011553170B2

(12) United States Patent
Ogawa et al.

(10) Patent No.: US 11,553,170 B2
(45) Date of Patent: Jan. 10, 2023

(54) ELECTRONIC DEVICE AND CONTROL METHOD THEREOF

(71) Applicant: CANON KABUSHIKI KAISHA, Tokyo (JP)

(72) Inventors: Seiji Ogawa, Tokyo (JP); Shin Murakami, Kanagawa (JP); Takashi Yoshimi, Kanagawa (JP); Kiyoto Ueda, Kanagawa (JP); Genjiro Shibagami, Tokyo (JP); Kotaro Oguma, Saitama (JP); Koki Kitaya, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/355,783

(22) Filed: Jun. 23, 2021

(65) Prior Publication Data

US 2021/0321048 A1    Oct. 14, 2021

Related U.S. Application Data

(63) Continuation of application No. PCT/JP2019/050758, filed on Dec. 25, 2019.

(30) Foreign Application Priority Data

Dec. 28, 2018 (JP) .............................. JP2018-247842
Dec. 28, 2018 (JP) .............................. JP2018-247843

(Continued)

(51) Int. Cl.
*H04N 13/239*       (2018.01)
*H04N 13/167*       (2018.01)
(Continued)

(52) U.S. Cl.
CPC ........... *H04N 13/239* (2018.05); *G06T 19/00* (2013.01); *G06T 19/006* (2013.01);
(Continued)

(58) Field of Classification Search
CPC .. H04N 13/239; H04N 13/167; H04N 13/332; H04N 13/366; H04N 13/398;
(Continued)

(56) References Cited

U.S. PATENT DOCUMENTS

2006/0082643 A1*   4/2006  Richards .............. H04N 9/8205
                                                             348/E7.071
2010/0013950 A1*   1/2010  Kikuchi ................. H04N 5/772
                                                             348/E5.022

(Continued)

FOREIGN PATENT DOCUMENTS

CN           105393530 A        3/2016
CN           106774862 A        5/2017
(Continued)

OTHER PUBLICATIONS

The US Publication and foreign references 1 and 4-6 were cited in the International Search Report dated Mar. 10, 2020 of the corresponding International Application PCT/JP2019/050758, which is enclosed.

(Continued)

*Primary Examiner* — Thai Q Tran
*Assistant Examiner* — Jose M Mesa
(74) *Attorney, Agent, or Firm* — Cowan, Liebowitz & Latman, P.C.

(57) ABSTRACT

An electronic device according to the present invention includes: a processor; and a memory storing a program which, when executed by the processor, causes the electronic device to: perform control to change a display region of an image in accordance with an orientation change of the electronic device or in accordance with accepting a user operation and display the display region of the image on a screen; and determine a clipping region of the image to be clipped from the image based on a position of the display (Continued)

region of the image, wherein the image includes the display region and the clipping region and the clipping region is wider than the display region.

16 Claims, 18 Drawing Sheets

(30) Foreign Application Priority Data

| Dec. 28, 2018 | (JP) | JP2018-247844 |
|---|---|---|
| Dec. 28, 2018 | (JP) | JP2018-247845 |
| Dec. 28, 2018 | (JP) | JP2018-248311 |
| Dec. 28, 2018 | (JP) | JP2018-248329 |

(51) Int. Cl.

| *H04N 13/332* | (2018.01) |
|---|---|
| *H04N 13/366* | (2018.01) |
| *H04N 13/398* | (2018.01) |
| *H04N 5/77* | (2006.01) |
| *H04N 5/91* | (2006.01) |
| *G06T 19/00* | (2011.01) |
| *H04N 5/232* | (2006.01) |
| *H04N 5/262* | (2006.01) |

(52) U.S. Cl.
CPC ... *H04N 5/23238* (2013.01); *H04N 5/232945* (2018.08); *H04N 5/2628* (2013.01); *H04N 5/77* (2013.01); *H04N 5/91* (2013.01); *H04N 13/167* (2018.05); *H04N 13/332* (2018.05); *H04N 13/366* (2018.05); *H04N 13/398* (2018.05); *H04N 5/23293* (2013.01)

(58) Field of Classification Search
CPC ......... H04N 5/232945; H04N 5/23238; H04N 5/2628; H04N 5/77; H04N 5/91; H04N 5/23293; G06T 19/00; G06T 19/006
See application file for complete search history.

(56) References Cited

U.S. PATENT DOCUMENTS

| 2013/0083222 | A1* | 4/2013 | Matsuzawa | H04N 5/232935 |
| | | | | 348/222.1 |
| 2013/0342720 | A1* | 12/2013 | Azami | H04N 9/04 |
| | | | | 348/222.1 |
| 2014/0218469 | A1 | 8/2014 | Lee | |
| 2014/0267589 | A1* | 9/2014 | Matsubara | H04N 5/772 |
| | | | | 348/36 |
| 2015/0109401 | A1* | 4/2015 | Kasatani | H04N 5/23238 |
| | | | | 348/14.07 |
| 2015/0249813 | A1 | 9/2015 | Cole et al. | |
| 2018/0013957 | A1 | 1/2018 | Irie et al. | |
| 2018/0048885 | A1 | 2/2018 | Lee et al. | |
| 2018/0048886 | A1 | 2/2018 | Yoon et al. | |
| 2018/0053286 | A1 | 2/2018 | Tsubota et al. | |
| 2018/0152636 | A1 | 5/2018 | Yim et al. | |
| 2018/0253879 | A1 | 9/2018 | Li et al. | |

FOREIGN PATENT DOCUMENTS

| CN | 107621917 A | 1/2018 |
|---|---|---|
| CN | 108780228 A | 11/2018 |
| JP | 2005-223416 A | 8/2005 |
| JP | 2012-029180 A | 2/2012 |
| JP | 2013-127739 A | 6/2013 |
| JP | 2014-007653 A | 1/2014 |
| JP | 2016-019249 A | 2/2016 |
| JP | 2016-146098 A | 8/2016 |
| JP | 2018-180051 A | 11/2018 |
| KR | 2005-0091278 A | 9/2005 |
| WO | 2018/043135 A1 | 3/2018 |

OTHER PUBLICATIONS

The above documents were cited in a May 23, 2022 Chinese Office Action, which is enclosed with an English Translation, that issued in Chinese Patent Application No. 201980086832.0.
The above patent document was cited in the May 30, 2022 Indian Office Action, which is enclosed without an English Translation, that issued in Indian Patent Application No. 202147032522.
Research for Product VR Interaction Design Base on Mobile, Industrial Design, Aug. 20, 2018, pp. 147-149.
The above documents were cited in a Jan. 6, 2022 Chinese Office Action, which is enclosed with an English Translation, that issued in Chinese Patent Application No. 201911364896.0.
The above foreign patent documents were cited in the Sep. 15, 2022 Korean Office Action, which is enclosed without an English Translation, that issued in Korean Patent Application No. 10-2021-7021538.
The above documents were cited in a Partial Supplementary European Search Report dated Aug. 19, 2022, which is enclosed, that issued in the corresponding European Patent Application No. 19904849.7.

* cited by examiner

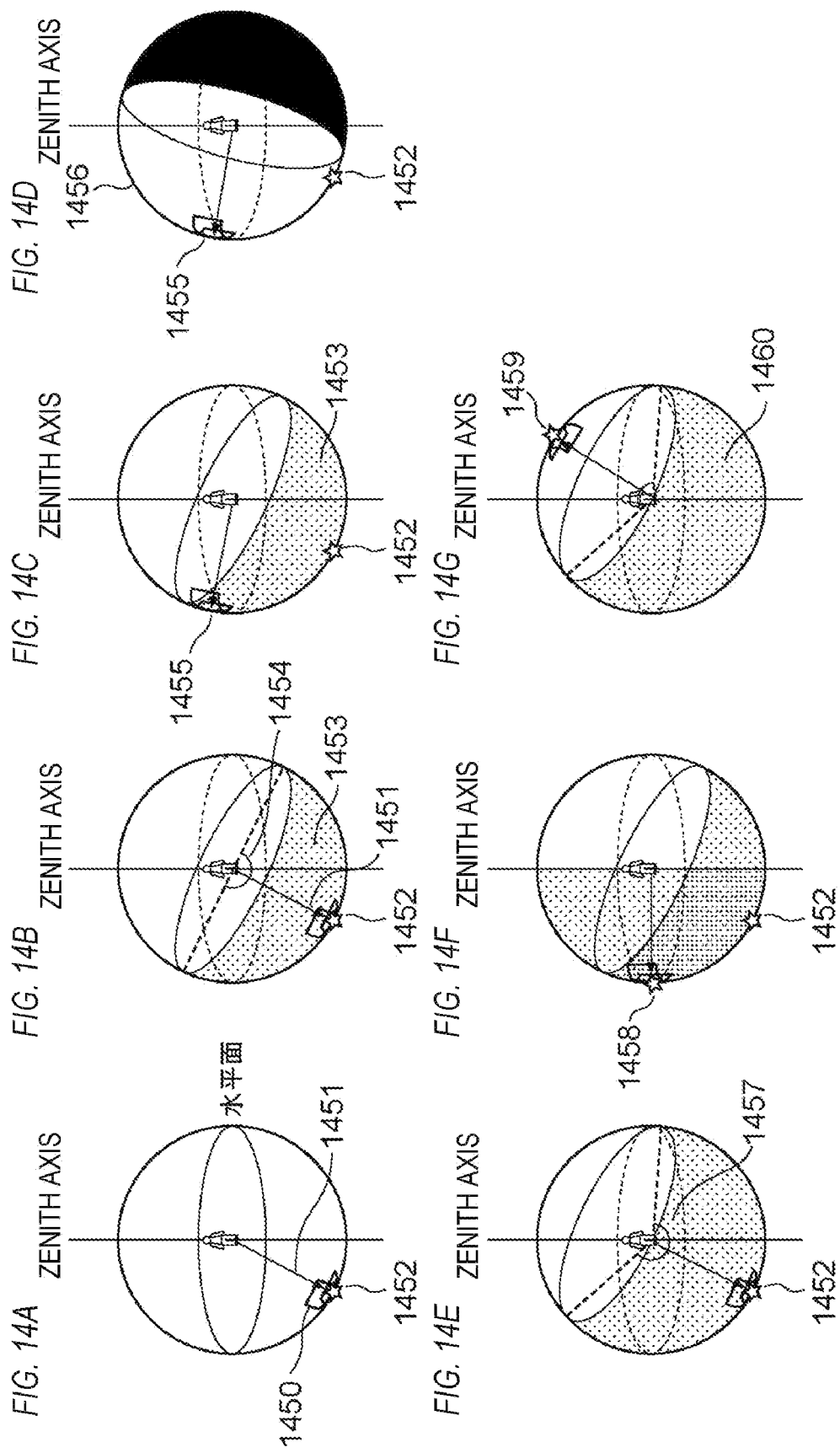

ELECTRONIC DEVICE AND CONTROL METHOD THEREOF

CROSS-REFERENCE TO RELATED APPLICATIONS

This application is a Continuation of International Patent Application No. PCT/JP2019/050758, filed Dec. 25, 2019, which claims the benefit of Japanese Patent Application No. 2018-248311 filed Dec. 28, 2018, Japanese Patent Application No. 2018-247844 filed Dec. 28, 2018, Japanese Patent Application No. 2018-247843 filed Dec. 28, 2018, Japanese Patent Application No. 2018-248329 filed Dec. 28, 2018, Japanese Patent Application No. 2018-247845 filed Dec. 28, 2018, and Japanese Patent Application No. 2018-247842 filed Dec. 28, 2018, which are hereby incorporated by reference herein in their entirety.

BACKGROUND OF THE INVENTION

Field of the Invention

The present invention relates to an electronic device, a control method of the electronic device, and a computer readable medium, and particularly to a control method for displaying an image having a wide viewing angle.

Background Art

In recent years, imaging apparatuses capable of photographing an image containing a video with a viewing angle that is wider than a human viewing angle such as an omnidirectional image or a fully celestial image are becoming popular. Methods are also known for performing display (a VR view) with a high sense of immersion or a high sense of realism by displaying a part of an image containing such a wide-view-angle video on a display and changing a region (a display region) of the video to be displayed on the display so as to follow a change in an orientation of an electronic device.

In photography of an omnidirectional image, an unnecessary object such as the photographer himself/herself often inadvertently appears in a photographed image. For this reason, providing a function that enables a user to display an image by clipping only a necessary portion or removing an unnecessary portion is useful for an electronic device capable of reproducing an omnidirectional image.

PTL 1 and PTL 2 disclose a technique in which a user designates an arbitrary position of an omnidirectional image and clips a region including the arbitrary position from the omnidirectional image.

Although PTL 1 and PTL 2 disclose a method of clipping an ordinary image, which is not a VR content, from an omnidirectional image (a VR content), no consideration is given for clipping a VR content with a narrower region from the omnidirectional image (a VR content). When clipping a VR content with a narrower region from a VR content, although a region of a video of the VR content after the clipping is narrower than prior to the clipping, the region is wider than a display region that is displayed at one time by a VR view at a normal magnification. Therefore, when performing an operation for clipping a VR content with a narrower region from a VR content, it is difficult to confirm which region of the VR content prior to the clipping is included in the region of a video of the VR content after the clipping. In addition, when clipping a VR content with a narrower region, if a center of the VR content after the clipping deviates upward or downward (an elevation/depression angle direction) from a horizontal direction, a view region of the VR content after the clipping includes a region that straddles a zenith or a nadir, resulting in a video including a region that is difficult to panoramically view.

CITATION LIST

Patent Literature

[PTL 1] Japanese Patent Application Laid-open No. 2013-127739
[PTL 2] Japanese Patent Application Laid-open No. 2012-29180

SUMMARY OF THE INVENTION

In consideration thereof, the present invention provides: (1) a technique that enables a VR content with a narrower region to be generated from a VR content with favorable operability; (2) a technique that enables, when generating a VR content with a narrower region from a VR content, a region of a video of the VR content after clipping to be more easily confirmed; or (3) a technique that enables a VR content with a narrower region to be more suitably generated from a VR content.

An electronic device according to the present invention includes: a processor; and a memory storing a program which, when executed by the processor, causes the electronic device to: perform control to change a display region of an image in accordance with an orientation change of the electronic device or in accordance with accepting a user operation and display the display region of the image on a screen; and determine a clipping region of the image to be clipped from the image based on a position of the display region of the image, wherein the image includes the display region and the clipping region and the clipping region is wider than the display region.

Further features of the present invention will become apparent from the following description of exemplary embodiments with reference to the attached drawings.

BRIEF DESCRIPTION OF THE DRAWINGS

FIG. 14A to 14G are schematic views showing an example of a flow up to setting a selection-disabled region;

DESCRIPTION OF THE EMBODIMENTS

Figure 1A:
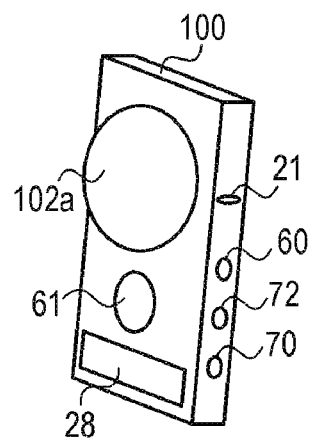
FIGS. 1A and 1B are external views of a digital camera.
Figure 1B:
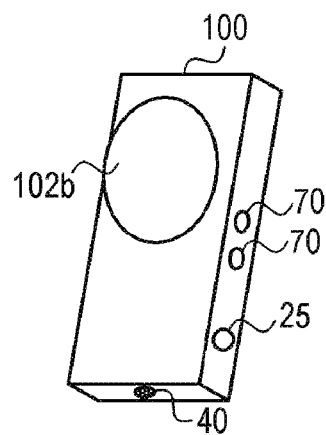

Hereinafter, a preferred embodiment of the present invention will be described with reference to the drawings. FIG. 1A is a front perspective view (an external view) of a digital camera 100 (an imaging apparatus). FIG. 1B is a rear perspective view (an external view) of the digital camera 100. The digital camera 100 is an omnidirectional camera (a fully celestial camera).

A barrier 102a is a protective window for a front camera portion having the front of the digital camera 100 as a photography angle. The front camera portion is a wide-angle camera portion having, for example, a wide angle of at least 180 vertical and horizontal angles on a front side of the digital camera 100 as a photography angle. A barrier 102b is a protective window for a rear camera portion having the rear of the digital camera 100 as a photography angle. The rear camera portion is a wide-angle camera portion having, for example, a wide angle of at least 180 vertical and horizontal angles on a rear side of the digital camera 100 as a photography angle.

A display unit 28 displays various types of information. A shutter button 61 is an operating unit (an operating member) for issuing a photography instruction. A mode changeover switch 60 is an operating unit for switching among various modes. A connecting I/F 25 is a connector for connecting a connecting cable to the digital camera 100 and, using the connecting cable, external devices such as a smartphone, a personal computer, a television set, and the like are connected to the digital camera 100. An operating unit 70 refers to various switches, buttons, dials, touch sensors, or the like for receiving various types of operations from a user. A power supply switch 72 is a push button for switching a power supply on and off.

A light-emitting unit 21 is a light-emitting member such as a light-emitting diode (LED) and notifies the user of various states of the digital camera 100 through light emission patterns, light emission colors, or the like. A fixing unit 40 is, for example, a tripod screw hole that is used to fix and install the digital camera 100 with a fixing tool such as a tripod.

Figure 1C:
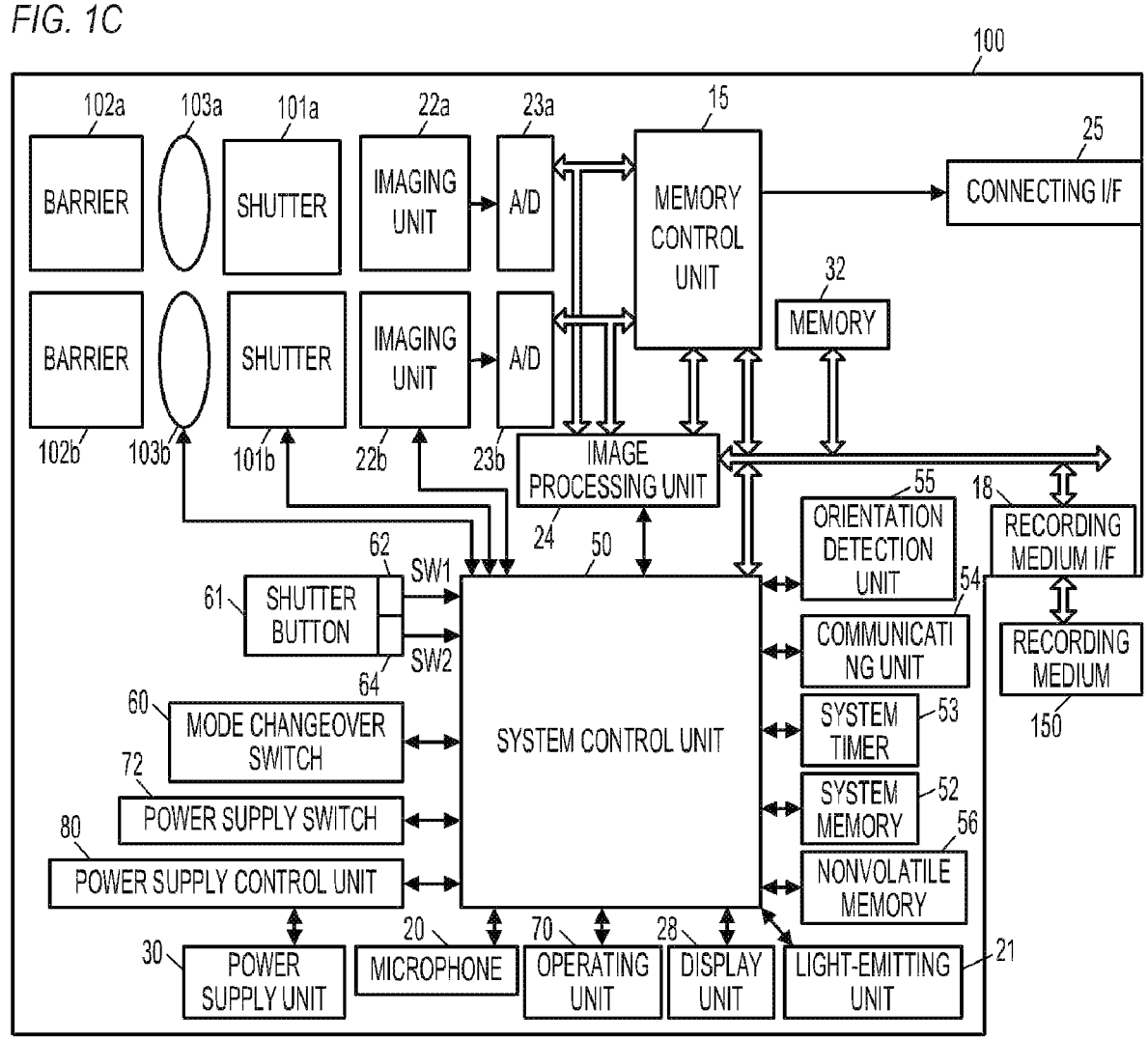
FIG. 1C is a block diagram of the digital camera.

FIG. 1C is a block diagram showing a configuration example of the digital camera 100.

The barrier 102a covers an imaging system (a photographic lens 103a, a shutter 101a, an imaging unit 22a, and the like) of the front camera portion to prevent the imaging system from being stained or damaged. The photographic lens 103a refers to a lens group including a zoom lens and a focusing lens and is a wide-angle lens. The shutter 101a is a shutter having a diaphragm function for adjusting an amount of incidence of object light into the imaging unit 22a. The imaging unit 22a is an imaging element (an image sensor) constituted by a device such as a CCD or a CMOS which converts an optical image into an electrical signal. An A/D converter 23a converts an analog signal output from the imaging unit 22a into a digital signal. Alternatively, an outside surface of the photographic lens 103a may be exposed and other parts of the imaging system (the shutter 101a and the imaging unit 22a) may be prevented from being stained or damaged by the photographic lens 103a without providing the barrier 102a.

The barrier 102b covers an imaging system (a photographic lens 103b, a shutter 101b, an imaging unit 22b, and the like) of the rear camera portion to prevent the imaging system from being stained or damaged. The photographic lens 103b refers to a lens group including a zoom lens and a focusing lens and is a wide-angle lens. The shutter 101b is a shutter having a diaphragm function for adjusting an amount of incidence of object light into the imaging unit 22b. The imaging unit 22b is an imaging element constituted by a device such as a CCD or a CMOS which converts an optical image into an electrical signal. An A/D converter 23b converts an analog signal output from the imaging unit 22b into a digital signal. Alternatively, an outside surface of the photographic lens 103b may be exposed and other parts of the imaging system (the shutter 101b and the imaging unit 22b) may be prevented from being stained or damaged by the photographic lens 103b without providing the barrier 102b.

A VR (Virtual Reality) image is picked up by the imaging unit 22a and the imaging unit 22b. A VR image is assumed to be an image of which VR display (display in a "VR view" display mode) can be performed. VR images are assumed to include an omnidirectional image (a fully celestial image) picked up by an omnidirectional camera (a fully celestial camera) and a panoramic image having a wider view region (a wider valid view region) than a display region that can be displayed at one time on the display unit. VR images include moving images and live view images (images acquired approximately in real time from a camera) in addition to still images. A VR image has a maximum view region (a maximum valid view region) corresponding to a visual field of 360 degrees in a vertical direction (a vertical angle, an angle from a zenith, an elevation, a depression angle, an elevation angle, or a pitch angle) and 360 degrees in a horizontal direction (a horizontal angle, an azimuth, or a yaw angle).

In addition, it is assumed that VR images include images with a wider viewing angle (a wider visual field) than a viewing angle of that can be photographed by an ordinary camera or images with a wider view region (a wider valid visual field) than a display region that can be displayed at one time on a screen of the display unit even when the viewing angle of the images is less than 360 degrees in the vertical direction and less than 360 degrees in the horizontal direction. For example, an image photographed by a fully celestial camera capable of photographing an object corresponding to a visual field (an angle of view) of 360 degrees in the horizontal direction (a horizontal angle or an azimuth) and 210 degrees in the vertical direction centered on a zenith is a type of a VR image. In addition, for example, an image photographed by a camera capable of photographing an object corresponding to a visual field (an angle of view) of at least 180 degrees in the horizontal direction (a horizontal angle or an azimuth) and at least 180 degrees in the vertical direction centered on the horizontal direction is a type of a VR image. In other words, an image having a view angle corresponding to a field of view of at least 160 degrees (±80 degrees) in both the vertical direction and the horizontal direction and having a view angle that is wider than a angle that can be visually recognized at one time by a human being is a type of a VR image.

By performing VR display (display in the "VR view" display mode) of the VR image, changing an orientation of a display apparatus (a display apparatus for displaying the VR image) in a horizontal rotation direction enables an omnidirectional video without any seams in the horizontal direction (the horizontal rotation direction) to be viewed. In the vertical direction (a vertical rotation direction), although an omnidirectional video without any seams can be viewed in an angle of ±105 degrees with respect to directly above (the zenith), a viewing angle exceeding 105 degrees from directly above becomes a blank region in which a video is not present. A VR image can be described as "an image of which a view region is at least a part of a virtual space (a VR space)".

VR display (a VR view) refers to a display method (a display mode) of displaying a video of a visual field in accordance with an orientation of the display apparatus in a VR image and in which a display region can be changed. When wearing and viewing a head mounted display (HMD) that is a display apparatus, a video of a visual field in accordance with an orientation of the head of the user is to be displayed. For example, let us assume that a video with a viewing angle (an angle of view) centered on 0 degrees in the horizontal direction (a specific orientation such as north) and 90 degrees in the vertical direction (90 degrees from the zenith or, in other words, horizontal) at a certain point in time in a VR image is being displayed. When front and back of the orientation of the display apparatus is reversed from this state (for example, when a direction that is faced by a display surface is changed from south to north), the display region is changed to a video with a viewing angle centered on 180 degrees in the horizontal direction (an opposite orientation such as south) and 90 degrees in the vertical direction (horizontal) in the same VR image. This means that, in a case where the user is viewing the HMD, when the user turns his or her head from north to south (in other words, when the user turns around), the video displayed on the HMD also changes from a video of the north to a video of the south. Such a VR display enables the user to be provided with a sensation (a sense of immersion) as though the user is visually present inside the VR image (inside the VR space). A smartphone mounted to VR goggles (a head mount adapter) can be considered a type of HMD.

It should be noted that a display method of a VR image is not limited to the method described above. A configuration may be adopted in which a display region is moved (scrolled) in accordance with a user operation with respect to a touch panel, a directional button, or the like instead of an orientation change. A configuration may be adopted in which, during VR display (in the "VR view" display mode), a display region can be changed in accordance with a touch-move with respect to the touch panel, a drag operation with respect to a mouse or the like, a depression of a directional button, or the like in addition to changing the display region in accordance with an orientation change.

An image processing unit 24 performs prescribed resizing processing or prescribed color conversion processing such as pixel interpolation or reduction with respect to data from the A/D converter 23a or the A/D converter 23b or data from a memory control unit 15. In addition, the image processing unit 24 performs prescribed computing processing using image data of a picked-up image. A system control unit 50 performs exposure control and ranging control on the basis of a computation result obtained by the image processing unit 24. Accordingly, AF (automatic focusing) processing, AE (automatic exposure) processing, EF (preliminary light emission before flash) processing, and the like in a TTL (through-the-lens) system are performed. The image processing unit 24 further performs prescribed computing processing using image data of a picked-up image and performs AWB (automatic white balance) processing in the TTL system on the basis of an obtained computation result. In addition, the image processing unit 24 performs basic image processing on two images (two fisheye images, two wide-angle images) obtained from the A/D converter 23a and the A/D converter 23b, and performs image connecting processing of synthesizing the two images having been performed to the basic image processing to generate a single VR image. Furthermore, the image processing unit 24 performs image clipping processing, expanding processing, distortion correction, or the like for realizing VR display of the VR image during VR display in a live view or during reproduction, and performs rendering in which a processing result is rendered on a VRAM of a memory 32.

In the image connecting processing, the image processing unit 24 uses one of the two images as a reference image and the other as a comparison image, calculates an amount of deviation between the reference image and the comparison image for each area by pattern matching processing, and detects a connection position where the two images are to be connected on the basis of the amount of deviation for each area. The image processing unit 24 corrects distortion of each image by geometric conversion in consideration of the detected connection position and lens characteristics of each optical system, and converts each image into an image in a fully celestial format (a fully celestial image format). In addition, by synthesizing (blending) the two images in the fully celestial format, the image processing unit 24 generates a single fully celestial image (a single VR image). The generated fully celestial image is an image using, for example, equidistant cylindrical projection, and a position of each pixel in the fully celestial image can be associated with coordinates on a surface of a sphere (a VR space).

Output data from the A/D converters 23a and 23b is written into the memory 32 via the image processing unit 24 and the memory control unit 15 or via the memory control unit 15 without involving the image processing unit 24. The memory 32 stores image data obtained by the imaging units 22a and 22b and converted into digital data by the A/D converters 23a and 23b and image data to be output to an external display from the connecting I/F 25. The memory 32 has sufficient storage capacity for storing a prescribed number of still images and a prescribed time's worth of moving images and audio.

In addition, the memory 32 also doubles as a memory (a video memory) for image display. Data for image display stored in the memory 32 can be output to an external display from the connecting I/F 25. By sequentially transferring VR images picked up by the imaging units 22a and 22b, generated by the image processing unit 24, and accumulated in the memory 32 to the external display and displaying the VR images on the external display, a function as an electronic view finder can be realized and live view display (LV display) can be performed. Hereinafter, an image displayed in live view display will be referred to as a live view image (LV image). In addition, live view display (remote LV display) can also be performed by transferring VR images accumulated in the memory 32 to an external device (a smartphone or the like) wirelessly connected via a communicating unit 54 and having the external device display the VR images.

A nonvolatile memory 56 is a memory as an electrically erasable and recordable recording medium and is, for example, an EEPROM. Constants, a program, and the like necessary for operations of the system control unit 50 are recorded in the nonvolatile memory 56. In this case, the program refers to a computer program for executing various processing.

The system control unit 50 is a control unit constituted by at least one processor or one circuit and controls the entire digital camera 100. The system control unit 50 realizes the respective processing by executing the program recorded in the nonvolatile memory 56 described earlier. A system memory 52 is, for example, a RAM, and constants and variables for operations of the system control unit 50, the program read from the nonvolatile memory 56, and the like are deployed onto the system memory 52. In addition, the system control unit 50 also performs display control by controlling the memory 32, the image processing unit 24, the memory control unit 15, and the like. A system timer 53 is a time-measuring unit for measuring time used in various controls and for measuring time according to an internal clock.

The mode changeover switch 60, the shutter button 61, the operating unit 70, and the power supply switch 72 are used in order to input various operation instructions to the system control unit 50.

The mode changeover switch 60 switches an operating mode of the system control unit 50 to any of a still image recording mode, a moving image photography mode, a reproduction mode, a communication connection mode, and the like. Modes included in the still image recording mode are an automatic photography mode, an automatic scene determination mode, a manual mode, an aperture priority mode (Av mode), a shutter speed priority mode (Tv mode), and a program AE mode. Other available modes include various scene modes that constitute photography settings for different photography scenes as well as custom modes. Using the mode changeover switch 60, the user can directly switch to any of these modes. Alternatively, after temporarily switching to a photography mode list screen using the mode changeover switch 60, another operating member may be used to selectively switch to any of a plurality of modes being displayed on the display unit 28. In a similar manner, the moving image photography mode may also include a plurality of modes.

The shutter button 61 includes a first shutter switch 62 and a second shutter switch 64. The first shutter switch 62 is turned on during an operation of the shutter button 61 by a so-called half-press (a photography preparation instruction) and generates a first shutter switch signal SW1. In accordance with the first shutter switch signal SW1, the system control unit 50 starts a photography preparation operation involving AF (automatic focusing) processing, AE (automatic exposure) processing, AWB (automatic white balance) processing, EF (preliminary light emission before flash) processing, and the like. The second shutter switch 64 is turned on upon completion of an operation of the shutter button 61 by a so-called full-press (a photography instruction) and generates a second shutter switch signal SW2. In accordance with the second shutter switch signal SW2, the system control unit 50 starts a series of operations of photography processing from reading a signal from the imaging units 22a and 22b to writing image data into a recording medium 90.

It should be noted that the shutter button 61 is not limited to an operation member capable of operations in the two stages of a full depression and a half depression and may be an operation member only capable of a one-stage depression. In this case, a photography preparation operation and photography processing are successively performed by a one-stage depression. This is a same operation as a case where a shutter button that can be fully depressed and half-depressed is fully depressed (a case where the first shutter switch signal SW1 and the second shutter switch signal SW2 are generated approximately simultaneously).

By selecting and operating various function icons and options displayed on the display unit 28, the operating unit 70 is appropriately assigned a function for each scene and acts as various function buttons. Examples of the function buttons include an end button, a return button, an image feed button, a jump button, a narrow-down button, and an attribute change button. For example, when a menu button is pushed, a menu screen enabling various settings to be performed is displayed on the display unit 28. The user can intuitively perform various settings by operating the operating unit 70 while looking at the menu screen displayed on the display unit 28.

The power supply switch 72 is a push button for switching a power supply on and off. A power supply control unit 80 is constituted by a battery detection circuit, a DC-DC converter, a switching circuit for switching between blocks to be energized, and the like, and detects whether or not a battery is mounted, a type of the battery, a remaining battery level, and the like. In addition, the power supply control unit 80 controls the DC-DC converter on the basis of the detection results and an instruction from the system control unit 50 and supplies respective units including the recording medium 90 with necessary voltage for a necessary period of time. A power supply unit 30 is constituted by a primary battery such as an alkaline battery or a lithium battery, a secondary battery such as a NiCd battery, a NiMH battery, or a Li battery, an AC adapter, or the like.

A recording medium I/F 18 is an interface with the recording medium 90 that is a memory card, a hard disk, or the like. The recording medium 90 is a recording medium such as a memory card for recording photographed images and is constituted by a semiconductor memory, an optical disk, a magnetic disk, or the like. The recording medium 90 may be a replaceable recording medium that is mountable to and dismountable from the digital camera 100 or a recording medium that is built into the digital camera 100.

The communicating unit 54 transmits and receives video signals and audio signals to and from an external device connected wirelessly or by a wired cable. The communicating unit 54 is also capable of connecting to a wireless LAN (Local Area Network) and the Internet. The communicating unit 54 is capable of transmitting images (including LV images) picked up by the imaging units 22a and 22b and images recorded on the recording medium 90 as well as receiving images and various other types of information from the external device.

An orientation detecting unit 55 detects an orientation of the digital camera 100 relative to a direction of gravitational force. On the basis of the orientation detected by the orientation detecting unit 55, a determination can be made as to whether an image photographed by the imaging units 22a and 22b is an image photographed while holding the digital camera 100 horizontally or an image photographed while holding the digital camera 100 vertically. In addition, a determination can be made as to how much the digital camera 100 had been tilted in the three axial directions (rotation directions) of a yaw direction, a pitch direction, and a roll direction during photography of an image by the imaging units 22a and 22b. The system control unit 50 can add orientation information in accordance with the orientation detected by the orientation detecting unit 55 to an image file of a VR image picked up by the imaging units 22a and 22b and record the VR image after rotating the image (after adjusting an orientation of the VR image so as to perform tilt correction (zenith correction)). One of an acceleration sensor, a gyro sensor, a geomagnetic sensor, an orientation sensor, an altitude sensor, and the like or a combination of a plurality of these sensors can be used as the orientation detecting unit 55. A motion (panning, tilting, uplifting, whether stationary or not, or the like) of the digital camera 100 can also be detected using the acceleration sensor, the gyro sensor, the orientation sensor, or the like that constitutes the orientation detecting unit 55.

A microphone 20 is a microphone for collecting sound around the digital camera 100 to be recorded as audio of a VR image (a VR moving image) that is a moving image. The connecting I/F 25 is a connecting plug to which is connected an HDMI (registered trademark) cable, a USB cable, or the like to be connected to an external device in order to transmit and receive video.

Figure 2A:
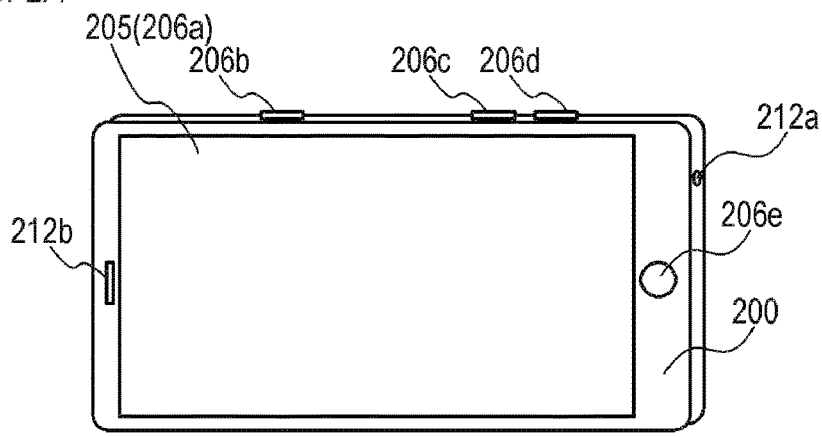
FIG. 2A is an external view of an electronic device.

FIG. 2A is an external view of an electronic device 200 which is a type of a display control apparatus. The electronic device 200 is a display apparatus such as a smartphone. A display 205 is a display unit which displays images and various types of information. The display 205 is integrally constructed with a touch panel 206a and is configured to be capable of detecting a touch operation with respect to a display surface of the display 205. The electronic device 200 is capable of performing VR display of a VR image (a VR content) on the display 205. An operating unit 206b is a power supply button for accepting an operation to switch between turning on and off a power supply of the electronic device 200. An operating unit 206c and an operating unit 206d are volume buttons for increasing and reducing a volume of audio output from a speaker 212b or from an earphone, an external speaker, or the like connected to an audio output terminal 212a. An operating unit 206e is a home button for causing a home screen to be displayed on the display 205. An audio output terminal 212a is an earphone jack that is a terminal for outputting an audio signal to an earphone, an external speaker, or the like. A speaker 212b is a speaker built into a main body for outputting audio.

Figure 2B:
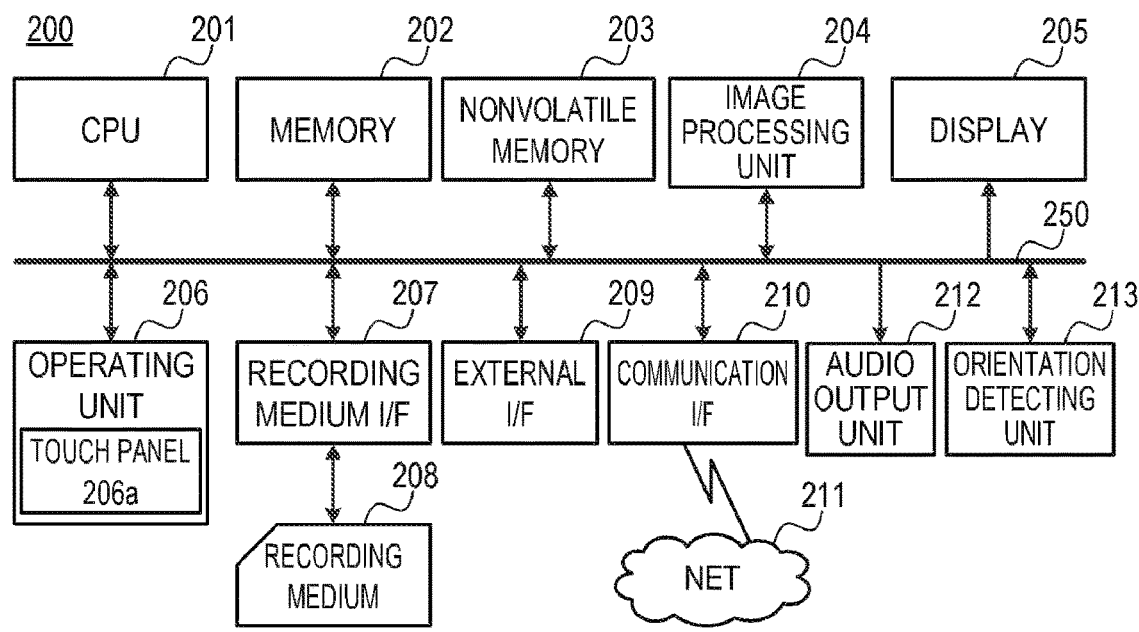
FIG. 2B is a block diagram of the electronic device.

FIG. 2B is a block diagram showing a configuration example of the electronic device 200. A CPU 201, a memory 202, a nonvolatile memory 203, an image processing unit 204, the display 205, an operating unit 206, a recording medium I/F 207, an external I/F 209, and a communication I/F 210 are connected to an internal bus 250. In addition, an audio output unit 212 and an orientation detecting unit 213 are also connected to the internal bus 250. The respective units connected to the internal bus 250 are configured so as to be capable of exchanging data with one another via the internal bus 250.

The CPU 201 is a control unit which controls the entire electronic device 200 and is constituted by at least one processor or one circuit. The memory 202 is constituted by, for example, a RAM (such as a volatile memory using a semiconductor element). The CPU 201 controls the respective units of the electronic device 200 by, for example, using the memory 202 as a work memory in accordance with a program stored in the nonvolatile memory 203. The nonvolatile memory 203 stores image data and audio data, other data, various programs that enable the CPU 201 to operate, and the like. The nonvolatile memory 203 is constituted by, for example, a flash memory or a ROM.

Under control by the CPU 201, the image processing unit 204 performs various types of image processing on images stored in the nonvolatile memory 203 or a recording medium 208, video signals acquired via the external I/F 209, images acquired via the communication I/F 210, and the like. Image processing performed by the image processing unit 204 includes A/D conversion processing and D/A conversion processing as well as encoding processing, compression processing, decoding processing, enlargement/reduction processing (resizing), noise reduction processing, color conversion processing, and the like of image data. The image processing unit 204 also performs various types of image processing such as panoramic development, mapping processing, and conversion of omnidirectional images or VR images being wide-viewing-angle images having video of a wide viewing angle albeit not omnidirectional. The image processing unit 204 may be constituted by a dedicated circuit block for performing specific image processing. In addition, depending on a type of image processing, the CPU 201 may perform the image processing in accordance with a program without using the image processing unit 204.

The display 205 displays images, a GUI (Graphical User Interface) screen constituting a GUI, and the like under control by the CPU 201. The CPU 201 controls the respective units of the electronic device 200 so as to generate a display control signal in accordance with the program and to generate a video signal to be displayed on the display 205 and output the video signal to the display 205. The display 205 displays a video on the basis of a generated and output video signal. Alternatively, components of the electronic device 200 itself may be limited to up to an interface for outputting a video signal to be displayed by the display 205, and the display 205 may be constituted by an external monitor (such as a television or an HMD).

The operating unit 206 is an input device for accepting a user operation of which examples include a character information input device such as a keyboard, a pointing device such as a mouse or a touch panel, a button, a dial, a joystick, a touch sensor, and a touch pad. In the present embodiment, the operating unit 206 includes the touch panel 206a and the operating units 206b, 206c, 206d, and 206e.

The recording medium 208 that is a memory card, a CD, a DVD, or the like is mountable to and dismountable from the recording medium I/F 207. Under control by the CPU 201, the recording medium I/F 207 reads data from and writes data to the mounted recording medium 208. The recording medium 208 stores data such as images to be displayed on the display 205. The external I/F 209 is an interface to be connected to an external device using a wired cable (such as a USB cable) or in a wireless manner to perform input and output of video signals and audio signals (data communication). The communication I/F 210 is an interface for communicating (by radio communication) with an external device, the Internet 211, and the like to transmit and receive various types of data such as files and commands (data communication).

The audio output unit 212 outputs audio of moving images and music data to be reproduced by the electronic device 200, keyboard clicks, ring tones, various notification sounds, and the like. While it is assumed that the audio output unit 212 includes an audio output terminal 212a to which an earphone or the like is to be connected and a speaker 212b, alternatively, the audio output unit 212 may output audio data to an external speaker by radio communication or the like.

The orientation detecting unit 213 detects an orientation (a tilt) of the electronic device 200 relative to a direction of gravitational force or an orientation of the electronic device 200 with respect to the respective axes in the yaw direction, the pitch direction, and the roll direction, and notifies the CPU 201 of orientation information. On the basis of an orientation detected by the orientation detecting unit 213, a determination can be made as to whether the electronic device 200 is being held horizontally, held vertically, pointed upward, pointed downward, or assuming an oblique orientation. In addition, a determination can be made as to a presence or absence or a magnitude of a tilt of the electronic device 200 in a rotation direction such as the yaw direction, the pitch direction, and the roll direction and whether or not the electronic device 200 has rotated in the rotation direction. One of an acceleration sensor, a gyro sensor, a geomagnetic sensor, an orientation sensor, an altitude sensor, and the like or a combination of a plurality of these sensors can be used as the orientation detecting unit 213.

As described above, the operating unit 206 includes the touch panel 206a. The touch panel 206a is an input device which is planarly configured so as to overlap with the display 205 and to output coordinate information in accordance with a touched position. The CPU 201 is capable of detecting the following operations with respect to the touch panel 206a or the following states of the touch panel 206a.

A state where a finger or a stylus previously not in touch with the touch panel 206a newly touches the touch panel 206a or, in other words, a start of a touch (hereinafter referred to as a touch-down)

A state where the touch panel 206a is being touched by a finger or a stylus (hereinafter referred to as a touch-on)

A state where a finger or a stylus is moving while in touch with the touch panel 206a (hereinafter referred to as a touch-move)

A state where a finger or a stylus previously in touch with the touch panel 206a separates from the touch panel 206a or, in other words, an end of a touch (hereinafter referred to as a touch-up)

A state where nothing is touching the touch panel 206a (hereinafter referred to as a touch-off)

When a touch-down is detected, a touch-on is simultaneously detected. Normally, after a touch-down, a touch-on is continuously detected unless a touch-up is detected. When a touch-move is detected, a touch-on is similarly simultaneously detected. Even when a touch-on is detected, a touch-move is not detected unless a touch position moves. A touch-off is detected upon detection of a touch-up of all of the fingers or a stylus previously in touch.

The CPU 201 is notified of the operations or the states described above as well as position coordinates where a finger or a stylus is touching the touch panel 206a through an internal bus and, on the basis of the notified information, the CPU 201 determines what kind of operation (touch operation) has been performed on the touch panel 206a. With respect to a touch-move, a movement direction of a finger or a stylus moving on the touch panel 206a can be determined for each of a vertical component and a horizontal component on the touch panel 206a on the basis of a change in the position coordinates. It is assumed that a determination that a slide operation has been performed is made when a touch-move of a prescribed distance or longer is detected. A touch-move is a movement operation performed by the user with respect to the touch panel 206a. Various processing in accordance with a touch-move to be described later can also be performed in accordance with a drag operation of a mouse which is also a movement operation.

An operation involving quickly moving a finger on the touch panel 206a for a certain distance while keeping the finger in touch with the touch panel 206a and then releasing the finger is referred to as a flick. In other words, a flick is an operation in which a finger quickly traces the touch panel 206a as though flicking on the touch panel 206a. A determination that a flick has been performed can be made (a determination that a flick has occurred following a slide operation can be made) when a detection of a touch-move of a prescribed distance or longer at a prescribed speed or higher is followed by a detection of a touch-up.

Furthermore, a touch operation involving touching a plurality of locations (for example, two points) at the same time and bringing the respective touch positions close to each other is referred to as a pinch-in while a touch operation in which the respective touch positions are distanced from each other is referred to as a pinch-out. A pinch-out and a pinch-in are collectively referred to as a pinch operation (or, simply, a pinch). As the touch panel 206a, a touch panel adopting any of various systems including a resistive film system, a capacitance system, a surface acoustic wave system, an infrared system, an electromagnetic induction system, an image recognition system, and an optical sensor system may be used. Any of a system in which a touch is detected when contact is made with the touch panel and a system in which a touch is detected when a finger or a stylus approaches the touch panel may be adopted.

Figure 2C:
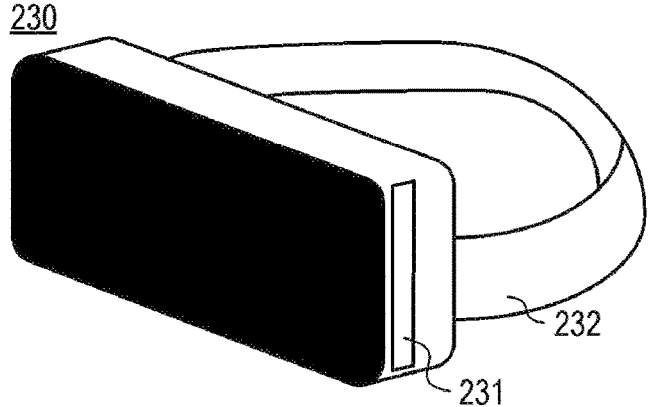
FIG. 2C is an external view of VR goggles.

FIG. 2C is an external view of VR goggles (a head mount adapter) 230 to which the electronic device 200 is mountable. By mounting the electronic device 200 to the VR goggles 230, the electronic device 200 can also be used as a head mounted display. An insertion opening 231 is an insertion opening to which the electronic device 200 is to be inserted. The entire electronic device 200 can be inserted into the VR goggles 230 by orienting the display surface of the display 205 toward a side of a headband 232 for fixing the VR goggles 230 to the head of the user (in other words, toward the user). In a state where the VR goggles 230 to which the electronic device 200 has been mounted are worn on the user's head, the user can view the display 205 of the electronic device 200 without having to manually hold the electronic device 200. In this case, when the user moves his or her head or entire body, an orientation of the electronic device 200 also changes. The orientation detecting unit 213 detects an orientation change of the electronic device 200 at this point, and the CPU 201 performs processing for VR display on the basis of the orientation change. In this case, the detection of the orientation of the electronic device 200 by the orientation detecting unit 213 is equivalent to a detection of an orientation of the head of the user (a direction in which a line of sight of the user is oriented). Alternatively, the electronic device 200 itself may be an HMD that is mountable to the head even without VR goggles.

In the present embodiment, an operation and processing of clipping a VR image with a view region (a valid view region) corresponding to a field of view of 180 degrees in both the vertical direction and the horizontal direction from a VR image with a view region (a valid view region) corresponding to a maximum field of view of 360 degrees in both the vertical direction and the horizontal direction will be described. It should be noted that, in the following description, a VR image with a view region (a valid view region) corresponding to a maximum field of view of 360 degrees in both the vertical direction and the horizontal direction will be referred to as a 360-degree VR image. In addition, a VR image with a view region (a valid view region) corresponding to a field of view of 180 degrees in both the vertical direction and the horizontal direction will be referred to as a 180-degree VR image. Conceptually, the processing of clipping a 180-degree VR image from a 360-degree VR image is processing of clipping a hemisphere from a virtual sphere onto which a video corresponding to 360 degrees has been entirely mapped. Clipping as described in the present embodiment is not processing of clipping an ordinary rectangular image (a planar image) but, rather, processing of clipping an image that can be viewed as a VR image (an image that can be mapped onto a sphere and viewed in a VR view) even after the clipping. Since the image after the clipping has a valid view region corresponding to a field of view of 180 degrees in both the vertical direction and the horizontal direction, when the image after the clipping is mapped onto a sphere, a valid video (such as a photographed image) corresponding to a hemisphere is mapped. The remaining hemisphere becomes an invalid view region to be filled in monochrome or by a prescribed pattern or onto which some kind of complemented video is to be mapped. When viewing such a clipped VR image in a VR view, the user can visually recognize the image in a forward region with a width of 180 degrees (a region of 90 degrees in both the vertical direction and the horizontal direction from center). Reasons for performing such clipping processing include the following.

First, a data amount of an image can be reduced. A clipped 180-degree VR image has a smaller data amount than a 360-degree VR image. Therefore, capacity of a recording medium when saving VR images can be prevented from becoming oppressed. In addition, an amount of communication data during transmission and reception and processing load during display can be reduced and, proportionally, effects including an improvement in processing speed or response speed and a reduction in power consumption can be produced.

Second, unnecessary objects can be deleted. For example, in most cases where a VR image having a valid view region corresponding to a field of view of 360 degrees is picked up, it is unavoidable that the photographer himself/herself is included in the VR image. However, when an object that the photographer wishes to photograph is a landscape or the like and not the photographer himself/herself, the photographer himself/herself is an unnecessary object and constitutes an unintentional presence. The inclusion of an unintentional video prevents a viewer from focusing his or her attention on a video such as a landscape which the photographer considers to be a theme. In addition, information to be concealed such as the face of a passerby and the license plate of a passing vehicle is often included and, in many cases, the inclusion of such information is undesirable from the perspectives of privacy and security. By performing clipping processing to clip only a region intended by the photographer and discard video of other unnecessary regions, such problems can be avoided.

Third, a physical burden on a user viewing a VR image in a VR view can be reduced. When viewing a 360-degree VR image in a VR view, video is present even behind the user viewing the VR image. While video corresponding to forward 180 degrees can be roughly panoramically viewed by a viewer by simply turning his or her head, in order to look behind, the view must twist his or her torso or change his or her standing direction, thereby placing a relatively high physical burden on the viewer. Such a body movement that is required to look behind is unsuitable for viewing when seated unless the viewer is in a swivel chair. In comparison, since a 180-degree VR image can be roughly panoramically viewed by simply turning one's head, the physical burden placed on the viewer when viewing the VR image is relatively small. If the viewer is made aware of the fact that a VR image is a 180-degree VR image by guide display or display indicating that a viewing angle exceeding 180 degrees is an invalid region, the viewer does not even attempt to look behind. Therefore, the viewer can be prevented from being forced to perform a body movement such as looking behind.

Fourth, a 360-degree VR image can be displayed so as to correspond to a recording format for a 180-degree VR image or the like. When a recording format of a 360-degree VR image differs from the recording format for a 180-degree VR image, the 360-degree VR image cannot be viewed by a reproducing apparatus (reproduction application software) which only supports viewing 180-degree VR images. However, generating a 180-degree VR image by clipping the 180-degree VR image from a 360-degree VR image enables the VR image to be viewed by even a reproducing apparatus which only supports viewing 180-degree VR images. In addition, even when both viewing 180-degree VR images and viewing 360-degree VR images are supported, when switching between a mode for viewing 180-degree VR images and a mode for viewing 360-degree VR images must be performed, switching operations may be a hassle. However, generating a 180-degree VR image by clipping the 180-degree VR image from a 360-degree VR image enables a plurality of VR images to be switched and viewed in succession without having to switch to the display mode for 180-degree VR images. Furthermore, a display mode (a binocular VR view) is envisaged which displays two 180-degree VR images including a right-eye 180-degree VR image and a left-eye 180-degree VR image photographed by two camera units installed facing an object in a same direction and separated by a distance corresponding to parallax in such a manner that the two 180-degree VR images can be stereoscopically viewed. By clipping a right-eye 180-degree VR image and a left-eye 180-degree VR image from a 360-degree VR image and recording the 180-degree VR images in advance, the 180-degree VR images can also be viewed in such a binocular VR view.

While an example in which a 180-degree VR image is generated by clipping the 180-degree VR image from a 360-degree VR image will be described in the present embodiment, the present embodiment is also applicable to processing for VR images with other viewing angles as long the processing involves clipping a VR image with a valid view region that is narrower than a valid view region of the VR image prior to the clipping. In other words, the VR image prior to clipping is not limited to a 360-degree VR image and the VR image after the clipping is not limited to a 180-degree VR image.

In each processing described below, an example of advancing the processing by displaying various touch buttons and accepting a touch operation with respect to the various touch buttons as a user operation will be described. Specifically, a touch operation of accepting an instruction with respect to various touch buttons may be a touch-up from a touch response region corresponding to a touch button or a touch-down with respect to a touch response region corresponding to a touch button. In addition, each instruction described as an instruction to be accepted by an operation with respect to a touch button to be described later is not limited thereto and may be accepted by other user operations. For example, a user operation for accepting an instruction may be an operation with respect to each physical button, an operation of selecting a display item using a direction key and depressing an enter key, an operation of selecting a display item using a mouse, a voice command, or the like.

Figure 3:
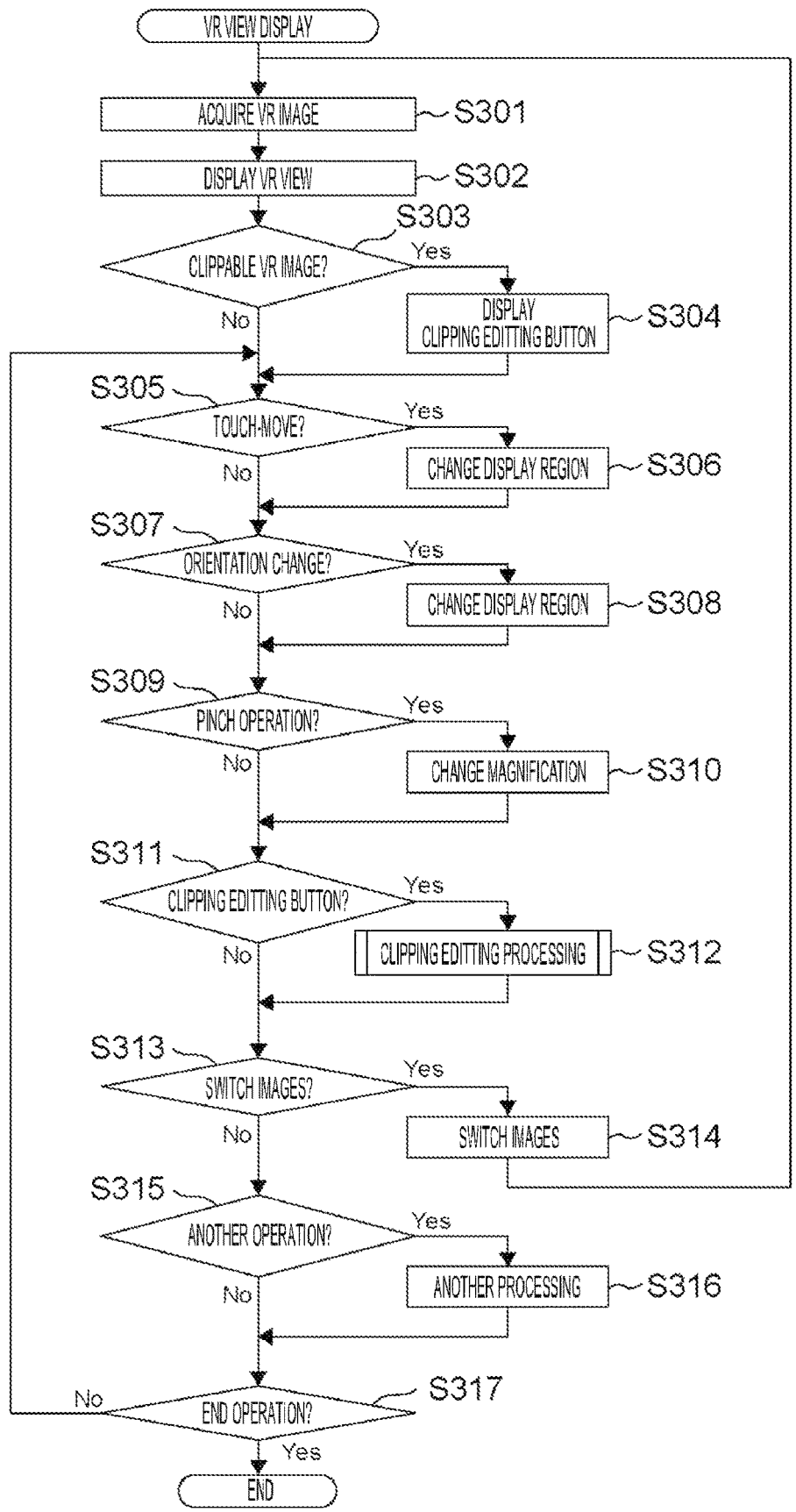
FIG. 3 is a flow chart of VR view display.

FIG. 3 is a flow chart of VR view display (processing) in the electronic device 200. This processing is realized as the CPU 201 deploys a program recorded in the nonvolatile memory 203 on the memory 202 and executes the program. When application software which is capable of displaying a 360-degree VR image in a VR view and which has a function of clipping a 180-degree VR image is activated in a state where the electronic device 200 is turned on, the CPU 201 starts the processing shown in FIG. 3 after initializing a flag, a control variable, and the like.

In S301, the CPU 201 loads (acquires) a VR image to be a display object from the recording medium 208 or a communication destination via the communication I/F 210. In addition, the CPU 201 acquires information indicating a view region (a valid view region) attached as attribute information of the VR image. The information indicating a valid view region refers to information describing angular regions in the vertical direction and in the horizontal direction of a valid video included in the VR image. The information indicating a valid view region need only be information that enables a valid view region of the VR image to be specified and may be an angle of view, a viewing angle, an azimuth, an elevation, the numbers of horizontal pixels, or information such as coordinates. Alternatively, the information indicating a valid view region may be model information of the camera used to capture the VR image (a photographable angle can be specified by specifying a model), information on zoom during photography, and the like. When the CPU 201 acquires the information indicating a valid view region, the CPU 201 also identifies (calculates) an invalid view region (a non-view region) based on differences from 360 degrees in the vertical and horizontal directions. Conversely, information indicating an invalid view region may be acquired from the attribute information of the VR image and a valid view region may be calculated from the information indicating the invalid view region, or both information indicating a valid view region and information indicating an invalid view region may be acquired from the attribute information of the VR image.

In S302, the CPU 201 performs display processing in a VR view of the VR image acquired in S301. Original data (image data) of the VR image is an image which is distorted due to the use of, for example, equidistant cylindrical projection, and which is an image in a format that enables a position of each pixel to be associated with coordinates on a surface of a sphere. The original image of the VR image is mapped onto a sphere, and a part of the sphere is clipped and displayed. In other words, the image displayed in S302 is an image obtained by clipping and enlarging a part of the VR image and is an image in which distortion of the original image has been removed (or reduced).

In S303, on the basis of the information acquired in S301, the CPU 201 determines whether or not the VR image that is a display object in S302 is a VR image from which a 180-degree VR image can be clipped. In the case of any of an image of which the number of recording pixels is lower than a threshold, an image of which a valid view region is narrower (smaller) than a threshold, an image having been performed to clipping processing to be described later, and a 180-degree VR image, the CPU 201 determines that the VR image is not a VR image from which a 180-degree VR image can be clipped and advances to S305. The CPU 201 advances to S304 when the CPU 201 determines that the VR image is an image that can be clipped.

Figure 6A:
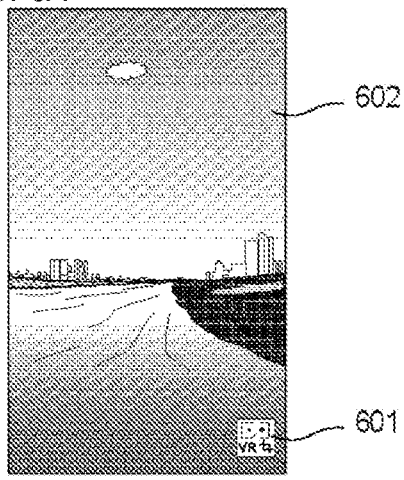
FIG. 6A represents an example of VR view display.

In S304, the CPU 201 displays a clipping editing button. FIG. 6A shows a display example of a VR image and a clipping editing button displayed in S304. A VR image 602 is the VR image displayed in S302. A clipping editing button 601 is a touch icon for issuing an instruction to clip the VR image. While a configuration is adopted in which the clipping editing button 601 is not displayed when the CPU 201 determines in S303 that the VR image cannot be clipped, alternatively, the clipping editing button 601 may be displayed in a display mode such as grayout which enables a selection-disabled state of the clipping editing button 601 to be identified.

In S305, on the basis of information notified from the touch panel 206a, the CPU 201 determines whether or not a touch-move (a display region change operation) has been performed with respect to a region where the VR image 602 is displayed. When a touch-move has been performed, the CPU 201 advances to S306, but otherwise the CPU 201 advances to S307. In S306, the CPU 201 scrolls the displayed VR image 602 in accordance with a direction and an amount of the touch-move and changes the display region of the VR image. Specifically, on the basis of a left-right direction (a horizontal direction) out of movement components of the touch-move, the CPU 201 scrolls the VR image rightward or leftward so that the display region rotates and moves around a vertical axis (a zenith axis, a gravity axis) of a virtual sphere to which the VR image has been mapped. In other words, this is a change of the display region which changes an orientation of a line of sight (a direction of the display region) when viewed from a viewer located at a center of the virtual sphere. In addition, on the basis of an up-down direction (a vertical direction) out of movement components of the touch-move, the CPU 201 scrolls the VR image upward or downward so that the display region rotates and moves around a horizontal axis (an axis perpendicular to the zenith axis, an axis perpendicular to gravity) of the virtual sphere to which the VR image has been mapped. In other words, this is a change of the display region which changes an elevation or a depression angle (hereinafter, referred to as an elevation/depression angle) of a line of sight (a direction of the display region) when viewed from a viewer located at the center of the virtual sphere.

In S307, the CPU 201 determines whether or not a change in orientation that necessitates a change in the display region has been detected by the orientation detecting unit 213. When a change in orientation that necessitates a change in the display region has been detected, the CPU 201 advances to S308, but otherwise the CPU 201 advances to S309. In S308, the CPU 201 changes (moves) the display region of the VR image 602 in accordance with the orientation change detected by the orientation detecting unit 213.

In S309, on the basis of information notified from the touch panel 206a, the CPU 201 determines whether or not a pinch-in or a pinch-out (in other words, a magnification change operation) has been performed with respect to the region where the VR image 602 is displayed. When a pinch-in or a pinch-out has been performed, the CPU 201 advances to S310, but otherwise the CPU 201 advances to S311. In S310, the CPU 201 changes (continuously or in a stepwise manner involving a plurality of (three or more) steps) a display magnification of the VR image in accordance with the pinch operation. In the case of a pinch-in (a reduction operation), the display magnification of the VR image is lowered. Accordingly, the display region of the VR image widens. In other words, although an object becomes smaller, a wider view region is displayed. In the case of a pinch-out (an enlargement operation), the display magnification of the VR image is raised. Accordingly, the display region of the VR image narrows. In other words, although an object becomes larger, a narrower view region is displayed.

In S311, on the basis of information notified from the touch panel 206a, the CPU 201 determines whether or not a touch operation designating the clipping editing button 601 has been performed. When a touch operation with respect to the clipping editing button 601 has been performed, the CPU 201 advances to S312, but otherwise the CPU 201 advances to S313. In S312, the CPU 201 performs clipping editing processing. The clipping editing processing will be described later with reference to FIG. 4.

In S313, the CPU 201 determines whether or not an image switching operation has been performed. When an image switching operation has been performed, the CPU 201 advances to S314, but otherwise the CPU 201 advances to S315. Examples of an image switching operation include an operation of an image switching button included in the operating unit 206, a touch operation on image switching icons (a next image icon and a previous image icon) displayed on the display 205, and a double drag that involves simultaneously touching two points and dragging the two points in a same direction. In S314, in accordance with the image switching operation, the CPU 201 specifies a VR image of an image file which differs from the currently-displayed VR image as a next display object. Subsequently, the CPU 201 returns to S301 and performs acquisition and display processing of the VR image that is the next display object.

In S315, the CPU 201 determines whether or not another operation has been performed. When another operation has been performed, the CPU 201 advances to S316, but otherwise the CPU 201 advances to S317. In S316, the CPU 201 executes processing in accordance with the other operation. Examples of the processing in accordance with the other operation include display processing in a binocular VR view of a VR image, deletion of the file of the VR image being displayed, sharing (posting to an SNS, mail transmission, instruction to use with another application, and the like), and editing processing such as tinge adjustment.

In S317, the CPU 201 determines whether or not an end operation with respect to the operating unit 206 has been performed. When there is no end operation, the CPU 201 returns to S305 and repeats the processing. When there is an end operation, the CPU 201 closes the application software that is the application for displaying the VR image and ends the processing shown in FIG. 3.

Figure 4:
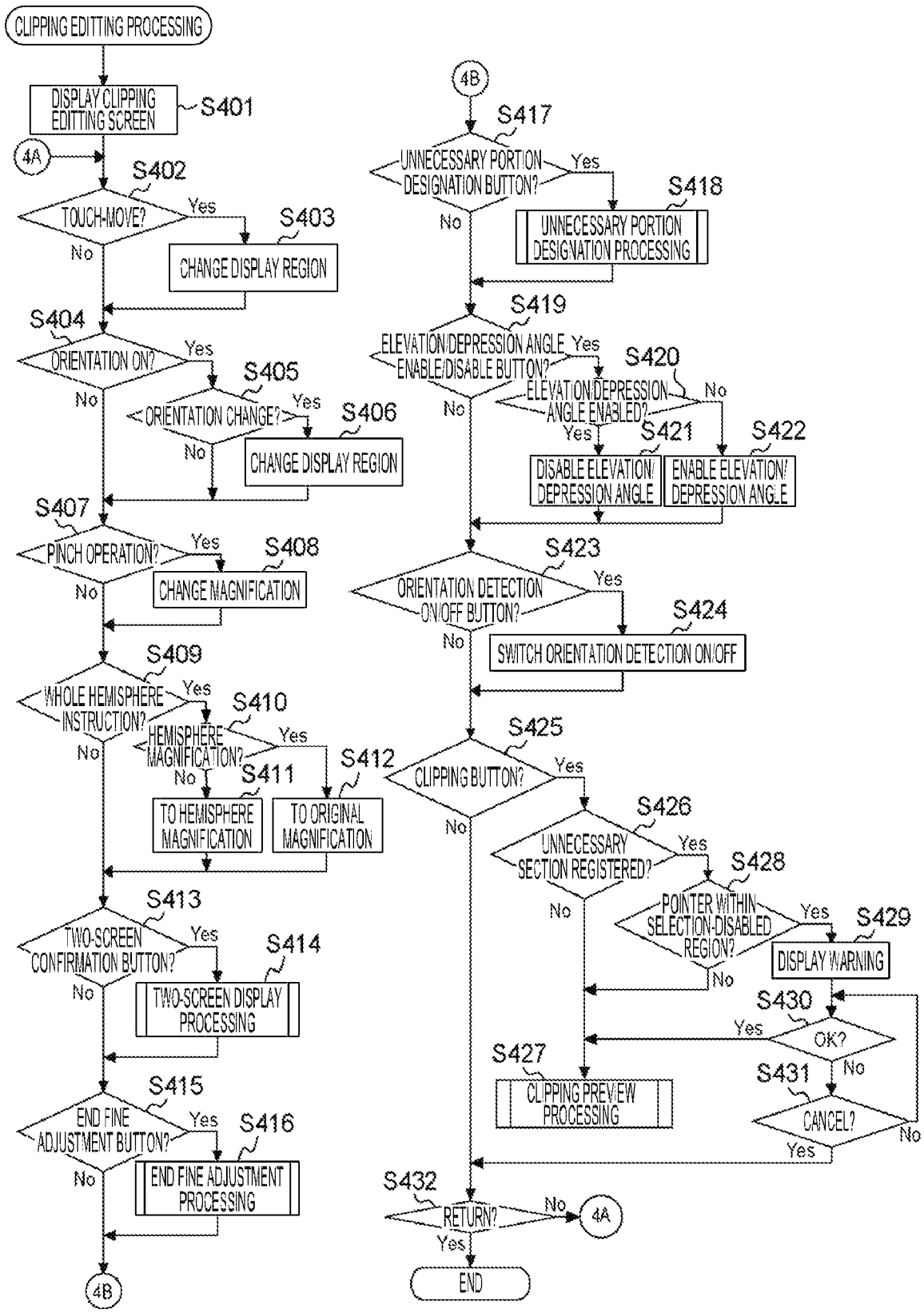
FIG. 4 is a flow chart of a clipping editing processing.

FIG. 4 is a flow chart of the clipping editing processing described earlier with reference to S312 shown in FIG. 3. This processing is realized as the CPU 201 deploys a program recorded in the nonvolatile memory 203 on the memory 202 and executes the program. The editing processing shown in FIG. 4 is, basically, processing of designating a center of a region to be clipped as a 180-degree VR image in the 360-degree VR image displayed in a VR view while maintaining the VR view. Although region designation can be finely adjusted, since a region to be clipped can be determined even by roughly determining a center without having to perform a fine adjustment, the region to be clipped can be designated in a simple manner. In a VR view, an entire VR image is often not displayed and, at the same time, a boundary of the region to be clipped is not a straight boundary as in the case of a planar image. Therefore, hypothetically, a method of determining a clipping region by an operation involving displaying a trimming frame and adjusting the displayed trimming frame is a hassle and difficult to understand for the user. Conversely, the clipping editing processing according to the present embodiment enables a region to be clipped as a 180-degree VR image in the 360-degree VR image to be designated by simply designating the center of the region while maintaining the VR view. Therefore, the user can perform clipping while experiencing an intuitive, easy-to-understand, and simple operation feeling.

Figure 6B:
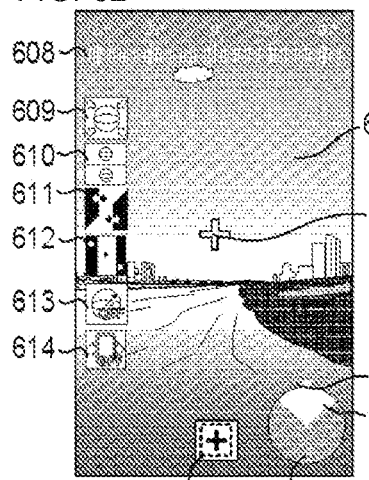
FIGS. 6B to 6D represent an example of a clipping editing screen.

In S401, the CPU 201 displays a clipping editing screen that is a screen for designating a clipping region on the display 205. FIG. 6B shows a display example of the clipping editing screen. The VR image 602 is the same VR image as the image displayed in a VR view display prior to the transition to the clipping editing screen. While the display region can be enlarged or reduced by a pinch operation, for example, the VR image 602 is displayed in a display region that is narrow than a region corresponding to 180 degrees immediately after the clipping editing screen is displayed (a default state). A pointer 603 is an indicator for designating a center of a clipping region (a reference position of a clipping region). A clipping button 604 is an instruction icon for designating a clipping region on the basis of a present display region (reference position). On the clipping editing screen, the pointer 603 is displayed at a position fixed to a central portion of the screen, and even when the display region of the VR image 602 changes, the position of the pointer 603 on the display 205 does not change. The user changes the display region of the VR image 602 displayed in a VR view by an operation that is approximately the same as an operation in an ordinary VR view so that a position of a desired object to be a center of a VR image after clipping assumes the position indicated by the pointer 603. In addition, by touching the clipping button 604, a region on the basis of the present display region (reference position) can be designated (or provisionally designated) as the region after the clipping. More specifically, the region after clipping can be designated so that a position of a VR image corresponding to the position where the pointer 603 is being displayed becomes a center or an orientation of center after clipping.

In a display direction guide indicated by a circle, a fan-shaped display region 605 indicates a region of orientations (an angular region around a zenith axis) of the present display region out of all orientations of the VR image indicated by a circle. A non-display region 606 indicates a region of orientations (an angular region around a zenith axis) which is not the present display region out of all orientations of the VR image indicated by the circle. A reference direction 607 indicates a direction (hereinafter, a display start direction) to be a center of a display region that is displayed first (in other words, prior to an operation of changing the display region and an occurrence of an orientation change) when starting display of the VR image 602.

Angle information 608 (an angle scale) indicates a present angle (an azimuth) of the pointer 603 with respect to the display start direction, and display of the angle information 608 is updated when the display region is changed. A whole hemisphere display button 609 is an instruction icon for switching, with a single touch, a display magnification of the VR image 602 to a magnification that includes a whole region designated as a region after clipping. A dual-screen confirmation button 610 is an instruction icon for switching to a display mode for simultaneously displaying a region designated as a clipping region and a deletion region which is not designated as a clipping region and which is discarded in the VR image after clipping. An end fine adjustment button 611 is an instruction icon for switching to a display mode for displaying an end (a boundary portion) of a clipping region in order to perform fine adjustment of the clipping region. An unnecessary portion designation button 612 is an instruction icon for switching to a mode for designating an unnecessary portion that is an object that is desirably not included in a clipping region. Once an unnecessary portion is designated, when designating a center of a clipping region so that the unnecessary portion is not included in the clipping region, a region that can be designated and a region that cannot be designated are to be identifiably displayed.

An elevation/depression angle enable/disable button 613 is an instruction icon for switching between enabling and disabling an elevation/depression angle corresponding to the present display region (an elevation/depression angle at a position indicated by the pointer 603 in an entire VR image mapped onto a sphere) as a center of a clipping region. In addition, the elevation/depression angle enable/disable button 613 also represents a present setting and is displayed as an icon in a display mode indicating an enabled state when the present setting is the enabled state but displayed as an icon in a display mode indicating a disabled state when the present setting is the disabled state. When enabled, a region of respectively 90 degrees in a periphery for a total of 180 degrees (a hemispheric angle) with the elevation/depression angle of the orientation indicated by the pointer 603 as center is adopted as a clipping region. When disabled, a region of respectively 90 degrees in a periphery for a total of 180 degrees (a hemispheric angle) with an elevation/depression angle of 0 degrees or, in other words, a position indicated by the pointer 603 on a horizontal surface as center is adopted as a clipping region instead of a region on the basis of the elevation/depression angle indicated by the pointer 603. It is assumed that, in an initial setting prior to the user performing a designation operation, the elevation/depression angle enable/disable setting is set to disabled.

An orientation detection ON/OFF button 614 is an instruction icon for switching between enabling and disabling a change to the display region of the VR image 602 due to an orientation change. In addition, the orientation detection ON/OFF button 614 also represents a present setting and is displayed as an icon in a display mode indicating an enabled state when the present setting is the enabled state but displayed as an icon in a display mode indicating a disabled state when the present setting is the disabled state. Although the enabled setting is simple and intuitive because a center of a clipping region can be determined by merely changing an orientation of the electronic device 200, since the display region frequently changes by an orientation change alone, sometimes it is difficult to make an adjustment to a desired display region. Since the disabled setting can prevent the display region from being changed due to an orientation change, an unintentional change to the display region can be prevented and an adjustment to a display region that more closely conforms to the user's intention can be performed with an operation (a slide operation) by a touch-move. In an initial setting prior to the user performing a designation operation, the orientation detection ON/OFF setting may be set to disabled (OFF).

In S402 and S403, the CPU 201 changes the display region in accordance with a touch-move with respect to the region where the VR image 602 is displayed. Details of the processing is similar to that in S305 and S306 shown in FIG. 3 described earlier. As described earlier, even when the display region changes, the display position of the pointer 603 on the display 205 does not change. When the display region of a VR image changes, a relative positional relationship of the pointer 603 with respect to the VR image changes. In addition, according to the processing, a width (180 degrees) of a clipping region in the clipping processing to be described later in S502 and S503 does not change but a position of the clipping region in the VR image prior to clipping is changed.

Figure 6C:
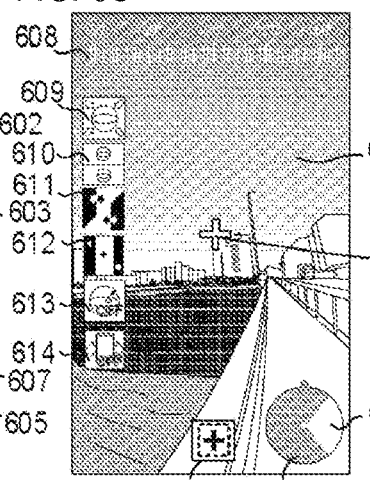

FIG. 6C shows a display example in a case where the display region is changed by a leftward touch-move from the state shown in FIG. 6B. The display region of the VR image 602 has been changed and, in accordance therewith, the angle information 608 as well as the regions indicated by the display region 605 and the non-display region 606 in the display direction guide have also been changed. The VR image 602 has been scrolled so as to move to the left as compared to FIG. 6B, and a right-side region in the VR image has been newly made a display region as compared to the state shown in FIG. 6B. In other words, the display region has moved to the right. In the example shown in FIG. 6C, as is apparent from the angle information 608 and the display direction guide, the display region has been changed to a direction facing approximately 90 degrees to the right as compared to the display region shown in FIG. 6B. The display region includes, as objects, vehicles passing by in a direction where license plates are readable. For example, the user considers such license plates of passing vehicles are not information that should be disclosed and wishes to omit the license plates from the image after clipping.

Figure 6D:
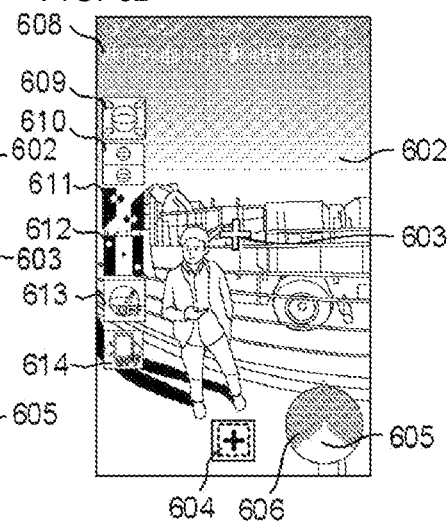

FIG. 6D shows a display example in a case where the display region is changed by a further leftward touch-move from the state shown in FIG. 6C. The display region of the VR image 602 has been changed and, in accordance therewith, the angle information 608 as well as the regions indicated by the display region 605 and the non-display region 606 in the display direction guide have also been changed. The VR image 602 has been scrolled so as to move to the left as compared to FIG. 6C, and a right-side region in the VR image has been newly made a display region as compared to the state shown in FIG. 6C. In other words, the display region has moved to the right. In the example shown in FIG. 6C, as is apparent from the angle information 608 and the display direction guide, the display region has been changed to a direction facing approximately directly behind (180 degrees rightward) as compared to the display region shown in FIG. 6B. The display region includes the photographer himself as an object. For example, the user does not consider the photographer himself a primary object originally intended to be photographed and wishes to omit the photographer from the image after clipping.

In S404, the CPU 201 refers to the setting information held in the memory 202 and determines whether or not the function for changing a display region in accordance with orientation detection has been enabled (turned on). Enabling (turning on)/disabling (turning off) the function for changing a display region in accordance with orientation detection is a setting item that can be set by a touch operation with respect to the orientation detection ON/OFF button 614 described earlier. When the function for changing a display region in accordance with orientation detection is enabled (turned on), the CPU 201 advances to S405, but otherwise the CPU 201 advances to S407. In S405 and S406, the CPU 201 changes the display region of the VR image 602 in accordance with the orientation change detected by the orientation detecting unit 213. Since this processing is similar to that in S307 and S308 shown in FIG. 3 described earlier, details thereof will be omitted. It should be noted that, according to the processing, a width (180 degrees) of a clipping region in the clipping processing to be described later in S502 and S503 does not change but a position of the clipping region in the VR image prior to clipping is changed. When the CPU 201 determines that the function for changing a display region in accordance with orientation detection is disabled (turned off) in S404, the CPU 201 advances to S407 without advancing to S405 and S406 and does not change the display region in accordance with a change in orientation even when a change in orientation is detected by the orientation detecting unit 213.

In S407 and S408, the CPU 201 changes a display magnification of the VR image 602 in accordance with a pinch operation (a magnification change instruction). Since this processing is similar to that in S309 and S310 shown in FIG. 3 described earlier, details thereof will be omitted.

In S409, on the basis of information notified from the touch panel 206a, the CPU 201 determines whether or not a touch operation (a whole hemisphere instruction; a magnification change instruction) with respect to the whole hemisphere display button 609 has been performed. When a touch operation designating the whole hemisphere display button 609 has been performed, the CPU 201 advances to S410, but otherwise the CPU 201 advances to S413. In S410, the CPU 201 determines whether or not the present display magnification is already a magnification (hemisphere magnification) for whole hemisphere display. The determination may be made by referring to the present display magnification or by referring to the present display mode. When the display magnification is already the hemisphere magnification, the CPU 201 advances to S412 in order to restore an original display magnification. When the display magnification is not the hemisphere magnification, the CPU 201 advances to S411 to switch to display at the hemisphere magnification. In other words, whole hemisphere display (hemisphere magnification display) is switched on and off every time a touch operation with respect to the whole hemisphere display button 609 is performed.

In S411, the CPU 201 performs whole hemisphere display after recording the present display magnification prior to switching to whole hemisphere display in the memory 202. Whole hemisphere display is a display at a magnification at which an entire clipping region having been clipped with a position currently indicated by the pointer 603 as center fits within the display region on the display 205. While a display magnification that includes a region of a hemisphere is adopted as the hemisphere magnification in the present embodiment in order to make a 180-degree region a clipping region, a clipping region that is not 180 degrees is not limited to a hemisphere region and is displayed at a magnification that enables an entire clipping region to be fitted into the display region.

Figure 7A:
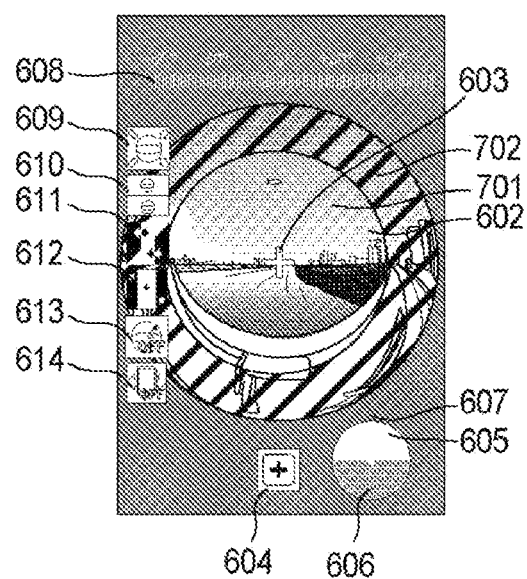
FIGS. 7A and 7B represent an example of whole hemisphere display.

FIG. 7A shows a display example of whole hemisphere display on the clipping editing screen. When an instruction for whole hemisphere display is issued from a normal display magnification in a VR view (an initial magnification that is initially displayed upon starting display in a VR view) as shown in FIG. 6B, the normal display magnification is switched with a single touch (without stopping at another magnification) to the display magnification shown in FIG. 7A (a magnification that is lower than the initial magnification). The VR image 602 shown in FIG. 7A represents displaying a same image as the VR image 602 displayed in FIG. 6B at a magnification for whole hemisphere display. Since a region equal to or wider than 180 degrees originally intended to be mapped onto a sphere is fitted into a planar display region, the VR image 602 of which a periphery is distorted as though photographed by a fish-eye lens is displayed. A hatched portion 702 is superimposed and displayed on the VR image 602. The hatched portion 702 indicates a region to be outside of the clipping region (outside of a 180-degree region from the position indicated by the pointer 603) in the displayed VR image 602 and indicates a region to be deleted (an excluded region) in the image after clipping. The user can confirm a portion included in the clipping region by looking at a portion 701 without hatchings in a central portion in the VR image 602 and can confirm the excluded region by looking at the hatched portion 702 in the VR image 602. Therefore, the clipping region can be designated by confirming how much of the VR image 602 is to be included and how much of the VR image 602 is not to be included in the clipping region. Accordingly, an operation such as setting the clipping region such that vehicles and people passing by are in the excluded region while fitting a river that is a main object into the clipping region can be readily performed.

Since the hatched portion 702 need only be recognized as being an excluded region, a display mode thereof is not limited to hatchings and the excluded region may be indicated by other display modes such as a semitransparent mask, screening, and monochromatic display. Alternatively, a display mode may be adopted in which, instead of indicating the excluded region, only a boundary between the clipping region and the excluded region is indicated by a circular line or the like. In addition, instead of displaying the excluded region, the clipping region may be displayed so that the inside of the clipping region is entirely included in the display region. Processing in accordance with the various operations described in the processing shown in FIG. 4 can be performed even during whole hemisphere display. In other words, an adjustment can be performed so that a desired region becomes the clipping region by changing the display region in accordance with an orientation change or a touch-move. In addition, the clipping region can be determined by processing in accordance with a touch operation with respect to the clipping button 604 to be described later in S425 to S431. The hatched portion 702 indicating the excluded region may be configured to be displayed in the case of whole hemisphere display in accordance with a touch operation with respect to the whole hemisphere display button 609 and not displayed when display magnification is lowered from normal magnification by a pinch-in. Alternatively, the hatched portion 702 indicating the excluded region may be configured to be displayed in the case of whole hemisphere display in accordance with a touch operation with respect to the whole hemisphere display button 609 and also displayed when display magnification is lowered from normal magnification by a pinch-in.

In S412, from a state where whole hemisphere display has been performed, the CPU 201 refers to an original display magnification prior to switching which is held in the memory 202 and restores a display state at the original display magnification. In other words, for example, the CPU 201 switches a display state shown in FIG. 7A to a display state shown in FIG. 6B. Accordingly, a state in which a peripheral portion is distorted and displayed small is switched to a display state in which the central portion included in the clipping region is displayed large with no distortion or with reduced distortion.

In S413, on the basis of information notified from the touch panel 206a, the CPU 201 determines whether or not a touch operation with respect to the dual-screen confirmation button 610 has been performed. When a touch operation designating the dual-screen confirmation button 610 has been performed, the CPU 201 advances to S414, but otherwise the CPU 201 advances to S415. In S414, the CPU 201 performs a dual-screen display processing. The dual-screen display processing will be described later with reference to FIGS. 8A, 9A, and 9B.

In S415, on the basis of information notified from the touch panel 206a, the CPU 201 determines whether or not a touch operation with respect to the end fine adjustment button 611 (a fine adjustment instruction for starting a fine adjustment of the display region) has been performed. When a touch operation designating the end fine adjustment button 611 has been performed, the CPU 201 advances to S416, but otherwise the CPU 201 advances to S417. In S416, the CPU 201 performs an end fine adjustment processing. The end fine adjustment processing will be described later with reference to FIGS. 10 and 11A to 11D.

In S417, on the basis of information notified from the touch panel 206a, the CPU 201 determines whether or not a touch operation with respect to the unnecessary portion designation button 612 has been performed. When a touch operation designating the unnecessary portion designation button 612 has been performed, the CPU 201 advances to S418, but otherwise the CPU 201 advances to S419. In S418, the CPU 201 performs unnecessary portion designation processing. The unnecessary portion designation processing will be described later with reference to FIGS. 12, 13A to 13D, and 14A to 14G.

In S419, on the basis of information notified from the touch panel 206a, the CPU 201 determines whether or not a touch operation with respect to the elevation/depression angle enable/disable button 613 (a switching instruction for switching between enabling and disabling the elevation/depression angle) has been performed. When a touch operation designating the elevation/depression angle enable/disable button 613 has been performed, the CPU 201 advances to S420, but otherwise the CPU 201 advances to S423. In S420, the CPU 201 refers to setting information held in the memory 202 and determines whether or not the present setting prior to accepting the touch operation with respect to the elevation/depression angle enable/disable button 613 is elevation/depression angle-enabled. When the CPU 201 determines that the present setting is elevation/depression angle-enabled, the CPU 201 advances to S421, but when the present setting is elevation/depression angle-disabled, the CPU 201 advances to S422. In S421, the CPU 201 sets the setting of elevation/depression angle enable/disable by changing enabled to disabled and records the setting state in the memory 202. In S422, the CPU 201 sets the setting of elevation/depression angle enable/disable by changing disabled to enabled and records the setting state in the memory 202. When the setting of elevation/depression angle enable/disable is changed, a display mode of the elevation/depression angle enable/disable button 613 is also updated so as to indicate the setting state after the change. It should be noted that, when the setting of elevation/depression angle enable/disable is set to disabled in S421, a direction in which the display region of the VR image 602 can be changed in S403 and S406 may be limited to an azimuth direction and the display region may be prevented from being changed in the elevation/depression angle direction. In other words, a restriction may be applied such that, in accordance with a touch-move or an orientation change, a horizontal scroll (a change of the display region in the azimuth direction) is performed but a vertical scroll (a change of the display region in the elevation/depression angle direction) is not performed.

In S423, on the basis of information notified from the touch panel 206a, the CPU 201 determines whether or not a touch operation with respect to the orientation detection ON/OFF button 614 has been performed. When a touch operation designating the orientation detection ON/OFF button 614 has been performed, the CPU 201 advances to S424, but otherwise the CPU 201 advances to S425. In S424, the CPU 201 changes a setting state of a change function of the display region in accordance with orientation detection. When the setting prior to the change is enabled (ON), the setting is changed to disabled (OFF) and setting information indicating the setting after the change is recorded in the memory 202. When the setting prior to the change is disabled (OFF), the setting is changed to enabled (ON) and setting information indicating the setting after the change is recorded in the memory 202. When the setting state of the change function of the display region in accordance with orientation detection is changed, a display mode of the orientation detection ON/OFF button 614 is also updated so as to indicate the setting state after the change.

In S425, on the basis of information notified from the touch panel 206a, the CPU 201 determines whether or not a touch operation with respect to the clipping button 604 (a clipping instruction, a designation operation of a reference position) has been performed. When a touch operation designating the clipping button 604 has been performed (when a clipping instruction has been accepted), the CPU 201 advances to S426, but otherwise the CPU 201 advances to S432.

In S426, the CPU 201 determines whether or not an unnecessary portion has been registered by unnecessary portion designation processing to be described later. When an unnecessary portion is registered, the CPU 201 advances to S428, but when an unnecessary portion is not registered, the CPU 201 advances to S427. In S427, the CPU 201 performs clipping preview processing. The clipping preview processing will be described later with reference to FIG. 5. Alternatively, the CPU 201 may advance to S427 without performing the processing of S426 when the CPU 201 determines in S425 that a touch operation with respect to the clipping button 604 has been performed. Furthermore, the CPU 201 may advance to S535 in FIG. 5 to be described later and perform clipped VR image saving processing without performing the processing of S426 and S427 when the CPU 201 determines in S425 that a touch operation with respect to the clipping button 604 has been performed. Since the processing of S428 to S431 is processing in a case where an unnecessary portion is registered and are similar to the processing in S1215 to S1218 shown in FIG. 12 to be described later, details thereof will be omitted.

In S432, the CPU 201 determines whether or not the clipping editing processing has ended and an operation to return to the processing of VR view display shown in FIG. 3 has been performed. When a return operation has not been performed, the CPU 201 returns to S402 to repeat the processing, but when a return operation has been performed, the CPU 201 ends the processing shown in FIG. 4, performs original VR view display, and advances to S313 shown in FIG. 3.

Figure 5:
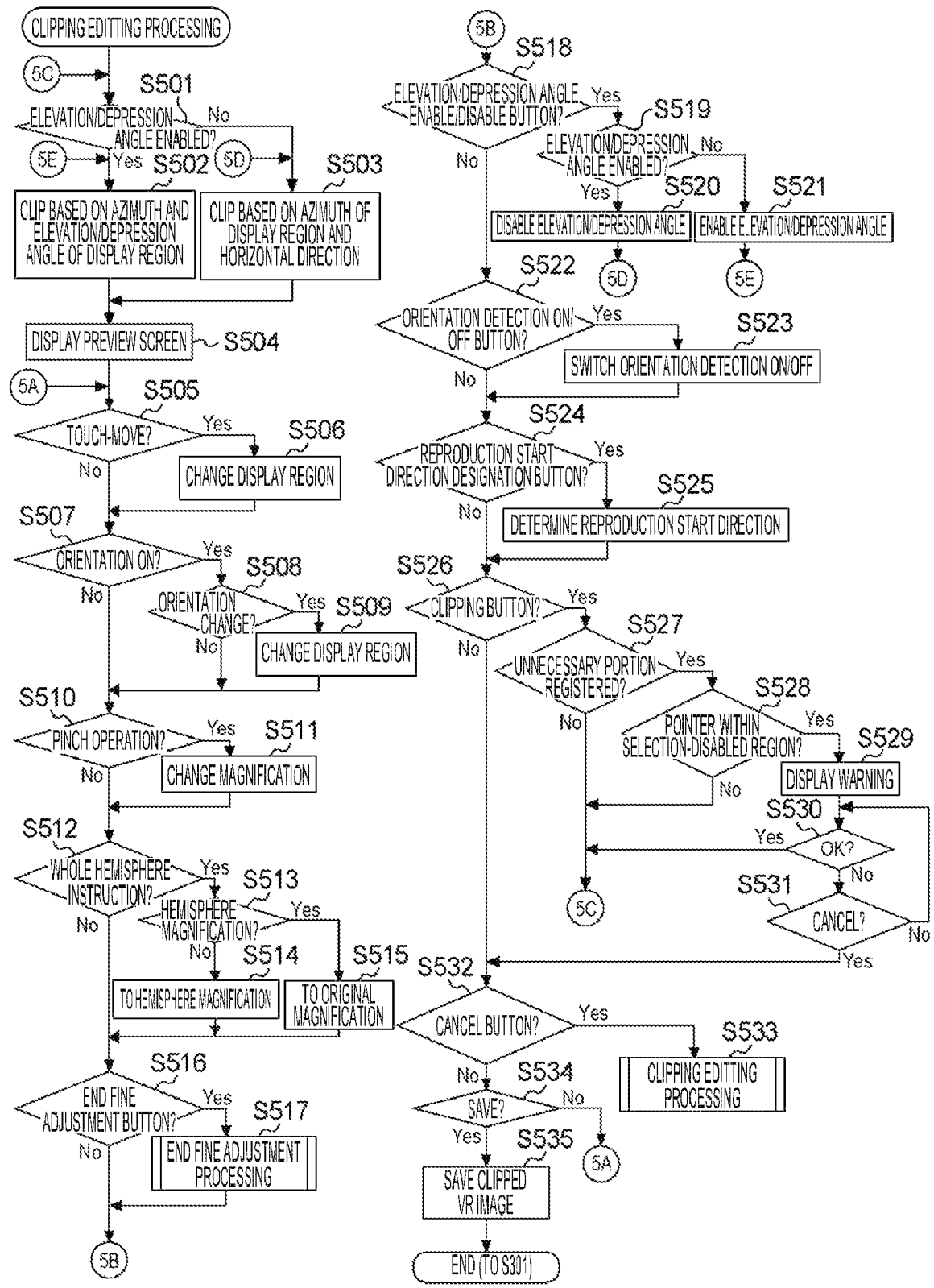
FIG. 5 is a flow chart of a clipping preview processing.

FIG. 5 is a flow chart of the clipping editing processing described earlier with reference to S427 shown in FIG. 4. This processing is realized as the CPU 201 deploys a program recorded in the nonvolatile memory 203 on the memory 202 and executes the program. The clipping preview processing shown in FIG. 5 is processing for confirming whether or not the designation of the clipping region by the user in the clipping editing processing shown in FIG. 4 can be finalized.

In S501, the CPU 201 refers to setting information held in the memory 202 and determines whether or not the present setting is elevation/depression angle-enabled. It should be noted that a setting of the setting item referred to at this point can be changed by a touch operation with respect to the elevation/depression angle enable/disable button 613. When the CPU 201 determines that the present setting is elevation/depression angle-enabled, the CPU 201 advances to S502, but when the present setting is elevation/depression angle-disabled, the CPU 201 advances to S503.

In S502, the CPU 201 determines the clipping region on the basis of an azimuth and an elevation/depression angle of the present display region (the display region immediately prior to the clipping button 604 being touched on the clipping editing screen of the processing described with reference to FIG. 4 or on a preview screen to be described later) and performs clipping processing. More specifically, the CPU 201 clips a 180-degree region (a region of respectively 90 degrees in all directions from center) centered on the center of the display region (the position where the pointer 603 is displayed) from a 360-degree VR image and generates a 180-degree VR image (an edited VR content). This processing will be described later with reference to FIGS. 16A and 16C.

In S503, the CPU 201 determines the clipping region on the basis of an azimuth and the horizontal direction (an elevation/depression angle of 0 degrees) of the present display region (the display region immediately prior to the clipping button 604 being touched on the clipping editing screen of the processing described with reference to FIG. 4 or on a preview screen to be described later) and performs clipping processing. In doing so, the clipping region is determined on the basis of the horizontal direction (a direction perpendicular to the zenith axis) regardless of the elevation/depression angle of the display region prior to clipping. More specifically, the CPU 201 clips a 180-degree region centered on one point determined by an azimuth corresponding to the center of the display region (the position where the pointer 603 is displayed) in the horizontal direction from a 360-degree VR image and generates a 180-degree VR image (an edited VR content). This processing will be described later with reference to FIGS. 16A and 16B.

Figure 6E:
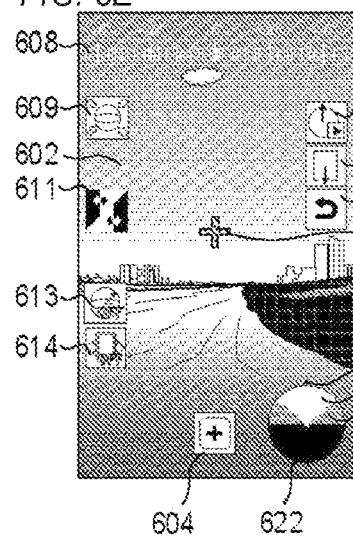
FIGS. 6E to 6G represent an example of a preview screen.
Figure 6F:
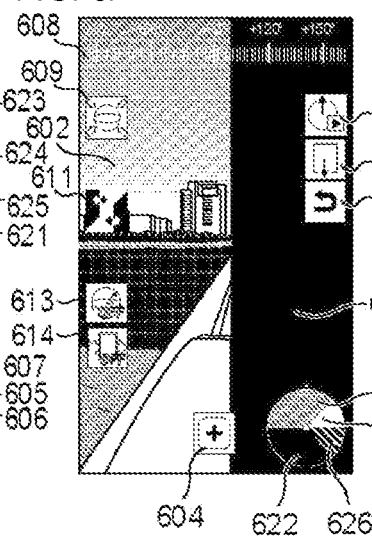
Figure 6G:
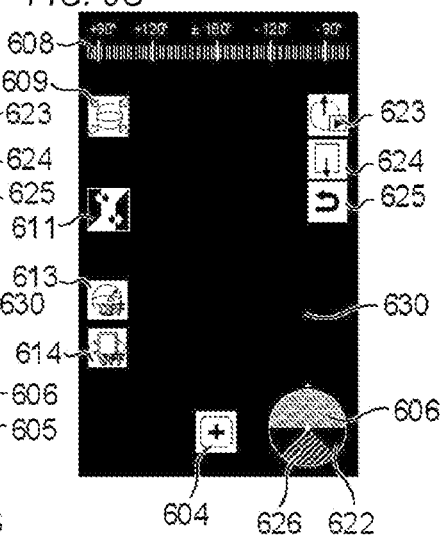

In S504, the CPU 201 displays a preview screen that enables a clipping result in S502 or S503 to be confirmed on the display 205. FIGS. 6E, 6F, and 6G show a display example of the preview screen.

FIG. 6E represents a display example of the preview screen in a case where the clipping button 604 is touched in the state shown in FIG. 6B (a state where the display region in the VR image 602 is the region shown in FIG. 6B) and a transition is made to the clipping preview processing. A circular display direction guide in a lower right part of the screen displays, in addition to the fan-shaped display region 605 and the non-display region 606, an excluded region 622 (a blacked-out portion in FIG. 6E) indicating a region outside of the clipping region (an excluded region). Accordingly, the user can identify that a state now exists where an image is absent in a region corresponding to the excluded region 622 out of all directions of 360 degrees of the VR image 602. In addition, the display mode of the pointer 603 is changed and displayed as a pointer 621. On the preview screen, the pointer 621 is displayed as an indicator indicating a center of the designated clipping region. Therefore, the pointer 621 is displayed at a position indicating a center of the clipping region (a valid view region) of the VR image 602 instead of being fixed to the center of the display 205. For this reason, in accordance with the change to the display region, a display position of the pointer 621 also moves in conjunction with a movement of the display position of the center of the clipping region (the valid view region) of the VR image 602. Other display items denoted by the same reference numerals as FIG. 6B represent display items similar to those of the clipping editing screen. The dual-screen confirmation button 610 and the unnecessary portion designation button 612 are hidden on the preview screen. A reproduction start direction designation button 623, a save button 624, and a cancel button 625 are displayed as display items that are not displayed on the clipping editing screen but are displayed on the preview screen. The reproduction start direction designation button 623 is an instruction icon for designating a portion to become a display region when next displaying the VR image after clipping for the first time. A center of the display region at a time point where a touch operation with respect to the reproduction start direction designation button 623 (a direction designation instruction for designating a reproduction start direction) is adopted as a center of the display region when next displaying the VR image after clipping for the first time or, in other words, the display start direction described earlier in the VR image after clipping. The save button 624 is an instruction icon for issuing an instruction to finalize the clipping region and record an image file of the VR image after clipping. The cancel button 625 is an instruction icon for returning to the clipping editing screen without saving the VR image in the present clipping region.

In S505 and 5506, the CPU 201 changes the display region in accordance with a touch-move with respect to the region where the VR image 602 is displayed. Details of the processing are similar to that in S305 and S306 shown in FIG. 3 described earlier. As described earlier, when the display region changes, the display position of the pointer 621 on the display 205 also changes. Even when the display region of a VR image changes, a relative positional relationship of the pointer 621 with respect to the VR image does not change.

FIG. 6F shows a display example in a case where the display region is changed by a leftward touch-move from the state shown in FIG. 6E. The display region of the VR image 602 has been changed and, in accordance therewith, the angle information 608 as well as the regions indicated by the display region 605 and the non-display region 606 out of the display direction guide have also been changed. Out of the display direction guide, a portion of the excluded region included in the display region is identifiably displayed by a pattern 626. The VR image 602 has been scrolled so as to move to the left as compared to FIG. 6E, and a right-side region in the VR image has been newly made a display region as compared to the state shown in FIG. 6E. In other words, the display region has moved to the right. In the example shown in FIG. 6F, as is apparent from the angle information 608 and the display direction guide, the display region has been changed to a direction facing approximately 90 degrees rightward as compared to the display region shown in FIG. 6E. Since clipping is performed in a 180-degree region centered on the position indicated by the pointer 621, an excluded region 630 starts to appear within the display region. The excluded region 630 need only be identifiable as a region in which a valid view region is not present and may be displayed in monochrome or in a display mode such as a prescribed pattern or gradation. It can be confirmed that, in FIG. 6F, the vehicle passing in an orientation where the license plate is visible which has been described with reference to FIG. 6C as an example of an object that the user wishes to exclude from the image after clipping has been excluded as the excluded region 630 and is not included in the VR image after clipping.

FIG. 6G shows a display example in a case where the display region is changed by a further leftward touch-move from the state shown in FIG. 6F. The display region of the VR image 602 has been changed and, in accordance therewith, the angle information 608 as well as the regions indicated by the display direction guide have also been changed. In the example shown in FIG. 6G as is apparent from the angle information 608 and the display direction guide, the display region has been changed to a direction facing approximately directly behind (180 degrees rightward) as compared to the display region shown in FIG. 6E. The VR image 602 is not included inside the display region and the excluded region 630 occupies the entire display region. It can be confirmed that, in FIG. 6G the photographer himself/herself which has been described with reference to FIG. 6D as an example of an object that the user wishes to exclude from the image after clipping has been excluded as the excluded region 630 and is not included in the VR image after clipping.

Figure 7B:
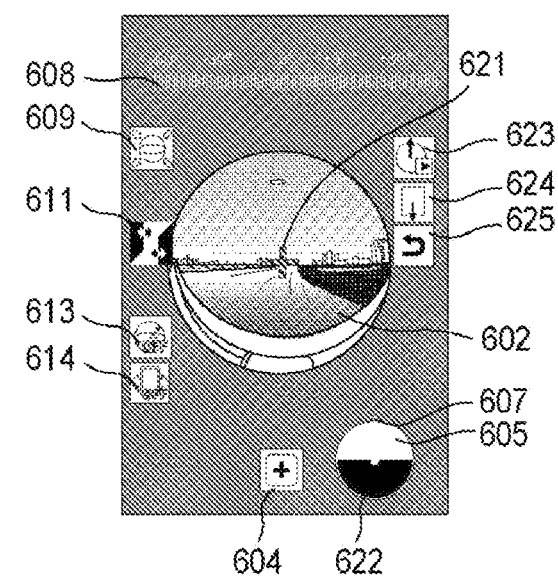

Since the processing of S507 to S515 is change processing of a display region in accordance with an orientation change, change processing of a display magnification in accordance with a pinch operation, and display processing at a hemisphere magnification in accordance with a whole hemisphere instruction and are similar to the processing of S404 to S412 shown in FIG. 4 described earlier, a description thereof will be omitted. It should be noted that, in the whole hemisphere display in S514, unlike the whole hemisphere display in S411, the excluded region (a portion indicated by the hatched portion 702 in FIG. 7A) is not displayed. FIG. 7B shows a display example of whole hemisphere display on the preview screen. In order to display only a valid view region of the VR image after clipping with the exception of the excluded region, the portion indicated by the hatched portion 702 in FIG. 7A is not displayed. In other words, in the VR image prior to clipping, the outside of the valid view region after the clipping is hidden. Due to such display, the user can confirm, within a single screen, what kind of objects are positioned in a central portion of the VR image after clipping and how much of the objects are included in the clipping region. When a touch operation with respect to the clipping button 604 is performed in the display state shown in FIG. 7A, a transition is made to the display state shown in FIG. 7B. A transition to the display state shown in FIG. 7B is also made when a touch operation with respect to the whole hemisphere display button 609 is performed in the display states shown in FIGS. 6E to 6G.

Since S516 and S517 include processing in accordance with a touch operation with respect to the end fine adjustment button 611 and are similar to the processing of S415 and S416 described earlier, a description thereof will be omitted.

Since S518 to S521 include processing in accordance with a touch operation with respect to the elevation/depression angle enable/disable button 613 and are similar to the processing of S419 to S422 described earlier, a description thereof will be omitted. When the setting is switched from elevation/depression angle-enabled to elevation/depression angle-disabled in S520, the CPU 201 advances to S503 and changes the clipping region. When the CPU 201 advances to S503 from S520, instead of setting the clipping region on the basis of the display region at that time point, the clipping region is set on the basis of the display region upon performing an operation of the clipping button 604 which had caused the clipping region at the time point of S520 to be determined. In other words, a 180-degree region (a region of a hemisphere) is clipped from a 360-degree VR image (a region of a sphere) so that an elevation/depression angle at the center of the clipping region becomes a horizontal direction while maintaining an orientation of the center of the clipping region at the time point of S520. In addition, when the setting is switched from elevation/depression angle-disabled to elevation/depression angle-enabled in S521, the CPU 201 advances to S502 and changes the clipping region. When the CPU 201 advances to S502 from S521, instead of setting the clipping region on the basis of the display region at that time point, the clipping region is set on the basis of the display region upon performing an operation of the clipping button 604 which had caused the clipping region at the time point of S521 to be determined. In other words, a 180-degree VR image is clipped from a 360-degree VR image so that an elevation/depression angle at the center of the clipping region becomes the elevation/depression angle of the display region upon operation of the clipping button 604 which had caused the clipping region at the time point of S521 to be determined while maintaining an orientation of the center of the clipping region at the time point of S521.

Since the processing of S522 and 5523 is processing in accordance with a touch operation with respect to the orientation detection ON/OFF button 614 and are similar to the processing of S423 and S424 described earlier, a description thereof will be omitted.

In S524, on the basis of information notified from the touch panel 206*a*, the CPU 201 determines whether or not a touch operation with respect to the reproduction start direction designation button 623 has been performed. When a touch operation with respect to the reproduction start direction designation button 623 has been performed, the CPU 201 advances to S525, but otherwise the CPU 201 advances to S526. In S525, the CPU 201 determines a center of the present display region as a display start direction of the VR image after clipping, and records positional information indicating the center of the present display region in the VR image in the memory 202. The positional information is recorded as information indicating a display start direction in attribute information of an image file of the clipped VR image in S535 to be described later.

In S526, on the basis of information notified from the touch panel 206*a*, the CPU 201 determines whether or not a touch operation with respect to the clipping button 604 has been performed. When a touch operation designating the clipping button 604 has been performed, the CPU 201 advances to S527, but otherwise the CPU 201 advances to S532.

In S527, the CPU 201 determines whether or not an unnecessary portion has been registered by unnecessary portion designation processing to be described later. When an unnecessary portion is registered, the CPU 201 advances to S528, but when an unnecessary portion is not registered, the CPU 201 advances to S501. Next, the CPU 201 advances to S502 or S503 from S501 and changes a clipping region on the basis of the display region at the time point where a determination is made in S526 that a touch operation has been performed with respect to the clipping button 604. In this manner, in the present embodiment, when desiring to change the clipping region on the preview screen, by performing a touch operation with respect to the clipping button 604, the clipping region can be corrected on the basis of the display region at that time point or, more specifically, a position of the center of the display region at that time point. When clipping is performed once again in S502 or S503, the preview screen is updated in S504 so as to indicate a corrected clipping region. Alternatively, the preview screen may be configured so that the clipping region cannot be corrected on the preview screen. In this case, the clipping button 604 is hidden or displayed in a display mode indicating inoperability such as grayout and the determination of S526 is not performed. Even so, when the user desires to change the clipping region while looking at the preview screen, the user can change the clipping region by performing a touch operation with respect to the cancel button 625 and re-designating the clipping region after returning to the clipping editing screen. Since the processing of S528 to S531 is processing in a case where an unnecessary portion is registered and are similar to the processing in S1215 to S1218 shown in FIG. 12 to be described later, details thereof will be omitted.

In S532, on the basis of information notified from the touch panel 206*a*, the CPU 201 determines whether or not a touch operation with respect to the cancel button 625 has been performed. When a touch operation with respect to the cancel button 625 has been performed, the CPU 201 advances to S533 and returns to the clipping editing processing (the clipping editing screen) described earlier with reference to FIG. 4. When a touch operation with respect to the cancel button 625 has not been performed, the CPU 201 advances to S534.

In S534, on the basis of information notified from the touch panel 206*a*, the CPU 201 determines whether or not a touch operation with respect to the save button 624 has been performed. When a touch operation with respect to the save button 624 has been performed, the CPU 201 advances to S535, but otherwise the CPU 201 advances to S505 and repeats the processing.

In S535, the CPU 201 generates an image file that can be displayed in a VR view from the VR image having already been clipped in the clipping region confirmed on the preview screen, and records the generated image file in the recording medium 208. In this case, it is assumed that an image on which the clipping processing has been performed in S502 or S503 from a 360-degree VR image prior to clipping and which is held in the memory 202 or the recording medium 208 is recorded as an image file. Alternatively, a 180-degree VR image may be once again clipped from a 360-degree VR image prior to clipping at the time point of S535 by controlling the image processing unit 204 and the clipped 180-degree VR image may be recorded. In addition, it is assumed that the image file of the clipped VR image is recorded as a newly saved file. Alternatively, the image file of the clipped VR image may be saved by being overwritten on the image file of the 360-degree VR image prior to clipping. The image file of the clipped VR image is recorded in a format that is compliant to VR 180 standards. Once the CPU 201 records the image file of the clipped VR image, the CPU 201 ends the processing shown in FIG. 5, returns to S301 shown in FIG. 3, and performs VR view display of the 360-degree VR image that is the clipping source. Alternatively, VR view display of the newly-saved clipped 180-degree VR image may be performed after ending the processing shown in FIG. 5.

Figure 18A:
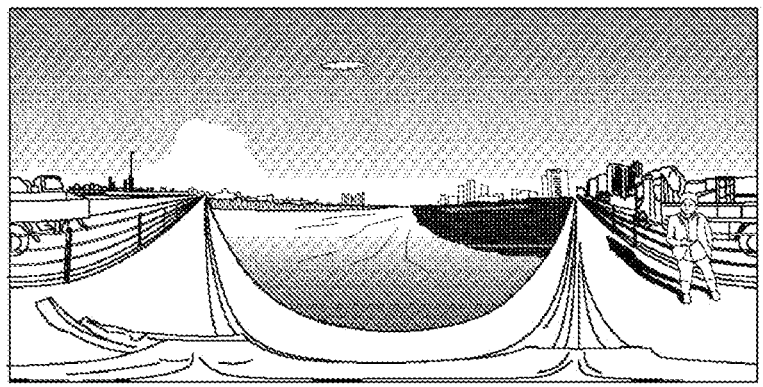
FIGS. 18A to 18D represent examples of various ways to display a VR image.
Figure 18B:
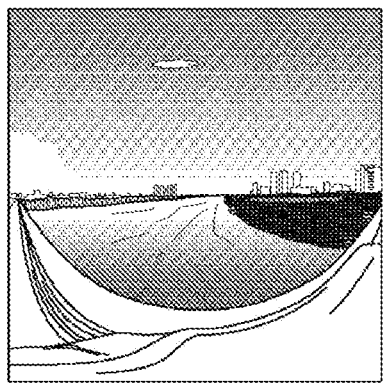
Figure 18C:
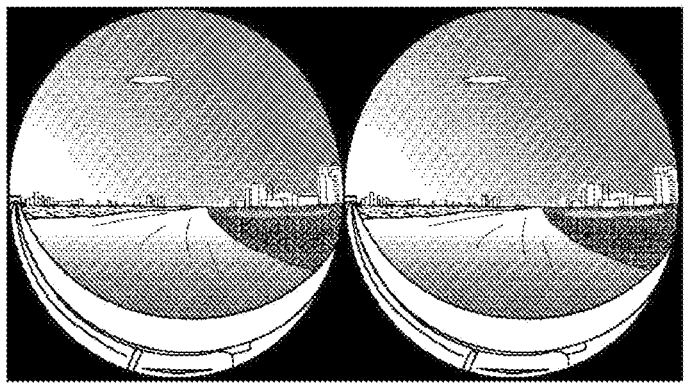
Figure 18D:
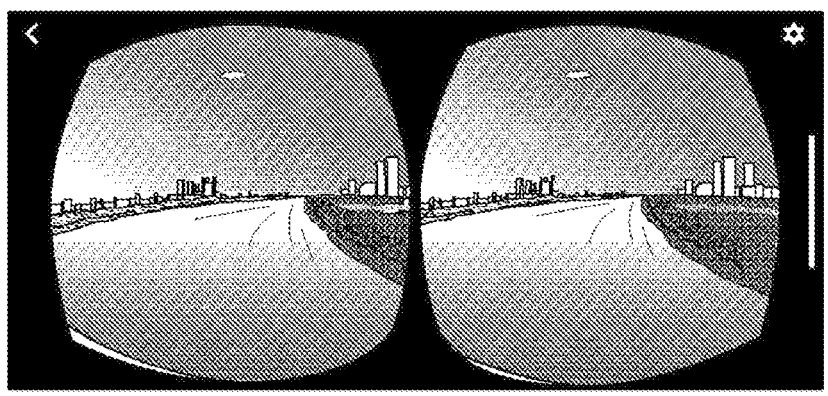

The clipped VR image (an image file that can be displayed in a VR view) to be recorded in S535 will be described. When the clipped VR image is a still image, a single file is generated and recorded, the single file storing, in a multi-picture format, a plurality of images created by deforming an image within a clipping region by equidistant cylindrical projection and fitting the deformed image into a rectangle. When a 360-degree VR image prior to clipping (an original image) is displayed as an ordinary planar image instead of a VR view, an image drawn by equidistant cylindrical projection in a rectangle such as that shown in FIG. 18A is obtained. When a 180-degree region is clipped from the original image by the processing described earlier, an image drawn by equidistant cylindrical projection in an approximate square such as that shown in FIG. 18B is recorded when the clipped 180-degree region is displayed as an ordinary planar image instead of a VR view. In doing so, two of a same image obtained by copying the image within the clipping region are respectively recorded in a same file as a right-eye image and a left-eye image even when there is no parallax. Alternatively, two 180-degree regions may be clipped and generated from one 360-degree VR image prior to clipping so as to have a pseudo-parallax (in other words, so that regions of the left-eye image and the right-eye image slightly differ from each other). Even in this case, the clipping region is determined on the basis of the display region upon performance of a touch operation of the clipping button 604. For example, a file name of a VR image of a clipped still image is "123456.vr.jpg" in which a character string made up of three characters ".vr" is described before the extension ".jpg". When an image saved as a still image file in this manner is reproduced and displayed in a VR view, the image shown in FIG. 18B is mapped onto a hemisphere and displayed. FIG. 18D shows an example in which a VR image file of a clipped still image is reproduced and displayed by a binocular VR view (a display example on the display 205 in a state where the display 205 is not mounted on VR goggles).

When the clipped VR image is a moving image, a moving image file is generated and recorded, the moving image file having videos (moving images) obtained by mapping the image within the clipping region to the inside of a circle or an ellipse instead of equidistant cylindrical projection and being arranged horizontally (side by side) inside the video of a single moving image. In doing so, two of a same image obtained by copying the image within the clipping region are respectively arranged horizontally and recorded as a right-eye image and a left-eye image even when there is no parallax. When such a moving image is displayed as an ordinary planar image instead of a VR view, the moving image is displayed as shown in FIG. 18C. Alternatively, two 180-degree regions may be clipped and generated from one 360-degree VR image prior to clipping so as to have a pseudo-parallax (in other words, so that regions of the left-eye image and the right-eye image slightly differ from each other). Even in this case, the clipping region is determined on the basis of the display region upon performance of a touch operation of the clipping button 604. For example, a file name of a VR image of a clipped moving image is "123456.vr.mp4" in which a character string made up of three characters ".vr" is described before the extension ".mp4". A display example of a given frame of a VR image file of a clipped moving image when reproduced and displayed in a binocular VR view (a display example on the display 205 in a state where the display 205 is not mounted on VR goggles) is similar to the example shown in FIG. 18D.

Figure 8:
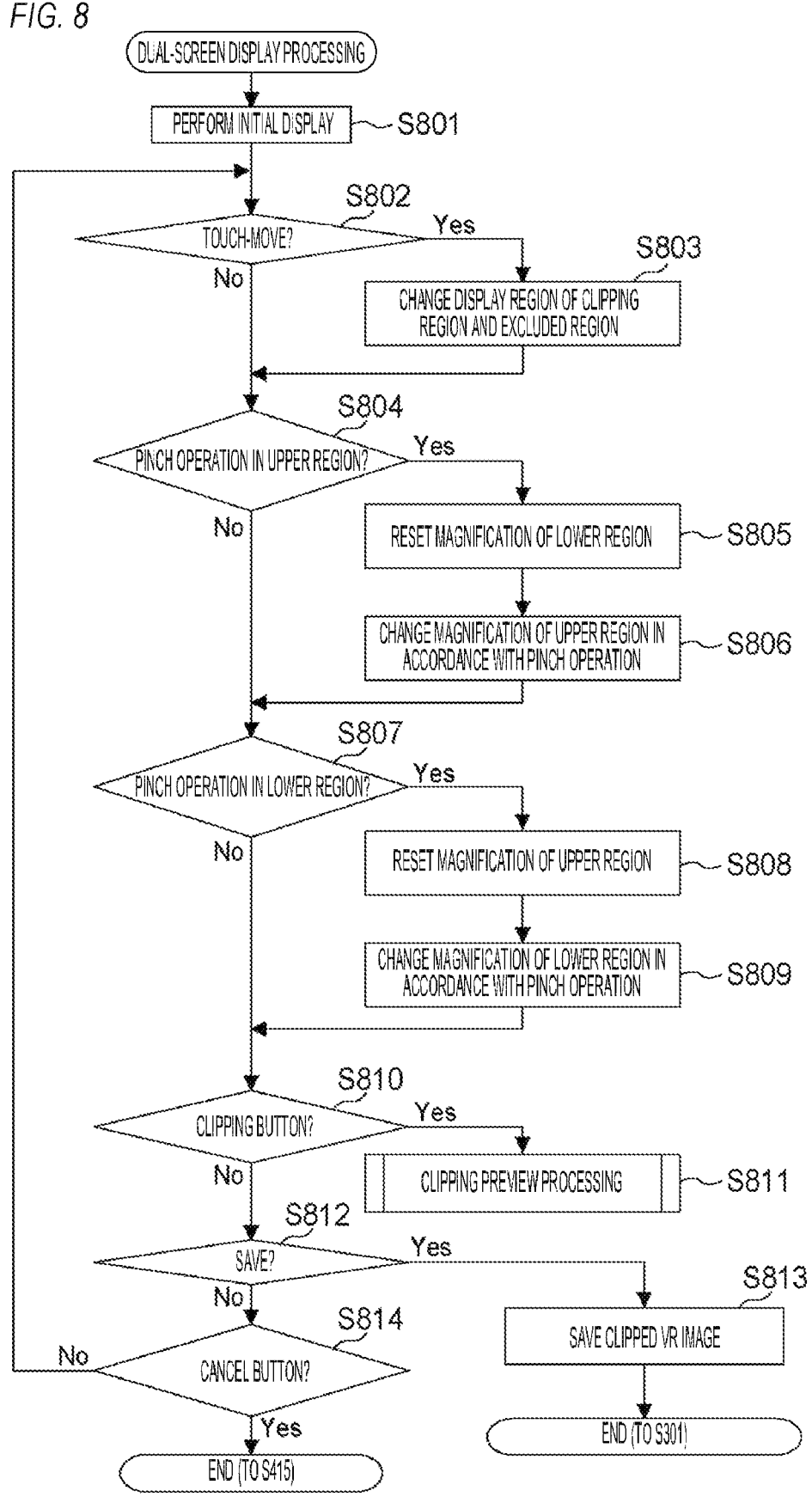
FIG. 8 is a flow chart of a dual-screen display processing.

FIG. 8 shows a flow chart of the dual-screen display processing described earlier with reference to S414 shown in FIG. 4. This processing is realized as the CPU 201 deploys a program recorded in the nonvolatile memory 203 on the memory 202 and executes the program.

Figure 9A:
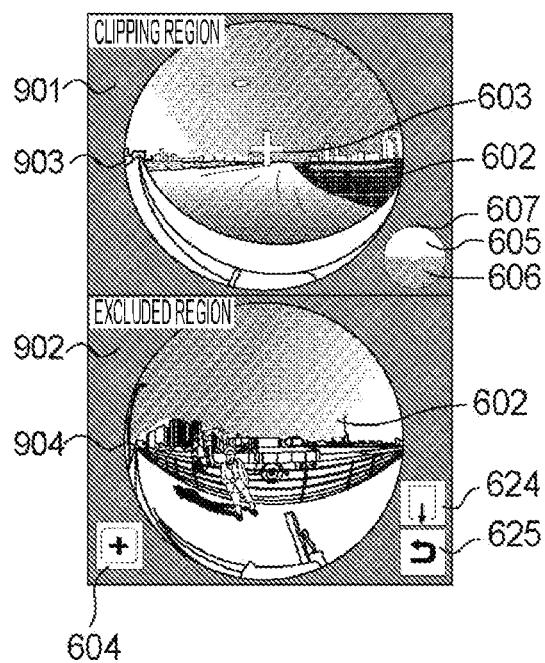
FIGS. 9A and 9B represent an example of dual-screen display.

In S801, the CPU 201 performs initial display of the dual-screen display on the display 205. FIG. 9A shows a display example of the initial display of the dual-screen display on the display 205. A display screen of the dual-screen display is divided into an upper region 901 which displays the inside of a clipping region 903 in the VR image 602 and a lower region 902 which displays the inside of an excluded region 904 in the VR image 602. In the initial display, a distorted circular image is displayed in a circular display region of the upper region 901 so that an entirety of the clipping region fits inside the display region. This display region is a similar display region to the whole hemisphere display described with reference to FIG. 7B. In addition, in the initial display, a distorted circular image is displayed in a circular display region of the lower region 902 so that an entirety of the excluded region fits inside the display region. This display region corresponds to a region of a hemisphere to be discarded after clipping. Other display items with the same reference numerals as the display items described earlier are similar to such display items. By viewing a screen on which the entire clipping region and the entire excluded region are simultaneously displayed in this manner, the user can readily confirm what kind of objects are included in the clipping region after clipping and what kind of objects are included in the excluded region after clipping in the 360-degree VR image prior to the clipping. At a display magnification larger than whole hemisphere display in a VR view of a normal clipping editing screen, since only a part within the clipping region is displayed and the display region is always at the center of the clipping region, a boundary between the clipping region and the excluded region is not displayed. Therefore, the boundary cannot be confirmed. In addition, at a display magnification larger than whole hemisphere display on a preview screen, since only a part within the clipping region is displayed, only a portion of the boundary between the clipping region and the excluded region can be confirmed. When the clipping region is adjusted by only viewing a portion of the boundary, situations may occur where, for example, even if a desired portion is fitted inside the clipping region at the displayed boundary, the object to be fitted ends up overstepping the clipping region near a boundary that is not displayed. In order to confirm whether or not the desired portion is fitted into the clipping region near all boundaries, the display region must be changed a plurality of times or by a large amount. On the other hand, with dual-screen display such as that shown in FIG. 9A, the user can confirm the entire clipping region and the entire excluded region without changing the display region. Furthermore, the user can adjust the clipping region and the excluded region by a touch-move while performing such confirmations. Therefore, mistakes can be prevented such as including, in the excluded region, an object that should be included in the clipping region while being oblivious to the presence of the object or including, in the clipping region, an object that should be excluded from the clipping region while being oblivious to the presence of the object. With respect to the excluded region displayed in the lower region 902, a semi-transparent mask of a prescribed color, color conversion such as displaying in monochrome or sepia, screening, or the like may be applied in order to make it easier to understand that the excluded region is a portion to be discarded after clipping.

In S802, the CPU 201 determines whether or not a touch-move (a view region change operation) has been performed in the upper region 901 or the lower region 902. When the CPU 201 determines that a touch-move has been performed, the CPU 201 advances to S803, but otherwise the CPU 201 advances to S804. In S803, the CPU 201 respectively changes a portion to become the clipping region and a portion to become the excluded region in the VR image 602. Specifically, the CPU 201 changes, in accordance with a movement of a touch position, the display region of the VR image 602 displayed in one region in which the touch-move had been performed out of the upper region 901 and the lower region 902. At this point, when the setting is elevation/depression angle-enabled, the display region is changed in accordance with both a lateral movement component and a vertical movement component of the touch-move. When the setting is elevation/depression angle-disabled, although the display region is moved in accordance with the lateral movement component of the touch-move, the display region is not moved in accordance with the vertical movement component, the pointer 603 always indicates an elevation/depression angle of 0 degrees (the horizontal direction), and the display region does not move upward or downward. In addition, the display region of the VR image 602 displayed in the other region is changed in conjunction with the change to the display region in the region where the touch-move had been performed in the VR image 602 and is adopted as an opposite-side hemisphere portion that is not the display region in the region where the touch-move had been performed. Accordingly, a relative position of the pointer 603 (a center position of the upper region) displayed at a fixed position on the display 205 (a prescribed position on the screen of the display 205) with respect to the VR image 602 changes. The CPU 201 sets the region of the hemisphere centered on the position corresponding to the pointer 603 in the VR image 602 as the clipping region.

In S804, the CPU 201 determines whether or not a pinch operation has been performed in the upper region 901. When the CPU 201 determines that a pinch operation has been performed in the upper region 901, the CPU 201 advances to S805, but otherwise the CPU 201 advances to S807. In S805, when the image of the excluded region in the lower region 902 is enlarged or reduced in S809 to be described later as compared to the initial display in S801, the CPU 201 resets the display magnification of the image of the excluded region to a magnification that enables the entire excluded region to be displayed or, in other words, the magnification of the initial display. In S806, the CPU 201 changes the display magnification of the image of the portion of the clipping region in the VR image 602 which is displayed in the upper region 901 in accordance with the pinch operation performed in the upper region 901 and displays the image by enlarging or reducing the image. Displaying an enlarged image of the clipping region enables the user to confirm details of objects included in the clipping region.

In S807, the CPU 201 determines whether or not a pinch operation has been performed in the lower region 902. When the CPU 201 determines that a pinch operation has been performed in the lower region 902, the CPU 201 advances to S808, but otherwise the CPU 201 advances to S810. In S808, when the image of the clipping region in the upper region 901 is enlarged or reduced in S806 described earlier as compared to the initial display in S801, the CPU 201 resets the display magnification of the image of the clipping region to a magnification that enables the entire clipping region to be displayed or, in other words, the magnification of the initial display. In S809, the CPU 201 changes the display magnification of the image of the portion of the excluded region in the VR image 602 which is displayed in the lower region 902 in accordance with the pinch operation performed in the lower region 902 and displays the image by enlarging or reducing the image. Displaying an enlarged image of the excluded region enables the user to confirm details of objects included in the excluded region.

Figure 9B:
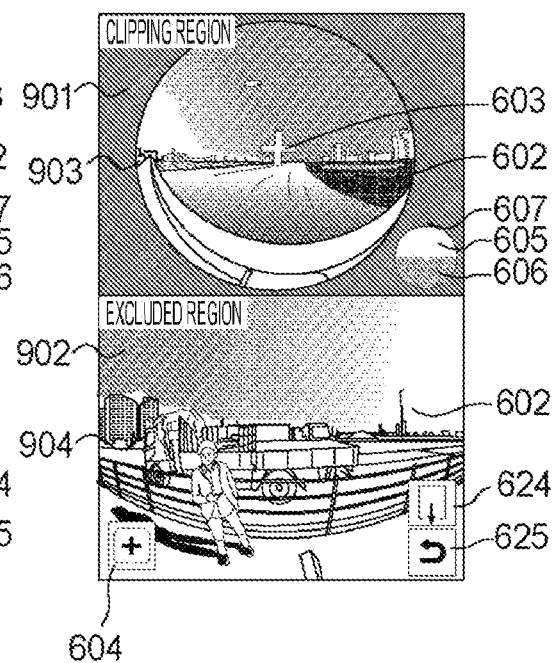

FIG. 9B shows a display example in a case where the image displayed in the lower region 902 is enlarged in accordance with a pinch-out performed in the lower region 902. Although the region displayed in the lower region 902 is only a part of the excluded region and not the entire excluded region, since the region is enlarged as compared to the initial display shown in FIG. 9A, an appearance of the objects can be more readily confirmed. When a pinch operation is performed in the upper region 901 from this state, the display magnification is reset in the processing of S805 and the display magnification in the lower region 902 is restored to the display magnification of the initial display shown in FIG. 9A. In this manner, by performing display at a display magnification that ensures one of the clipping region and the excluded region is included in its entirety, the boundary portion between the clipping region and the excluded region can be inevitably confirmed in one of the distorted circular images.

It should be noted that the change in magnification in accordance with a pinch operation in the dual-screen display processing of S804 to S809 only involves changing the display magnification and does not change the clipping region. In other words, a relative positional relationship of the pointer 603 with respect to the VR image 602 does not change.

In S810, the CPU 201 determines whether or not a touch operation with respect to the clipping button 604 has been performed. When a touch operation designating the clipping button 604 has been performed, the CPU 201 advances to S811 and performs the clipping preview processing shown in FIG. 5 described earlier. In this case, in a first performance of S502 or S503 in the clipping preview processing, the CPU 201 performs clipping so that a center of the display region that is displayed in the upper region 901 (the position indicated by the pointer 603) at a time point where the clipping button 604 is touched becomes the center of the clipping region. It should be noted that, when an unnecessary portion is registered, processing similar to S426 to S431 shown in FIG. 4 described earlier may be performed.

In S812, the CPU 201 determines whether or not a touch operation with respect to the save button 624 has been performed. When a touch operation designating the save button 624 has been performed, the CPU 201 advances to S813, but otherwise the CPU 201 advances to S814. In S813, the CPU 201 performs clipping so that a center of the display region that is displayed in the upper region 901 (the position indicated by the pointer 603) at a time point where the save button 624 is touched becomes the center of the clipping region. More specifically, the CPU 201 clips a 180-degree region (a region of respectively 90 degrees in all directions from center) centered on the center of the display region in the upper region 901 from a 360-degree VR image. In addition, the CPU 201 records the clipped VR image as an image file that can be displayed in a VR view in the recording medium 208. The recording processing after clipping is processing similar to that of S535 described earlier. Once the processing of S813 ends, the CPU 201 ends the dual-screen display processing and returns to S301 shown in FIG. 3.

In S814, the CPU 201 determines whether or not a touch operation with respect to the cancel button 625 has been performed. When a touch operation with respect to the cancel button 625 has been performed, the CPU 201 ends the dual-screen display processing, returns to S415, and displays the clipping editing screen. In doing so, the display region (the relative positional relationship of the pointer 603 with respect to the VR image 602) adjusted in the dual-screen display processing is handed over to the clipping editing screen. When a touch operation with respect to the cancel button 625 has not been performed, the CPU 201 returns to S802 and repeats the processing.

While the dual-screen display processing has been described as processing to be performed when the user performs a touch operation with respect to the dual-screen confirmation button 610 on the clipping editing screen, dual-screen display as a preview display of the clipping region may be performed in accordance with an issuance of a provisional setting instruction of the clipping region. For example, the dual-screen display processing shown in FIG. 8 may be performed instead of the clipping preview processing shown in FIG. 5 in accordance with a performance of a touch operation of the clipping button 604 in S425 shown in FIG. 4.

Figure 10:
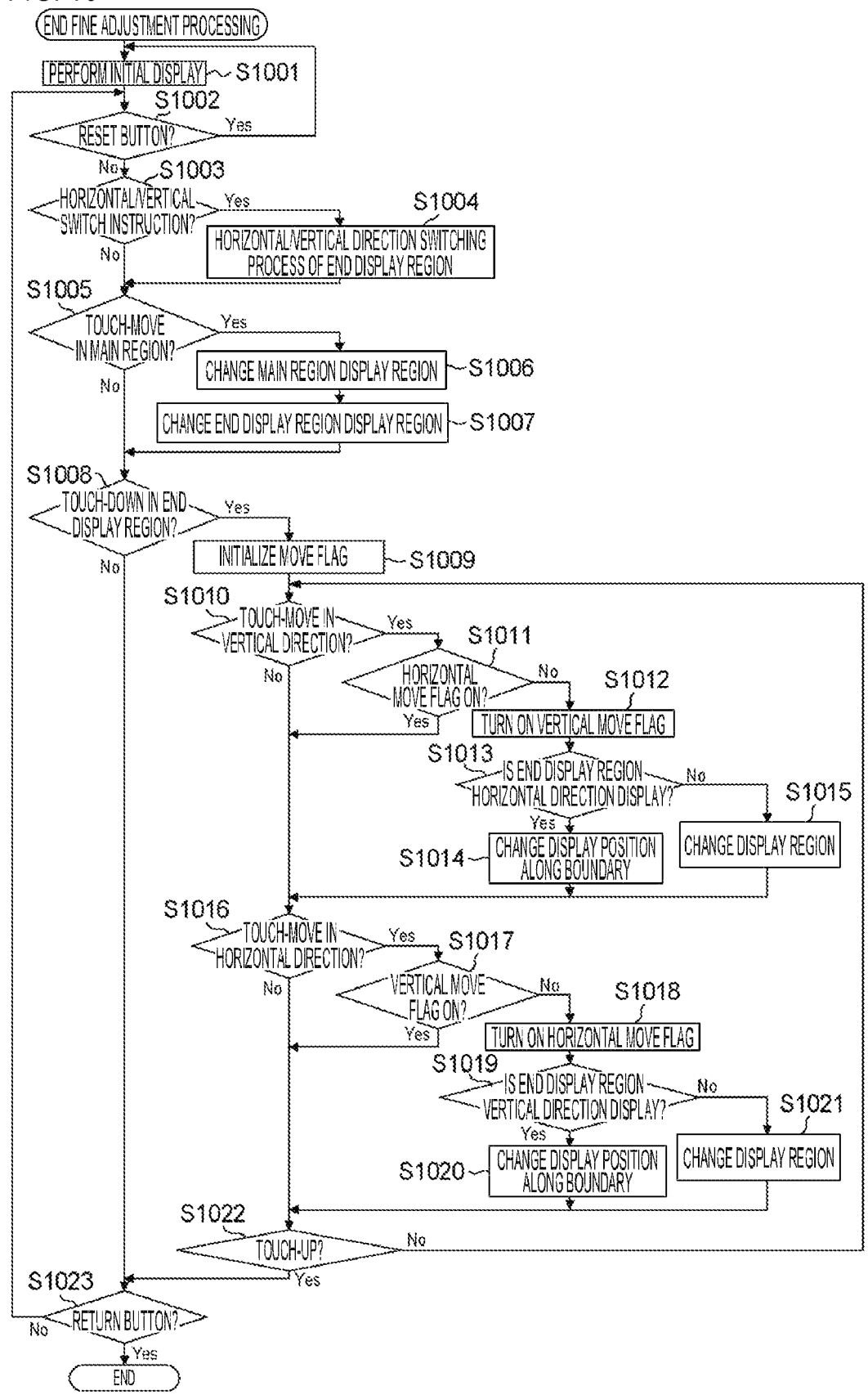
FIG. 10 is a flow chart of an end fine adjustment processing.

FIG. 10 shows a flow chart of the end fine adjustment processing of S416 shown in FIGS. 4 and S517 shown in FIG. 5 described earlier. This processing is realized as the CPU 201 deploys a program recorded in the nonvolatile memory 203 on the memory 202 and executes the program. The end fine adjustment processing shown in FIG. 10 is processing performed by the user to finely adjust the clipping region by enlarging and displaying a vicinity of the boundary between the clipping region and the excluded region of a VR image.

In S1001, the CPU 201 performs initial display of an end fine adjustment screen for clipping an image from a VR view.

Figure 11A:
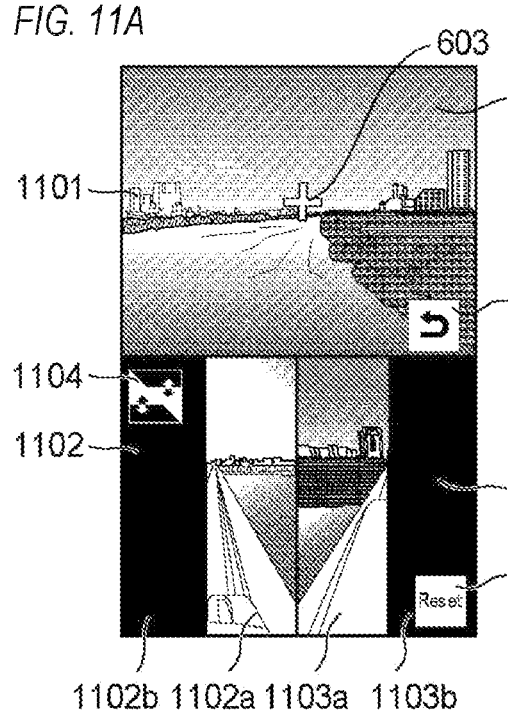
FIGS. 11A to 11D represent an example of an end fine adjustment screen.

FIG. 11A shows a display example of the end fine adjustment screen that is displayed on the display 205 immediately after a transition is made to the end fine adjustment processing. FIG. 11A represents an example of horizontal direction display out of two types of end fine adjustment screens, namely, horizontal direction display and vertical direction display. A main region 1101 displays a central portion of the clipping region which is part of the same VR image 602 having been displayed on the clipping editing screen or the preview screen. In the main region 1101, since the VR image 602 is displayed at a display magnification that does not distort a peripheral portion, an end of the clipping region (the boundary between the clipping region and the excluded region) is not displayed. The pointer 603 is displayed at a fixed position in the main region 1101 (a center of the main region 1101). A display position of a VR image in the background is determined so that the pointer 603 is at a same position with respect to the VR image as the position where the pointer 603 had been displayed on the clipping editing screen. By looking at the main region 1101, the user can confirm what is being portrayed at the center of the clipping region. A left-side region 1102 and a right-side region 1103 which are end display regions are displayed side by side below the main region 1101. The left-side region 1102 and the right-side region 1103 display a portion including the boundary between the clipping region and the excluded region in the clipping region.

The left-side region 1102 displays a partial boundary portion in the clipping region (a region of a part including the end of the clipping region). A left-side boundary portion at a vertical position indicated by the pointer 603 (a position of an elevation/depression angle indicated by the pointer 603) is displayed during initial display and immediately after reset. The left-side region 1102 displays an image region 1102*a* indicating the inside of the clipping region and an excluded region 1102*b* indicating the outside of the clipping region (the inside of the excluded region) divided horizontally and adjacent to each other, and enables a state of the boundary between the clipping region and the excluded region to be confirmed. A positional relationship between the image region 1102*a* and the excluded region 1102*b* in the left-side region 1102 is fixed and remains unchanged even when a touch-move to be described later is performed.

The right-side region 1103 displays a partial boundary portion 180 degrees opposite to the region displayed in the left-side region 1102 in the clipping region (a boundary portion that is discontinuous to the region displayed in the left-side region 1102). A right-side boundary portion at the vertical position indicated by the pointer 603 (the position of the elevation/depression angle indicated by the pointer 603) is displayed during initial display and immediately after reset. The right-side region 1103 displays an image region 1103*a* indicating the inside of the clipping region and an excluded region 1103*b* indicating the outside of the clipping region (the inside of the excluded region) divided horizontally and adjacent to each other, and enables a state of the boundary between the clipping region and the excluded region to be confirmed. A positional relationship between the image region 1103*a* and the excluded region 1103*b* in the right-side region 1103 is fixed and remains unchanged even when a touch-move to be described later is performed. In other words, even when the position of the clipping region in the VR image prior to clipping is changed in accordance with a user operation, positions corresponding to ends of the clipping region on the display 205 are not changed. The positions corresponding to ends of the clipping region on the display 205 are a boundary position between the image region 1103*a* and the excluded region 1103*b* and a boundary position between the image region 1102*a* and the excluded region 1102*b*.

For example, when the user desires to make a roadway portion an excluded region and to fit a sidewalk portion into a clipping region in the VR image 602, by viewing such a display, the user can perform fine adjustment of the clipping region in a preferable manner by readily confirming whether or not the desired portion is fitted inside the clipping region. At a display magnification larger than whole hemisphere display in a VR view of a normal clipping editing screen, since only a part within the clipping region is displayed and the display region is always at the center of the clipping region, a boundary between the clipping region and the excluded region is not displayed. Therefore, the boundary cannot be confirmed. In addition, at a display magnification larger than whole hemisphere display on a preview screen, since only a part within the clipping region is displayed, only one location of the boundary between the clipping region and the excluded region can be confirmed. When the clipping region is adjusted by only viewing one location of the boundary, situations may occur where, for example, even if a desired portion is fitted inside the clipping region at the displayed boundary, the object to be fitted ends up overstepping the clipping region near another boundary. In order to confirm whether or not the desired portion is fitted into the clipping region near both boundaries, the display region must be changed a plurality of times or by a large amount. On the other hand, on an end fine adjustment screen such as that shown in FIG. 11A, the user can confirm whether or not a desired portion is fitted within the clipping region by confirming the boundaries between the clipping region and the excluded region without changing the display region. Furthermore, on an end fine adjustment screen such as that shown in FIG. 11A, the user can simultaneously confirm a plurality of boundary portions (the boundary portions at both ends), and the user can confirm whether or not a desired portion is fitted within the clipping region in a short period of time or by a small number of operations.

A horizontal/vertical switch button 1104 which is a touch icon is displayed in an upper left part of the left-side region 1102 (an upper part of the excluded region 1102*b*). By displaying the horizontal/vertical switch button 1104 at this position, visibility of a video within the clipping region displayed in the image region 1102*a* is not impeded. In addition, even when switching between horizontal direction display and vertical direction display, the display position of the horizontal/vertical switch button 1104 is not changed and the horizontal/vertical switch button 1104 is displayed at a position where visibility of a video within the clipping region after the switch is not impeded. Alternatively, the horizontal/vertical switch button 1104 may be displayed in a lower right part of the right-side region 1103 (a lower part of the excluded region 1103*b*). Even at this position, the horizontal/vertical switch button 1104 can be displayed in both horizontal direction display and vertical direction display without impeding the visibility of the video within the clipping region. Furthermore, a reset button 1105 which is a touch icon is displayed in the lower right part of the right-side region 1103 (the lower part of the excluded region 1103*b*). At this position, the reset button 1105 can be displayed in both horizontal direction display and vertical direction display without impeding the visibility of the video within the clipping region. Alternatively, the reset button 1105 may be displayed in the upper left part of the left-side region 1102 (the upper part of the excluded region 1102*b*) by a similar reason to that described above.

Figure 11B:
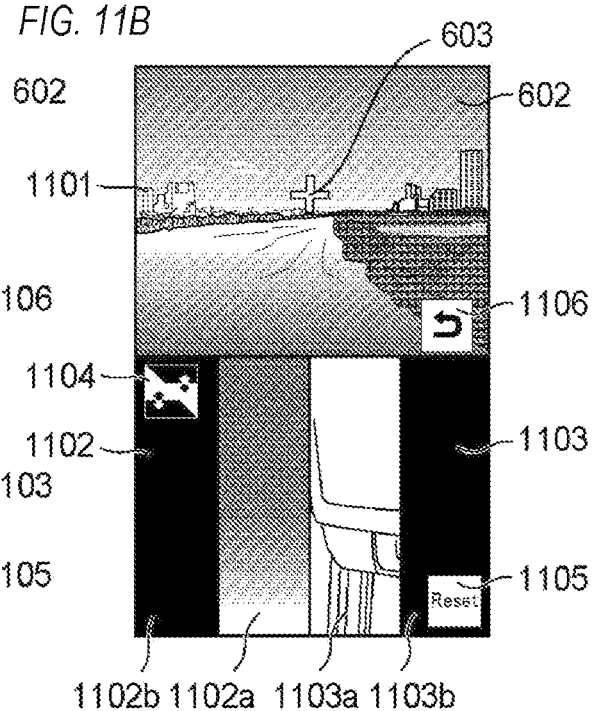
Figure 11C:
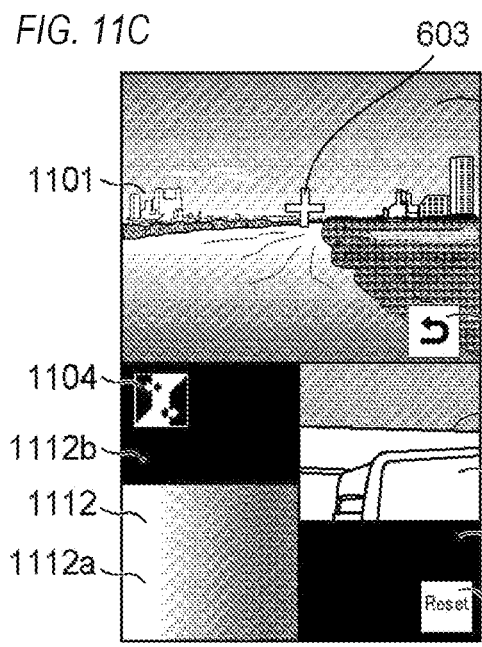

FIG. 11C represents a display example of the vertical direction display out of the two types of end fine adjustment screens, namely, the horizontal direction display and the vertical direction display. A display content of the main region 1101 is similar to that of the horizontal direction display. A left-side region 1112 and a right-side region 1113 which are end display regions are displayed side by side below the main region 1101. The left-side region 1112 and the right-side region 1113 display a portion including the boundary between the clipping region and the excluded region in the clipping region.

The left-side region 1112 displays a partial boundary portion in the clipping region. An upper-side boundary portion at the horizontal position indicated by the pointer 603 (the position of the azimuth indicated by the pointer 603) is displayed during initial display and immediately after reset. The left-side region 1112 displays an image region 1112*a* indicating the inside of the clipping region and an excluded region 1112*b* indicating the outside of the clipping region (the inside of the excluded region) divided vertically and adjacent to each other, and enables a state of the boundary between the clipping region and the excluded region to be confirmed. A positional relationship between the image region 1112*a* and the excluded region 1112*b* in the left-side region 1112 is fixed and remains unchanged even when a touch-move to be described later is performed.

The right-side region 1113 displays a partial boundary portion 180 degrees opposite to the region displayed in the left-side region 1112 in the clipping region. A lower-side boundary portion at the horizontal position indicated by the pointer 603 (the position of the azimuth indicated by the pointer 603) is displayed during initial display and immediately after reset. The right-side region 1113 displays an image region 1113*a* indicating the inside of the clipping region and an excluded region 1113*b* indicating the outside of the clipping region (the inside of the excluded region) divided vertically and adjacent to each other, and enables a state of the boundary between the clipping region and the excluded region to be confirmed. A positional relationship between the image region 1113*a* and the excluded region 1113*b* in the right-side region 1113 is fixed and remains unchanged even when a touch-move to be described later is performed.

A horizontal/vertical switch button 1104 which is a touch icon is displayed in an upper left part of the left-side region 1112 (an upper part of the excluded region 1112*b*). This display position is the same as that shown in FIG. 11A. This display position is a region where the excluded region 1102*b* shown in FIG. 11A and the excluded region 1112*b* shown in FIG. 11C overlap with each other. In addition, the reset button 1105 is displayed in a lower right part of the right-side region 1113 (a lower part of the excluded region 1113*b*). This display position is the same as that shown in FIG. 11A. This display position is a region where the excluded region 1103*b* shown in FIG. 11A and the excluded region 1113*b* shown in FIG. 11C overlap with each other.

In S1002, on the basis of information notified from the touch panel 206*a*, the CPU 201 determines whether or not a touch operation with respect to the reset button 1105 has been performed. When a touch operation designating the reset button 1105 has been performed, the CPU 201 advances to S1001 and restores the display position changed in S1014 or S1020 to be described later to the original display position. Due to the reset, a left boundary and a right boundary between upper and lower central portions of the clipping region are displayed in the case of horizontal direction display and an upper boundary and a lower boundary between left and right central portions of the clipping region are displayed in the case of vertical direction display. When a touch operation with respect to the reset button 1105 has not been performed, the CPU 201 advances to S1103.

In S1003, on the basis of information notified from the touch panel 206*a*, the CPU 201 determines whether or not a touch operation with respect to the horizontal/vertical switch button 1104 has been performed. When a touch operation designating the horizontal/vertical switch button 1104 has been performed, the CPU 201 advances to S1004, but otherwise the CPU 201 advances to S1005.

In S1004, when the end fine adjustment screen (the end display region) is horizontal direction display, the CPU 201 switches to vertical direction display, and when the end fine adjustment screen (the end display region) is vertical direction display, the CPU 201 switches to horizontal direction display. For example, when a touch operation with respect to the horizontal/vertical switch button 1104 is performed in a display state shown in FIG. 11A, the CPU 201 switches to the display shown in FIG. 11C. In addition, when a touch operation with respect to the horizontal/vertical switch button 1104 is performed in a display state shown in FIG. 11C, the CPU 201 switches to the display shown in FIG. 11A.

In S1005, on the basis of information notified from the touch panel 206*a*, the CPU 201 determines whether or not a touch-move has been performed in the main region 1101. More specifically, the CPU 201 determines whether or not a touch-down on the main region 1101 and a touch-move have been performed. When a touch-move originating in the main region 1101 has been performed, the CPU 201 advances to S1006, but otherwise the CPU 201 advances to S1008.

In S1006, the CPU 201 changes the display region of the VR image displayed in the main region 1101 in accordance with a slide operation by the touch-move. This processing is the same as the processing of S306 shown in FIG. 3 described earlier.

In S1007, in the case of horizontal direction display, the CPU 201 changes the display region of the VR image in the left-side region 1102 and the right-side region 1103 (in other words, portions to be displayed in the image region 1102*a* and the image region 1103*a*) in accordance with a slide operation by the touch-move. In the case of vertical direction display, the CPU 201 changes the display region of the VR image in the left-side region 1112 and the right-side region 1113 (in other words, portions to be displayed in the image region 1112*a* and the image region 1113*a*). This is because the clipping region is changed in accordance with the touch-move in the main region 1101 and the positional relationship between the clipping region and the excluded region in the VR image changes.

In S1008, on the basis of information notified from the touch panel 206*a*, the CPU 201 determines whether or not a touch-down with respect to any of the left-side region 1102, the right-side region 1103, the left-side region 1112, and the right-side region 1113 excluding the display region of the touch buttons has been performed. When a touch-down with respect to any of the left-side region 1102, the right-side region 1103, the left-side region 1112, and the right-side region 1113 excluding the display region of the touch buttons has been performed, the CPU 201 advances to S1009, but otherwise the CPU 201 advances to S1023.

In S1009, the CPU 201 clears (turns off) and initializes a move flag which is held in the memory 202 and which indicates a vertical touch-move or a horizontal touch-move.

In S1010, on the basis of information notified from the touch panel 206*a*, the CPU 201 determines whether or not a touch-move has been performed in the vertical direction of the display 205. For example, a determination that a touch-move has been performed in the vertical direction is made when, every time a touch-move of a unit movement amount is performed, a movement component in the vertical direction is larger than a movement component in the horizontal direction. When a touch-move has been performed in the vertical direction, the CPU 201 advances to S1011, but otherwise the CPU 201 advances to S1016.

In S1011, the CPU 201 determines whether or not a horizontal move flag which is held in the memory 202 and which indicates that a touch-move in the horizontal direction is under way has been turned on. When the CPU 201 determines that the horizontal move flag is turned on, since the movement component in the vertical direction is to be ignored, the CPU 201 advances to S1016. When the CPU 201 determines that the horizontal move flag is turned off, the CPU 201 advances to S1012.

In S1012, the CPU 201 sets a vertical move flag indicating that a touch-move in the vertical direction is under way to on (recorded in the memory 202 as on), and advances to S1013.

In S1013, the CPU 201 determines whether or not the present display mode is horizontal direction display out of horizontal direction display and vertical direction display of the end fine adjustment screen (the end display region). In the case of the horizontal direction display, the CPU 201 advances to S1014, but in the case of the vertical direction display, the CPU 201 advances to S1015.

In S1014, the CPU 201 updates a display position of the VR image in the left-side region 1102 and the right-side region 1103 along a boundary of the clipping region. This means that, when a hemisphere is designated as a clipping region in a sphere to which a 360-degree VR image has been mapped, the display region moves along a circular clipping boundary of the hemisphere. Therefore, the positional relationship between the clipping region and the excluded region in the VR image does not change but a region of the VR image displayed in the image region 1102a and a region of the VR image displayed in the image region 1103a change. The image region 1102a and the image region 1103a maintain a relationship such that, even when the display region changes, the image region 1102a and the image region 1103a display portions with clipping boundaries that differ from each other by 180 degrees. Therefore, when the user vertically performs a touch-move corresponding to 180 degrees, the user can confirm an entire region of a boundary of a currently set clipping region. Since the clipping region is not changed in the processing of S1014, the display content of the main region 1101 does not change.

FIG. 11B shows a display example of a case where a downward touch-move with respect to the left-side region 1102 is performed from the state shown in FIG. 11A and the left-side region 1102 is scrolled so as to move an image portion displayed in the image region 1102a downward (move the display region upward). The portion displayed in the left-side region 1102 moves along the boundary of the clipping region from the state shown in FIG. 11A where a boundary portion in the horizontal direction (a horizon direction) in a VR image has been displayed, and FIG. 11B shows a boundary portion in a sky direction being displayed in the left-side region 1102. A portion displayed in the right-side region 1103 is an image in a ground direction that is 180 degrees opposite to the sky direction displayed in the left-side region 1102 out of the boundary of the clipping region.

In S1015, the CPU 201 changes the display region of the VR image displayed in the image region 1112a and the image region 1113a in accordance with a vertical touch-move. This means that a position of the boundary of the clipping region with respect to the VR image prior to clipping moves in accordance with the vertical touch-move. Since an angle of the clipping region is maintained at 180 degrees, display regions of both the image region 1112a and the image region 1113a change regardless of from which position of the left-side region 1112 and the right-side region 1113 the vertical touch-move is performed. For example, when the display region of the image region 1112a changes due to a movement of the boundary in a direction that narrows the clipping region, the display region of the image region 1113a also changes due to a movement of the boundary in a direction that widens the clipping region so as to maintain the angle of the clipping region at 180 degrees. Accordingly, the clipping region changes and a region displayed in the main region 1101 also changes. The user can strictly adjust the clipping region by vertically performing a touch-move while confirming, in the vicinity of the boundary (the image region 1112a and the image region 1113a), how much of the VR image is to be included in the clipping region and how much of the VR image is to be included in the excluded region. In this processing, a width (180 degrees) of the clipping region does not change but a position of the clipping region in the VR image prior to clipping is changed.

In S1016, on the basis of information notified from the touch panel 206a, the CPU 201 determines whether or not a touch-move has been performed in the horizontal direction of the display 205. For example, a determination that a touch-move has been performed in the horizontal direction is made when, every time a touch-move of a unit movement amount is performed, a movement component in the horizontal direction is larger than a movement component in the vertical direction. When a touch-move has been performed in the horizontal direction, the CPU 201 advances to S1017, but otherwise the CPU 201 advances to S1022.

In S1017, the CPU 201 determines whether or not a vertical move flag which is held in the memory 202 and which indicates that a touch-move in the vertical direction is under way has been turned on. When the CPU 201 determines that the vertical move flag is turned on, since the movement component in the horizontal direction is to be ignored, the CPU 201 advances to S1022. When the CPU 201 determines that the vertical move flag is turned off, the CPU 201 advances to S1018.

In S1018, the CPU 201 sets a horizontal move flag indicating that a touch-move in the horizontal direction is under way to on (recorded in the memory 202 as on), and advances to S1019.

In S1019, the CPU 201 determines whether or not the present display mode is vertical direction display out of horizontal direction display and vertical direction display of the end fine adjustment screen (the end display region). In the case of the vertical direction display, the CPU 201 advances to S1020, but in the case of the horizontal direction display, the CPU 201 advances to S1021.

In S1020, the CPU 201 updates a display position of the VR image in the left-side region 1112 and the right-side region 1113 along a boundary of the clipping region. This processing is similar to S1014 described earlier. However, a display orientation of the VR image in the left-side region 1112 and the right-side region 1113 differs by 90 degrees from S1014. Since the clipping region is not changed in the processing of S1020, the display content of the main region 1101 does not change.

Figure 11D:
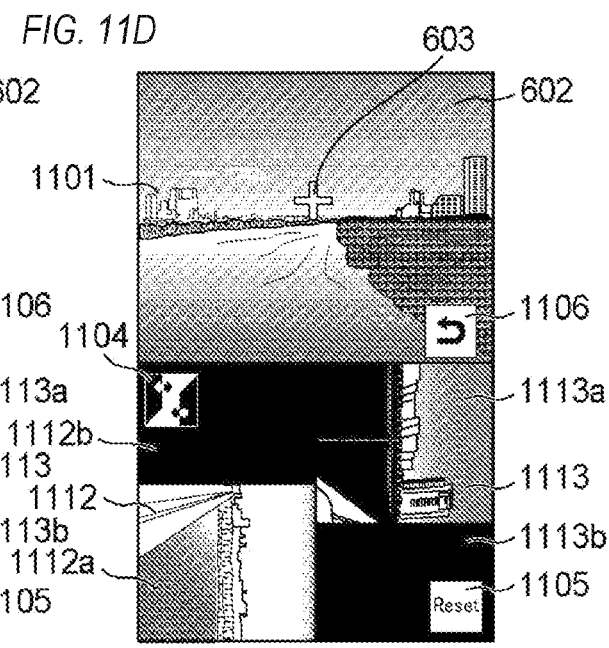

FIG. 11D shows a display example of a case where a leftward touch-move with respect to the right-side region 1113 is performed from the state shown in FIG. 11C and the right-side region 1113 is scrolled so as to move an image portion displayed in the image region 1113a leftward (move the display region rightward in an orientation of the image region 1113a). The portion displayed in the right-side region 1113 moves along the boundary of the clipping region from the state shown in FIG. 11C where a boundary portion on a lower side in the vertical direction (a ground direction) in a VR image has been displayed, and FIG. 11D shows a boundary portion in the horizontal direction (a horizon direction) being displayed in the right-side region 1113. A portion displayed in the left-side region 1112 is an image in the horizontal direction (a horizon direction) that is 180 degrees opposite to the direction displayed in the right-side region 1113 out of the boundary of the clipping region.

In S1021, the CPU 201 changes the display region of the VR image displayed in the image region 1102a and the image region 1103a in accordance with a horizontal touch-move. This means that a position of the boundary of the clipping region with respect to the VR image prior to clipping moves in accordance with the horizontal touch-move. Since the angle of the clipping region is maintained at 180 degrees, display regions of both the image region 1102a and the image region 1103a change regardless of from which position of the left-side region 1102 and the right-side region 1103 the horizontal touch-move is performed. For example, when the display region of the image region 1102a changes due to a movement of the boundary in a direction that narrows the clipping region, the display region of the image region 1103a also changes due to a movement of the boundary in a direction that widens the clipping region so as to maintain the angle of the clipping region at 180 degrees. Accordingly, the clipping region changes and a region displayed in the main region 1101 also changes. The user can strictly adjust the clipping region by horizontally performing a touch-move while confirming, in the vicinity of the boundary (the image region 1102a and the image region 1103a), how much of the VR image is to be included in the clipping region and how much of the VR image is to be included in the excluded region. In this processing, a width (180 degrees) of the clipping region does not change but a position of the clipping region in the VR image prior to clipping is changed.

In S1022, on the basis of information notified from the touch panel 206a, the CPU 201 determines whether or not a touch-up has been performed. When a touch-up has been performed, the CPU 201 advances to S1023, but otherwise the CPU 201 returns to S1010 and repeats the processing.

In S1023, on the basis of information notified from the touch panel 206a, the CPU 201 determines whether or not a touch operation with respect to a return button 1106 has been performed. When there is no touch operation designating the return button 1106, the CPU 201 returns to S1002 and repeats the processing, but when there is a touch operation with respect to the return button 1106, the CPU 201 ends the end fine adjustment processing.

When the end fine adjustment processing is ended, the clipping region adjusted in the end fine adjustment processing is handed over to processing performed after the end fine adjustment processing ends. Therefore, for example, when a fine adjustment of the clipping region is performed in the end fine adjustment processing and the end fine adjustment processing is ended to return to the clipping editing processing (the clipping editing screen) shown in FIG. 4, by subsequently touching the clipping button 604 without changing the display region, clipping can be performed in the clipping region adjusted in the end fine adjustment processing. Alternatively, the end fine adjustment screen may be configured so as to accept a clipping instruction, in which case the CPU 201 may directly advance to S426 or S427 when accepting a clipping instruction on the end fine adjustment screen. In addition, the end fine adjustment screen may be configured to accept a clipping saving instruction, in which case the CPU 201 may directly advance to S535 when accepting a clipping saving instruction on the end fine adjustment screen.

Figure 12:
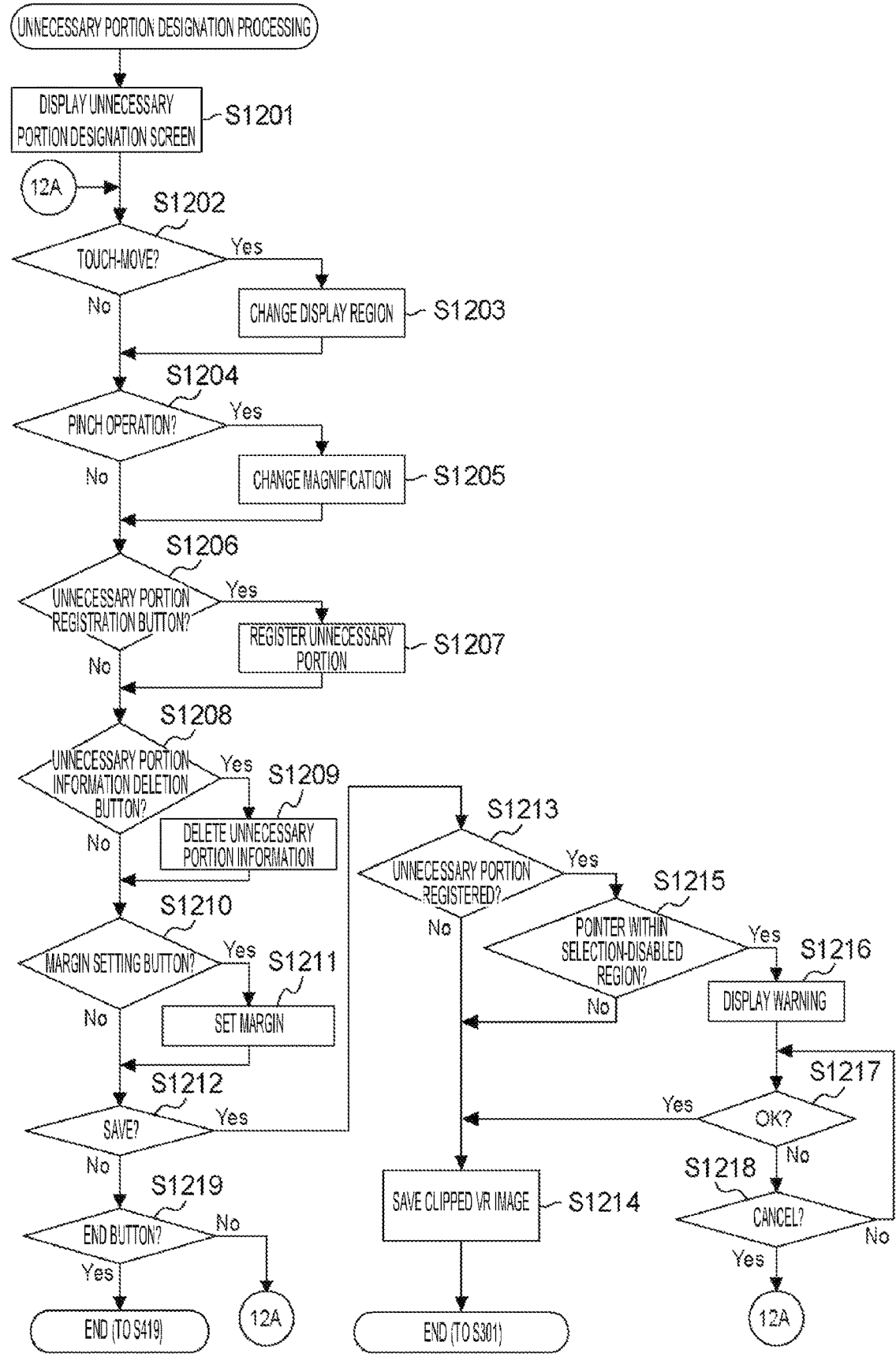
FIG. 12 is a flow chart of an unnecessary portion designation processing.

FIG. 12 shows a flow chart of the unnecessary portion designation processing described earlier with reference to S418 shown in FIG. 4. This processing is realized as the CPU 201 deploys a program recorded in the nonvolatile memory 203 on the memory 202 and executes the program.

Figure 13A:
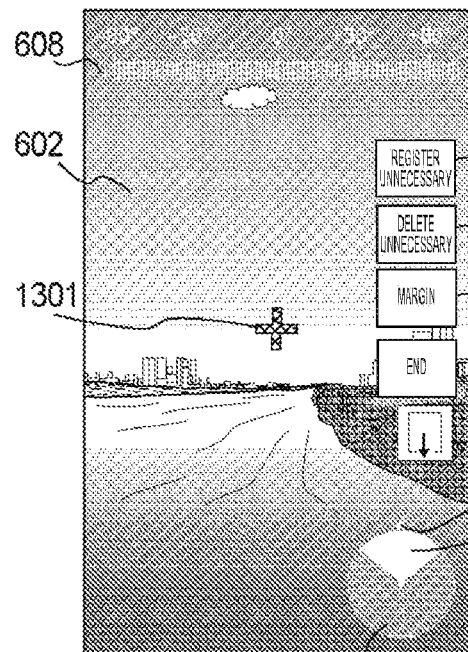
FIGS. 13A to 13D represents an example of an unnecessary portion designation screen.

In S1201, the CPU 201 displays an unnecessary portion designation screen on the display 205. FIG. 13A shows a display example of the unnecessary portion designation screen. Display items with the same reference numerals are similar to the display items described earlier (the display items on the clipping editing screen and the preview screen).

A pointer 1301 is an indicator which is displayed fixed to a center of the unnecessary portion designation screen and which is used in order to designate an unnecessary portion (a position of an unnecessary object, a position of an object that is desirably excluded) in the VR image 602. In order to avoid confusion with the pointer 603 and the pointer 621, the pointer 1301 is displayed in a display mode that differs from those of the pointer 603 and the pointer 621 (a different color, shape, pattern, or the like). However, when there is a touch operation with respect to the save button 624 displayed on the unnecessary portion designation screen to be described later, the pointer 1301 functions as a pointer for indicating a center of the clipping region. An unnecessary portion registration button 1302 is a touch button for designating and registering an unnecessary portion. When a touch operation designating the unnecessary portion registration button 1302 is performed, positional information of a position indicated by the pointer 1301 at that time point in the VR image 602 is registered (recorded in the memory 202) as an unnecessary portion. An unnecessary portion information deletion button 1303 is a touch button for deleting information on an unnecessary portion that has already been registered. When a touch operation designating the unnecessary portion information deletion button 1303 is performed, one piece of information of an unnecessary portion that has already been registered is deleted (cleared) and registration as an unnecessary portion is canceled. A margin setting button 1304 is a touch button for setting a margin of a selection-disabled region originating at an unnecessary portion. An end button 1305 is a touch button for accepting an instruction to end the unnecessary portion designation processing and return to the clipping editing processing.

Since S1202 and S1203 include processing for changing the display region in accordance with a touch-move and are similar to the processing in S305 and S306 shown in FIG. 3, details thereof will be omitted. Even if the display region of the VR image 602 is changed by a touch-move, the display region of the pointer 1301 does not change. In addition, when an unnecessary portion is registered, if a selection-disabled region is included in the display region after the change, the selection-disabled region in the displayed VR image is identifiably displayed (displayed in an enhanced manner). This will be described later with reference to FIG. 13B.

Since S1204 and S1205 include processing for changing the display magnification in accordance with a pinch operation and are similar to the processing in S309 and S310 shown in FIG. 3, details thereof will be omitted. In addition, when an unnecessary portion is registered, if a selection-disabled region is included in the display region after the change to the display magnification, the selection-disabled region in the displayed VR image is identifiably displayed.

In S1206, the CPU 201 determines whether or not a touch operation with respect to the unnecessary portion registration button 1302 has been performed. When a touch operation with respect to the unnecessary portion registration button 1302 has been performed, the CPU 201 advances to S1207, but otherwise the CPU 201 advances to S1208. In S1207, the CPU 201 adopts positional information (angle information of an elevation/depression angle and angle information of an azimuth) of the position indicated by the pointer 1301 in the VR image 602 as an unnecessary portion, and registers corresponding unnecessary portion information. As unnecessary portion information, positional information and a registration number (starting from 1 and incremented by +1 every time an unnecessary portion is registered) are recorded in the memory 202. When the position indicated by the pointer 1301 is already registered as an unnecessary portion, the CPU 201 skips the processing of S1207.

Figure 13B:
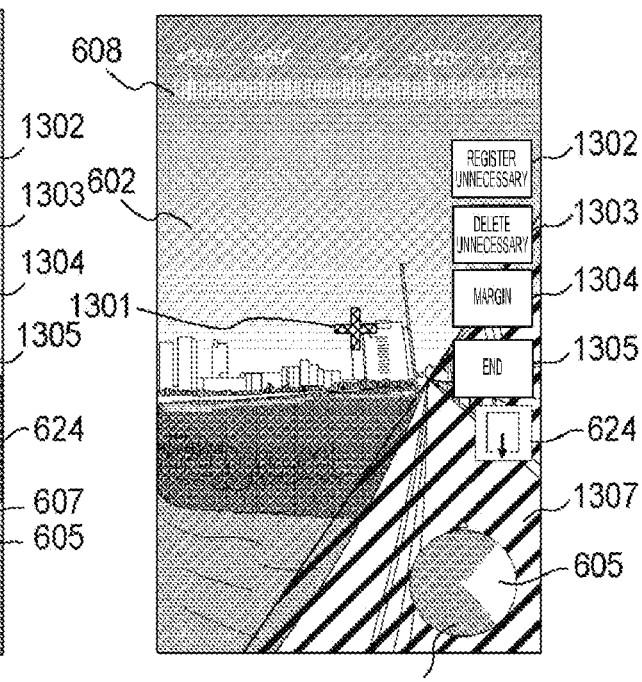

Once an unnecessary portion is newly registered, the CPU 201 sets a region of an angle combining a clipping angle and a margin angle centered on the positional information of the newly-registered unnecessary portion as a selection-disabled region. Since an unnecessary portion that has already been registered ends up being included in the clipping region when a reference position of the clipping region is set within the selection-disabled region, the selection-disabled region may be considered an inappropriate region that is not appropriate to be set as a reference position of the clipping region. Since an unnecessary portion that has already been registered is not included when the reference position of the clipping region is set in a region (a selection-enabled region) other than the selection-disabled region, the region other than the selection-disabled region may be considered an appropriate region that is appropriate for setting a reference position of the clipping region. In the present embodiment, the clipping angle is 180 degrees. While the margin angle can be arbitrarily changed by the user in S1210 and S1211 to be described later, an initial value thereof is 10 degrees. When the clipping angle is 180 degrees and the margin angle is 10 degrees, a region of 100 degrees in a periphery (90 degrees being half of a clipping region 180+10 degrees) centered on the newly registered unnecessary portion or, in other words, a region of a total angle of 200 degrees becomes the selection-disabled region. When there is another unnecessary portion that has already been registered and the selection-disabled region has already been set, a region created by merging a selection-disabled region that is set on the basis of the newly registered unnecessary portion with the set selection-disabled region is set as the selection-disabled region. When any position within the selection-disabled region is set as a center of the clipping region, there is a possibility that an object (a video) at the position designated as an unnecessary portion ends up being included in the clipping region. In other words, each position within the selection-disabled region is a position that is preferably not set as a center of the clipping region. In addition, the CPU 201 performs identifiable display with respect to the VR image 602 displayed on the display 205 so that the set selection-disabled region is identifiable. FIG. 13B shows a display example of identifiable display of a selection-disabled region. In the displayed VR image 602, a selection-disabled region 1307 is identifiably displayed by hatchings. It should be noted that a display mode of the identifiable display is not limited thereto and display by a semi-transparent mask, display by a color change to monochrome or sepia, or the like may be performed instead. In addition, while an example where a selection-disabled region is enhanced and displayed will be described in the present embodiment, since the selection-disabled region need only be identifiable from a region that is not selection-disabled, the region that is not selection-disabled may be enhanced and displayed instead. Alternatively, in the VR image 602, a video in the selection-disabled region may be hidden and a video in a region other than the selection-disabled region may be displayed.

In a case where an entire region of the VR image prior to clipping becomes a selection-disabled region due to an unnecessary portion newly registered in the unnecessary portion registration processing in S1207, instead of registering a new unnecessary portion, an error display is performed which indicates that additional registrations cannot be accepted. Similarly, when a width of a region (a selection-enabled region) other than the selection-disabled region in the VR image prior to clipping falls below a threshold, instead of registering a new unnecessary portion, an error display is performed which indicates that additional registrations cannot be accepted.

A flow up to setting a selection-disabled region will be described using conceptual diagrams in FIGS. 14A to 14G A region 1450 shown in FIG. 14A indicates a region (a display region) being displayed on the display 205 in the VR image, and a pointer direction 1451 indicates a direction of a center of the display region as viewed from a center of a virtual sphere and corresponds to a position indicated by the pointer 1301. An unnecessary portion candidate 1452 is a portion considered a portion unnecessary for clipping (a portion to be excluded) in the VR image by the user. When there is a portion unnecessary for clipping, the user aligns the pointer direction 1451 corresponding to the center of the display region of the display 205 with the portion unnecessary for clipping 1452 (an object considered unnecessary for clipping). Subsequently, the user touches the unnecessary portion registration button 1302.

FIG. 14B represents a conceptual diagram immediately after one unnecessary portion is touched and registered. A selection-disabled region 1453 indicated by screening represents a region corresponding to a clipping angle 1454 (180 degrees) from the pointer direction 1451 and indicates a selection-disabled region in a case where a margin is 0 degrees. As shown in FIG. 14C, when a position 1455 within the selection-disabled region is designated as a center of clipping, the clipping region becomes a region of an outlined part 1456 shown in FIG. 14D and includes the unnecessary portion 1452. It should be noted that, in FIG. 14D, a blacked-out portion represents an excluded region.

When a margin angle is set, the selection-disabled region is set to a wider region than 180 degrees (a hemisphere) centered on an unnecessary portion such as a selection-disabled region 1457 shown in FIG. 14E. In addition, when an unnecessary portion is registered in plurality as shown in FIG. 14F (an example in which two locations, namely, the unnecessary portion 1452 and an unnecessary portion 1458 are registered), a selection-disabled region is calculated with each unnecessary portion as center, and a region obtained by adding up all of the selection-disabled regions is the selection-disabled region.

In the selection-disabled region set (determined) as described above, a region displayed on the display 205 is identifiably displayed in a similar manner to the selection-disabled region 1307 shown in FIG. 13B. Identifiable display such as the selection-disabled region 1307 is not limited to the unnecessary portion designation screen and is also performed on the clipping editing screen of the clipping editing processing described with reference to FIG. 4. Alternatively, a configuration may be adopted in which the identifiable display of the selection-disabled region can be switched between on/off states (displayed state/hidden state) by a user operation. In addition, a boundary line between the selection-disabled region and a region that is not selection-disabled may be displayed. Furthermore, when the pointer 603 is in the selection-disabled region on the clipping editing screen, the user may be notified of the fact that the position of the pointer 603 is inappropriate as a center-designating location of the clipping region by changing a display mode of the pointer 603, displaying a warning icon or a warning message, or the like.

In S1208, on the basis of information notified from the touch panel 206a, the CPU 201 determines whether or not a touch operation with respect to the unnecessary portion information deletion button 1303 has been performed. When a touch operation designating the unnecessary portion information deletion button 1303 has been performed, the CPU 201 advances to S1209, but otherwise the CPU 201 advances to S1210. In S1209, the CPU 201 acquires unnecessary portion information from the memory 202. When no unnecessary portion information is registered, the CPU 201 suspends the processing and advances to S1210. When pieces of unnecessary portion information are registered, the CPU 201 moves the display region of the VR image 602 so that an angle of the piece of positional information with a largest registration number (an unnecessary portion most recently registered) is at a center of display, and deletes the piece of unnecessary portion information from the memory 202. In addition, a selection-disabled region on the basis of the deleted unnecessary portion is cleared (canceled) In other words, a selection-disabled region solely based on the deleted unnecessary portion is removed from the merged selection-disabled region and identifiable display with respect to the removed portion is hidden (displayed as a selection-enabled region). When unnecessary portion information is deleted in a case where only one piece of unnecessary portion information is registered, a hatched portion such as the selection-disabled region 1307 shown in FIG. 13B is eliminated.

Figure 13C:
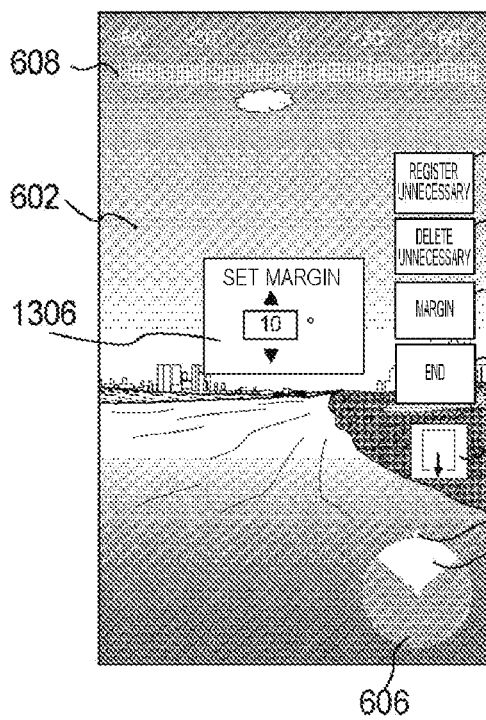

In S1210, on the basis of information notified from the touch panel 206a, the CPU 201 determines whether or not a touch operation with respect to the margin setting button 1304 has been performed. When a touch operation designating the margin setting button 1304 has been performed, the CPU 201 advances to S1211, but otherwise the CPU 201 advances to S1212. In S1211, the CPU 201 reads margin setting information from the memory 202, displays a margin setting dialog, and accepts a margin setting operation. FIG. 13C shows a display example of a margin setting dialog 1306. A background region other than the margin setting dialog 1306 may be displayed darkly. The CPU 201 changes a setting numerical value of a margin in accordance with a touch operation with respect to up and down arrow marks of the margin setting dialog 1306, a touch-move operation in the vertical direction, and a numerical value input operation performed by displaying a numeric keypad. The changed numerical value is stored in the memory 202. Once the setting numerical value of the margin is changed, a width of a selection-disabled region on the basis of the registered unnecessary portion information is changed accordingly by an amount corresponding to the change in the margin. The setting of the margin is a setting regarding how much a size of a selection-disabled region set on the basis of one unnecessary portion is to be expanded as compared to a size of the clipping region (in the present embodiment, 180 degrees). A range of the numerical value of margin setting information is set to 0 to (360−clipping angle), and when the range is exceeded, no change is made to the numerical value. When a portion other than the margin setting dialog 1306 is touched, the CPU 201 closes (hides) the margin setting dialog 1306.

In S1212, on the basis of information notified from the touch panel 206a, the CPU 201 determines whether or not a touch operation with respect to the save button 624 has been performed. When a touch operation designating the save button 624 has been performed, the CPU 201 advances to S1213, but otherwise the CPU 201 advances to S1219.

In S1213, the CPU 201 determines whether or not an unnecessary portion is registered in the memory 202. When at least one unnecessary portions is registered, the CPU 201 advances to S1215, but when no unnecessary portions are registered, the CPU 201 advances to S1214.

In S1214, the CPU 201 determines the clipping region on the basis of an azimuth and an elevation/depression angle at a center of the present display region or, in other words, a position adopted as a center of the clipping region (in the case of the unnecessary portion designation screen, a position indicated by the pointer 1301) and performs a clipping processing. More specifically, the CPU 201 clips a 180-degree region (a region of respectively 90 degrees in all directions from center) centered on the center of the display region from a 360-degree VR image. In addition, the CPU 201 records the clipped VR image as an image file that can be displayed in a VR view in the recording medium 208. The recording processing after clipping is processing similar to that of S535 described earlier. Once the processing of S1214 ends, the CPU 201 ends the unnecessary portion designation processing and returns to S301 shown in FIG. 3.

In S1215, the CPU 201 determines whether or not the center of the present display region or, in other words, the position adopted as a center of the clipping region (in the case of the unnecessary portion designation screen, the position indicated by the pointer 1301) is within a selection-disabled region. When the center of the present display region is within the selection-disabled region, the CPU 201 advances to S1216, but otherwise the CPU 201 advances to S1214.

Figure 13D:
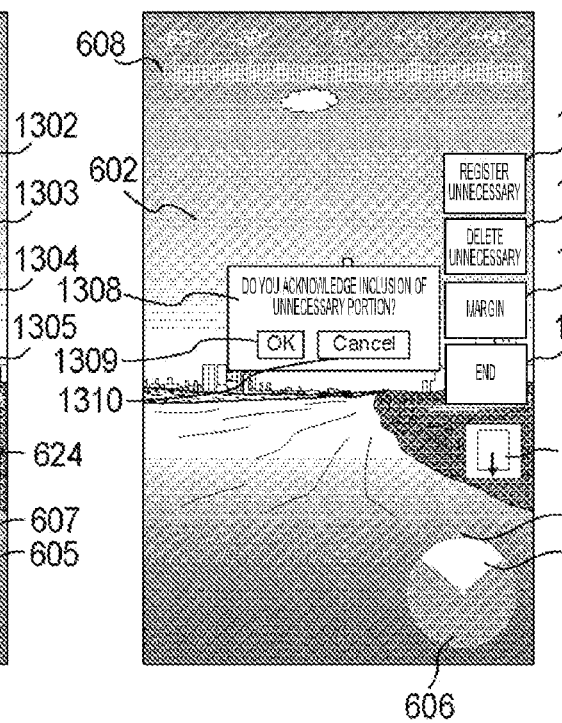

In S1216, the CPU 201 displays, on the display 205, a warning notifying that a registered unnecessary portion is to be included in the clipping region on the basis of the display region at a time point where the save button 624 had been touched. FIG. 13D shows a display example of the warning displayed in S1216. A dialog 1308 displays an OK button 1309 and a cancel button 1310 together with a message reading "Do you acknowledge inclusion of unnecessary portion?". By looking at the display, the user can recognize that a registered unnecessary portion is to be included in the clipping region on the basis of the display region at a time point where a touch operation with respect to the save button 624 had been performed.

In S1217, the CPU 201 determines whether or not a touch operation with respect to the OK button 1309 has been performed. When a touch operation with respect to the OK button 1309 has been performed, the CPU 201 advances to S1214. In other words, since the user has acknowledged that the unnecessary portion is to be included in the clipping region, clipping is performed in a clipping region including the unnecessary portion and a clipped VR image is saved. When a touch operation with respect to the OK button 1309 has not been performed, the CPU 201 advances to S1218.

In S1218, the CPU 201 determines whether or not a touch operation with respect to the cancel button 1310 has been performed. When a touch operation with respect to the cancel button 1310 has not been performed, the CPU 201 returns to S1217. When a touch operation with respect to the cancel button 1310 has been performed, the CPU 201 hides the dialog 1308 and returns to S1202 to repeat the processing without performing clipping and saving in the clipping region on the basis of the display region at a time point where the save button 624 had been touched.

According to processing of S1215 to S1218, the user can be prevented from inadvertently designating a center of the clipping region within a selection-disabled region. It should be noted that, when the pointer is within a selection-disabled region, a clipping and saving instruction may be ignored (disabled) without displaying a warning (in other words, without performing the processing of S1216 to S1218). Alternatively, only a warning may be displayed without accepting a selection of either OK or cancel and without performing clipping and saving.

It should be noted that a jump button may be displayed in addition to the various display items described with reference to FIG. 13A. In addition, when the pointer 1301 is within a selection-disabled region, the display region of the VR image 602 may be changed so that the pointer 1301 is positioned outside of the selection-disabled region in accordance with a touch operation with respect to the jump button (a touch operation that is not accompanied by a movement of a touch position).

In addition, a necessary portion registration button may be displayed in place of, or in addition to, the unnecessary portion registration button 1302 described with reference to FIG. 13A. In accordance with a touch operation with respect to the necessary portion registration button, a position of the VR image 602 indicated by the pointer 1301 at that time point is recorded (registered) in the memory 202 as positional information of the necessary location. Furthermore, the CPU 201 calculates a region other than a region of an angle obtained by subtracting a margin angle from a clipping angle centered on the positional information of the necessary portion as a selection-disabled region. In terms of a conceptual diagram, when a necessary portion 1459 is designated as shown in FIG. 14G, a region other than a region of the clipping angle (for example, 180 degrees)–the margin angle (for example, 10 degrees) is set as a selection-disabled region such as a selection-disabled region 1460. When there are a plurality of unnecessary portions and necessary portions, a region combining all selection-disabled regions respectively calculated on the basis of all designated positions (registered positions) is set as a selection-disabled region.

In S1219, the CPU 201 determines whether or not a touch operation with respect to the end button 1305 has been performed. When there is no touch operation designating the end button 1305, the CPU 201 returns to S1202 and repeats the processing, but when there is a touch operation with respect to the end button 1305, the CPU 201 ends the unnecessary portion designation processing and advances to S419 in FIG. 4.

A clipping processing in a case of elevation/depression angle-enabled described with reference to S502 and a clipping processing in a case of elevation/depression angle-disabled described with reference to S503 will be described with reference to FIGS. 15A to 15D and FIGS. 16A to 16C.

Figure 15A:
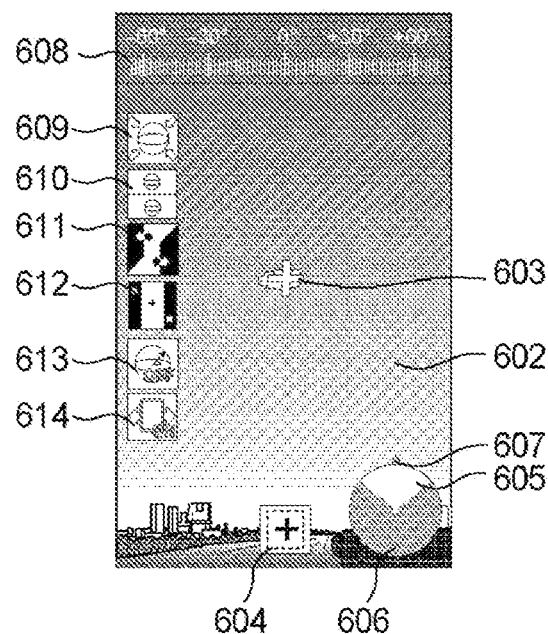
FIGS. 15A and 15C represent an example of a clipping editing screen.

FIG. 15A shows a display example of the clipping editing screen (in other words, a display example prior to clipping region designation) on the display 205. It is assumed that a reference direction (a display start direction) is an azimuth of 0 degrees (for example, north) and an elevation/depression angle of 0 degrees (a direction perpendicular to a zenith axis or a gravitational direction axis, the horizontal direction). FIG. 15A represents a display example of the VR image 602 when the azimuth is set to 0 degrees and the elevation/depression angle is set to an elevation of around 60 degrees on the clipping editing screen. In other words, the pointer 603 indicating a center of a display region is displayed in a direction that is more upward (on a sky side) than the horizontal direction. It should be noted that FIG. 15A represents a display example of a case where the enable/disable setting of the elevation/depression angle described earlier is disabled, and the elevation/depression angle enable/disable button 613 is in a display mode indicating that the setting of the elevation/depression angle is disabled.

Figure 15B:
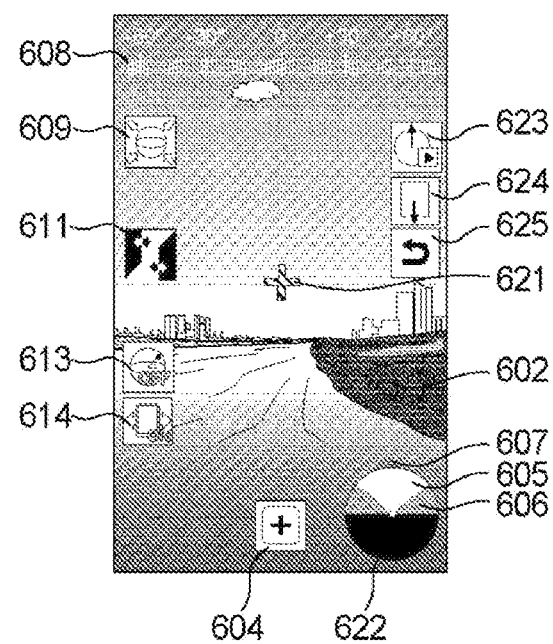
FIGS. 15B and 15D represent an example of a preview screen.
Figure 15C:
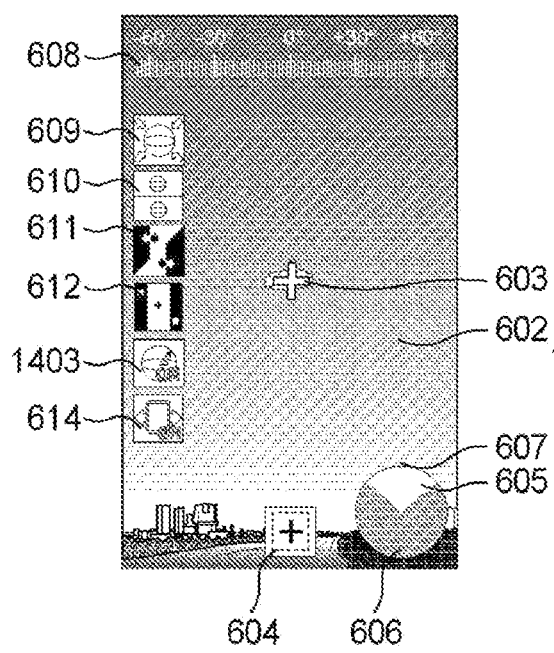
Figure 15D:
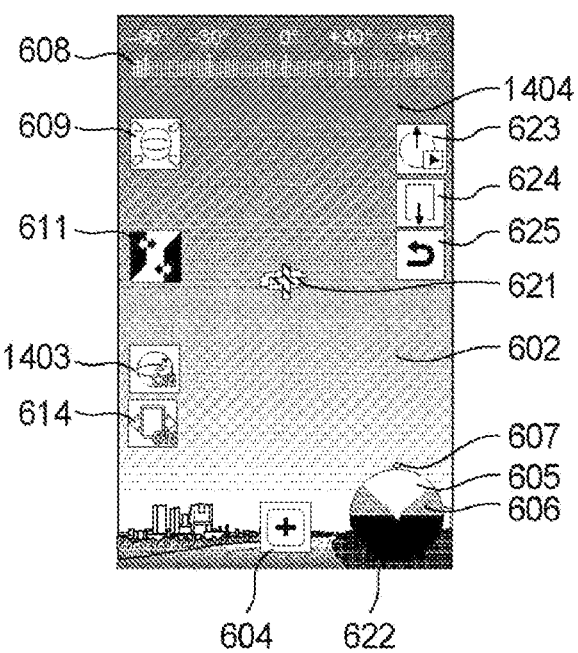
Figure 16A:
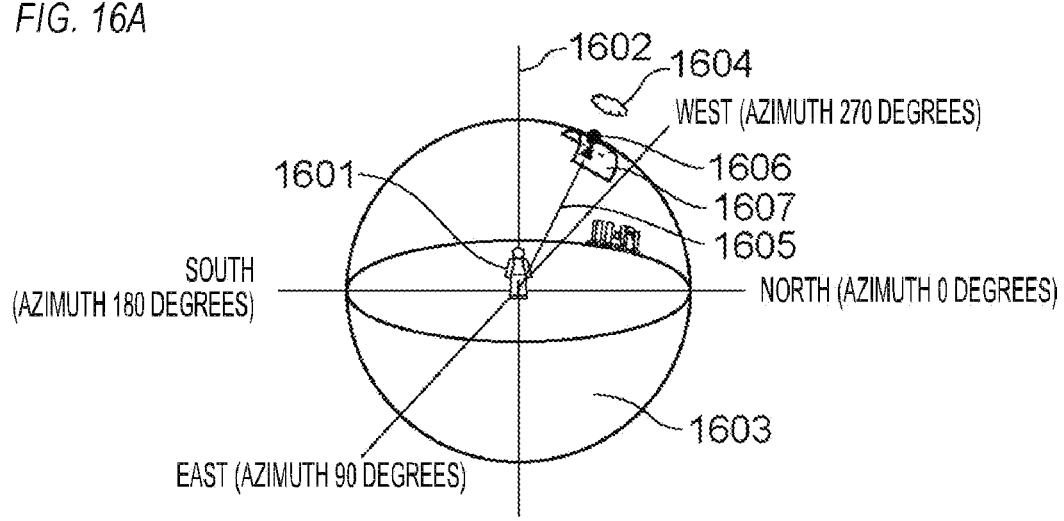
FIGS. 16A to 16C are schematic views showing an example of a difference in clipping between enabling and disabling an elevation/depression angle.
Figure 16B:
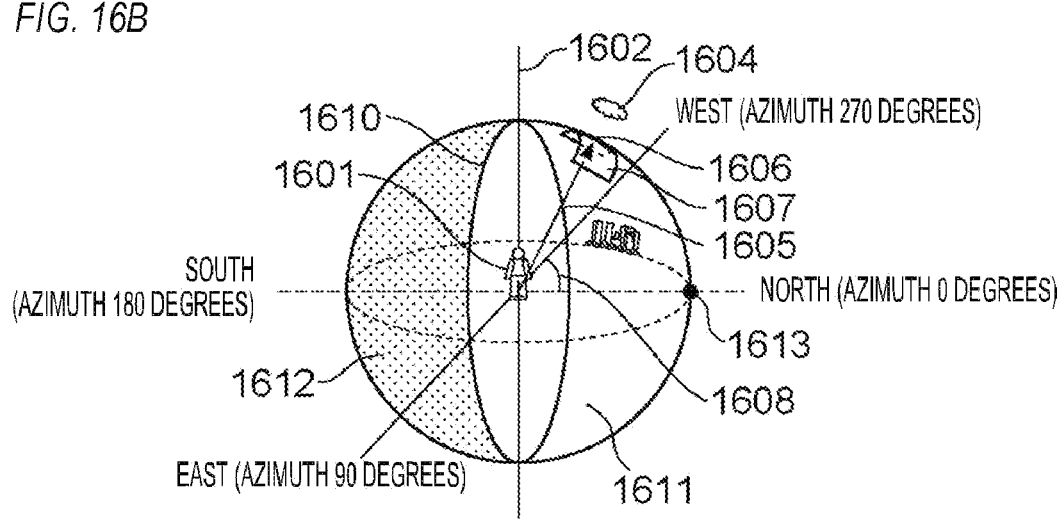
Figure 16C:
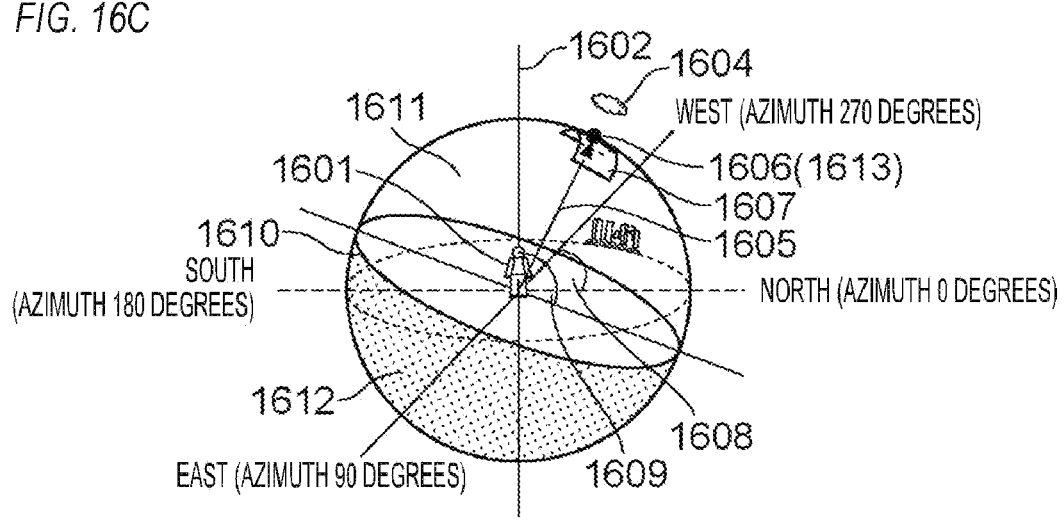

FIG. 16A is a diagram schematically representing the display region in FIG. 15A on a virtual sphere to which a 360-degree VR image is mapped. A position on the sphere can be identified by an azimuth of 360 degrees around a zenith axis 1602 and an elevation/depression angle of 360 degrees around a horizontal axis that is perpendicular to the zenith axis 1602 with a viewing position 1601 of a viewer as center. A 360-degree VR image prior to clipping is mapped onto the entire sphere, and the entire sphere becomes a valid view region 1603. FIG. 16A represents an example where a line-of-sight direction 1605 is pointed toward an object 1604 in the sky to the north (in other words, an azimuth of 0 degrees) as seen from the viewer. In other words, a display region 1607 is set at a position such that a center of the display region 1607 intersects the line-of-sight direction 1605. It should be noted that the display regions in FIGS. 16A to 16C are illustrated in a deformed manner and are narrower than the display regions in FIGS. 15A to 15D. However, centers of the display regions in FIGS. 16A to 16C are illustrated using a same reference as centers of the display regions illustrated in FIGS. 15A to 15D. Therefore, the center of the display region 1607 is a position indicated by the pointer 603 shown in FIG. 15A and becomes a clipping designation position 1606.

When an operation for designating a clipping region is performed using the clipping button 604 in a case where the elevation/depression angle is disabled and the display region is set to the region shown in FIGS. 15A and 16A, a clipping processing is performed by the processing of S503, resulting in the display region shown in FIG. 15B. FIG. 15B represents a display example of a preview screen immediately after a touch operation of the clipping button 604 is performed and a clipping region is set from the state shown in FIG. 15A. The elevation/depression angle of the display region is the horizontal direction (an elevation/depression angle of 0 degrees) which differs from the elevation/depression angle of 60 degrees prior to clipping, and the pointer 621 is also displayed at the position of the elevation/depression angle of 0 degrees. An azimuth of the display region shown in FIG. 15B is 0 degrees (north) which is the same as in FIG. 15A prior to clipping. Since the azimuth is the same as prior to clipping, supposing that an azimuth of 90 degrees (east) has been set as the display region prior to clipping, an immediately-subsequent display region of the preview screen and the center of the clipping region are also an azimuth of 90 degrees (east).

FIG. 16B is a diagram schematically representing a clipping region in the state shown in FIG. 15B on a virtual sphere to which a 360-degree VR image is mapped. An outlined hemisphere on a right side of the sphere represents a clipping region 1611 (a valid view region) which is a 180-degree VR image after the clipping. A hemisphere on an opposite side is an excluded region 1612 (an invalid view region) to be excluded from the VR image after the clipping and discarded. The clipping region 1611 is a hemispherical region centered on a center position 1613. The center position 1613 is a position with an azimuth of 0 degrees indicated by the clipping designation position 1606 and an elevation/depression angle of 0 degrees (horizontal) regardless of the clipping designation position 1606. While the center position 1613 of the clipping region 1611 and the clipping designation position 1606 on the basis of the line-of-sight direction 1605 or the display region 1607 immediately preceding the performance of an operation for designating the clipping region do not coincide with each other and have different elevation/depression angles as illustrated, this is because the elevation/depression angle is set to disabled. A clipping surface 1610 of the clipping region 1611 is parallel to the zenith axis 1602.

When an operation for designating a clipping region is performed using the clipping button 604 in a case where the elevation/depression angle is enabled and the display region is set to the region shown in FIGS. 15C and 16A, a clipping processing is performed by the processing of S502, resulting in the display region shown in FIG. 15D. It is assumed that the display region in FIG. 15C is the same as the display region in FIG. 15A. FIG. 15C only differs from FIG. 15A in the setting of elevation/depression angle enable/disable and, in FIG. 15C, the display mode of the elevation/depression angle enable/disable button 613 is a display mode indicating that the setting is elevation/depression angle-enabled. FIG. 15D represents a display example of a preview screen immediately after a touch operation of the clipping button 604 is performed and a clipping region is set from the state shown in FIG. 15C. The elevation/depression angle of the display region is the same 60 degrees as prior to the clipping, and the pointer 621 is also displayed at the position of the elevation/depression angle of 60 degrees. An azimuth of the display region shown in FIG. 15D is 0 degrees (north) which is the same as in FIG. 15C prior to the clipping.

FIG. 16C is a diagram schematically representing a display region and a clipping region in the state shown in FIG. 15D on a virtual sphere to which a 360-degree VR image is mapped. An outlined hemisphere on an upper right side of the sphere represents the clipping region 1611 (a valid view region) that becomes a 180-degree VR image after the clipping. A hemisphere on an opposite side is the excluded region 1612 (an invalid view region) to be excluded from the VR image after the clipping and discarded. The center position 1613 of the clipping region 1611 coincides with the clipping designation position 1606 in terms of both the azimuth and the elevation/depression angle. This is because the elevation/depression angle is set to enabled.

In clipping of a VR image according to the present embodiment, an initial setting of elevation/depression angle enable/disable is disabled and the clipping is performed in a clipping region such as that shown in FIG. 16B. With this clipping region, since the valid view region extends from directly above (an elevation of 90 degrees) to directly below (a depression angle of 90 degrees), a viewer viewing with an HMD can readily panoramically view the entire VR image after clipping by simply changing an orientation of the face (by rotating his or her head). Supposing that the valid view region exceeds directly above and extends to a rear side as shown in FIG. 16C, the viewer must orient his or her head toward the rear side exceeding directly above in order to view the rear side exceeding directly above or the like. In order to do so, the viewer must perform a body movement with a relatively large physical burden such as arching his or her torso, twisting his or her upper body, changing his or her standing direction and looking backward, or the like instead of simply rotating his or her head. In other words, panoramically viewing a VR image after clipping by a change in the display region in accordance with an orientation change is relatively physically demanding. In comparison, by clipping a region centered on the horizontal direction such as that shown in FIG. 16B regardless of an elevation/depression angle of the display region when designating the clipping region, a VR image which reduces such a physical burden and which is comfortably panoramically viewed can be generated. In addition, since the eyes of a human are positioned such that forward in the horizontal direction is viewable when facing the front, adopting an elevation/depression angle of a center of a field of view (in other words, a clipping region) as the horizontal direction reduces a sense of discomfort even in terms of the structure of the human body.

Furthermore, in clipping of a VR image according to the present embodiment, when the elevation/depression angle enable/disable setting is set to enabled, clipping is performed in a clipping region such as that shown in FIG. 16C. Depending on contents of an object, this clipping region is preferable in that an entire starry sky can be panoramically viewed while excluding an unnecessary ground portion or a wide region inside a room as viewed from the ceiling can be panoramically viewed in the VR image after clipping.

To the user, it is difficult to conceive and understand whether clipping is to be performed in the clipping region 1611 shown in FIG. 16B or the clipping region 1611 shown in FIG. 16C in accordance with a change in the elevation/depression angle enable/disable setting. Therefore, guidance display showing how different elevation/depression angle enable/disable settings result in different clipping regions is favorably provided using a schematic view in order to facilitate the user's understanding.

Figure 17A:
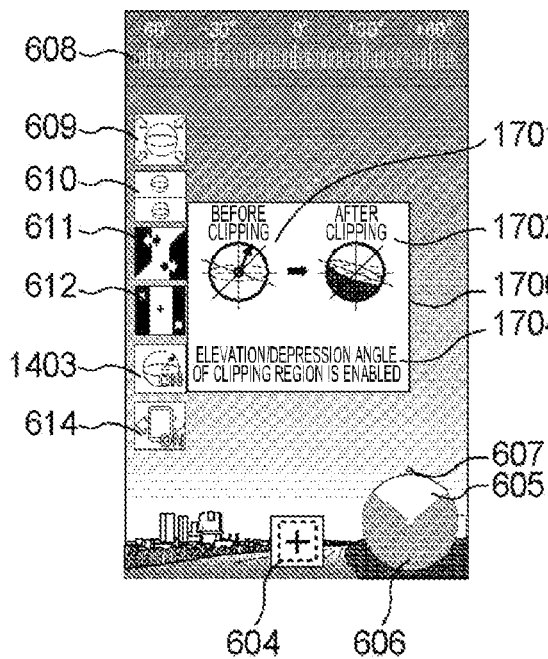
FIGS. 17A and 17B represent an example of guidance display of a clipping region.

FIG. 17A shows a display example of guidance display of a clipping region on the display 205. A guidance dialog 1700 shown in FIG. 17A is displayed for a prescribed time (for example, 5 seconds) when, for example, the elevation/depression angle enable/disable button 613 is touched and the elevation/depression angle setting is switched from disabled to enabled (S422 in FIG. 4, S521 in FIG. 5). A graphic 1701 indicating a schematic view prior to clipping, a graphic 1702 indicating a schematic view after the clipping, and a message 1704 are displayed on the dialog 1700. The graphic 1701 is a guide using a schematic view of a sphere and, prior to the clipping, represents a schematic view in a case where a position above an elevation/depression angle of 0 degrees is designated as a clipping designation position (a position indicated by an arrow) on the sphere. The graphic 1702 is a guide using a schematic view of a sphere indicating the clipping region when the elevation/depression angle setting is enabled and, after the clipping, indicates that a hemisphere on the basis of the elevation/depression angle of the clipping designation position is to be clipped. The message 1704 indicates that the elevation/depression angle setting of the clipping region has been set to enabled. It should be noted that a graphic 1703 shown in FIG. 17B which indicates a clipping region when the elevation/depression angle setting is set to enabled may be displayed instead of the graphic 1701.

Figure 17B:
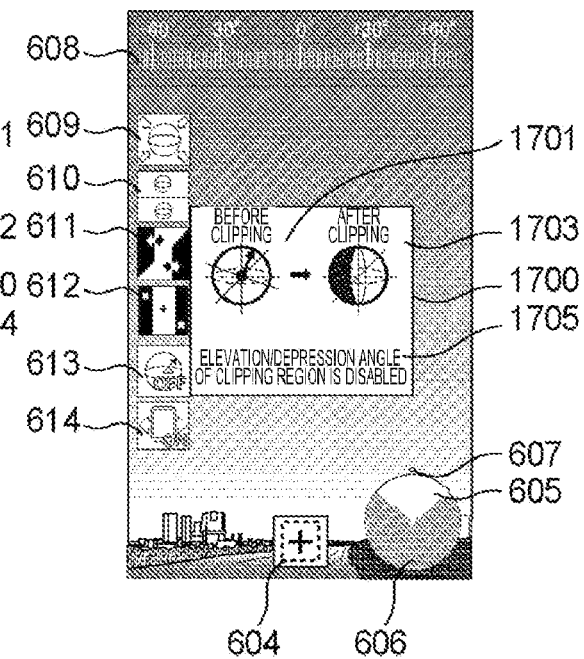

FIG. 17B shows a display example of guidance display of a clipping region on the display 205. The guidance dialog 1700 shown in FIG. 17B is displayed for a prescribed time (for example, 5 seconds) when, for example, the elevation/depression angle enable/disable button 613 is touched and the elevation/depression angle setting is switched from enabled to disabled (S421 in FIG. 4, S520 in FIG. 5). The graphic 1701 indicating a schematic view prior to clipping, the graphic 1703 indicating a schematic view after the clipping, and a message 1705 are displayed on the dialog 1700. The graphic 1701 is a guide using a schematic view of a sphere and, prior to the clipping, represents a schematic view in a case where a position above an elevation/depression angle of 0 degrees is designated as a clipping designation position (a position indicated by an arrow), and is the same as the graphic 1701 shown in FIG. 17A. The graphic 1703 is a guide using a schematic view of a sphere indicating the clipping region when the elevation/depression angle setting is disabled and indicates that, after the clipping, a hemisphere obtained by vertically dividing the sphere (a hemisphere of which a center is the horizontal direction) is to be clipped regardless of the elevation/depression angle of the clipping designation position. The message 1705 indicates that the elevation/depression angle setting of the clipping region has been set to disabled. It should be noted that the graphic 1702 shown in FIG. 17A which indicates a clipping region when the elevation/depression angle setting is set to disabled may be displayed instead of the graphic 1701.

A guide such as those shown in FIGS. 17A and 17B is not limited to cases where the elevation/depression angle setting is switched and may be displayed when displaying a description related to the elevation/depression angle setting in an electronic manual or the like. In addition, as information representing a setting state such as the elevation/depression angle enable/disable button 613, a guide such as those shown in FIGS. 17A and 17B may be displayed. Furthermore, instead of displaying the graphic 1701 indicating prior to clipping, a graphic indicating after the clipping (the graphic 1702 when elevation/depression angle-disabled and the graphic 1703 when elevation/depression angle-enabled).

While an example of generating, from a VR image picked up by an imaging apparatus, a VR image with a narrower region has been described in the embodiment presented above, the original VR image is not limited to a VR image picked up by an imaging apparatus. The present invention is also applicable when clipping and generating, from a VR content created by computer graphics (CG) or the like, a narrower VR content.

In addition, the processing of the various flow charts described above need not necessarily be performed in combination and each processing can be separately performed, and parts of the flow charts described above may be adopted in combination with other embodiments. For example, each of the whole hemisphere display, the dual-screen display processing, the end fine adjustment processing, and the like described above may be performed as processing for individually designating a clipping region without being combined with the clipping editing processing shown in FIG. 4 for designating a clipping region by a method of designating a center of the clipping region. In other words, for example, when the CPU 201 determines in S311 shown in FIG. 3 that a touch operation with respect to the clipping editing button has been performed, a direct transition can be made to the whole hemisphere display described with reference to FIGS. 7A and 7B to enable a clipping region to be designated. A configuration may be adopted in which the clipping region can be designated by making a direct transition to the dual-screen display processing described with reference to FIGS. 8, 9A and 9B or to the end fine adjustment processing described with reference to FIGS. 10 and 11A to 11D.

According to the present invention described above, from a VR content, a VR content with a narrower region on the basis of an operation for designating a clipping region by the user can be generated with good operability.

It should be noted that the various controls described above as controls to be performed by the CPU 201 may be carried out by one piece of hardware, or a plurality of pieces of hardware (for example, a plurality of processors or circuits) may control an entire apparatus by sharing processing.

In addition, while the present invention has been described in detail on the basis of a preferred embodiment thereof, it is to be understood that the present invention is not limited to the specific embodiment and various modes that do not constitute departures from the scope of the invention are also included in the present invention. Furthermore, the embodiment described above simply represents an example of the present invention and the embodiment can also be combined with other embodiments.

Moreover, while an example in which the present invention is applied to the electronic device 200 (a smartphone or the like) has been described in the embodiment presented above, the present invention is not limited to this example. The present invention can be applied to any electronic device capable of performing control so as to display an operation screen for clipping, from a VR content, a VR content with a narrower region. For example, the present invention can be applied to a personal computer, a PDA, a mobile phone terminal, a mobile image viewer, a printer apparatus, a digital photo frame, a music player, a game device, an electronic book reader, a video player, and the like. The present invention can also be applied to a digital camera, a television apparatus, a projection apparatus, a tablet terminal, an AI speaker, a domestic electrical appliance, a vehicle-mounted apparatus, medical equipment, and the like.

According to the embodiment described above, the following configurations are disclosed. Specifically, (A1)

An electronic device including:

a display controlling unit configured to perform control so that, on a first screen, a region of a part of a VR content having a first view region is displayed on a display as a display region and a position of the display region is changed in accordance with an orientation change of the electronic device or a display region change operation by a user;

an accepting unit configured to accept a clipping instruction from a user while the VR content is being displayed on the first screen; and a generating unit configured to generate an edited VR content including a second view region which is narrower than the first view region in the VR content and which is based on a position of the display region upon accepting the clipping instruction.

(A2)

The electronic device according to (A1), wherein the second view region is wider than a region included in the display region upon start of display of the first screen.

(A3)

The electronic device according to (A1) or (A2), wherein the display controlling unit performs control after accepting the clipping instruction so that, on a second screen, the region of the part of the VR content is displayed on the display as a display region, a position of the display region is changed in accordance with an orientation change of the display or a display region change operation by a user, and display indicating a non-view region is performed when the display region starts to include an outside of the second view region.

(A4)

The electronic device according to any one of (A1) to (A3), further including a recording unit configured to generate and record a file storing the edited VR content generated by the generating unit.

(A5)

The electronic device according to (A4), wherein the recording unit generates one still image file storing a plurality of images based on the second view region.

(A6)

The electronic device according to (A5), wherein a character string ".vr" is described before an extension in a file name of the still image file.

(A7)

The electronic device according to any one of (A4) to (A6), wherein the recording unit generates one moving image file in which a plurality of moving images based on the second view region are arranged.

(A8)

The electronic device according to (A7), wherein a character string ".vr" is described before an extension in a file name of the moving image file.

(A9)

The electronic device according to any one of (A1) to (A8), wherein the display controlling unit performs control so that, on the first screen, an item indicating a center position of the second view region is displayed at a predetermined position regardless of the display region.

(A10)

The electronic device according to (A9), wherein the display controlling unit performs control after accepting the clipping instruction so that, on the second screen, the region of the part of the VR content is displayed on the display as a display region, the item indicating a center position of the second view region is displayed, a position of the display region is changed in accordance with an orientation change of the display or a display region change operation by a user, and a position of the item is changed in accordance with a change in the position of the display region.

(A11)

The electronic device according to (A10), wherein the display controlling unit performs control so as to display the item in a first display mode on the first screen and display the item in a second display mode, which differs from the first display mode, on the second screen.

(A12)

The electronic device according to any one of (A1) to (A11), wherein the display controlling unit performs control so as to display, on the first screen, a guide indicating the first view region and, after accepting the clipping instruction, display, on the second screen, a guide indicating the second view region.

(A13)

The electronic device according to any one of (A1) to (A12), wherein the second view region is based on an azimuth of a direction displayed in the display region and is not based on an elevation/depression angle of the direction displayed in the display region.

(A14)

The electronic device according to any one of (A1) to (A12), wherein the second view region is based on an azimuth and an elevation/depression angle of a direction displayed in the display region.

(A15)

The electronic device according to any one of (A1) to (A12), further including a switching unit configured to switch, in accordance with a switching instruction from a user, the second view region between a view region based on an azimuth of a direction displayed in the display region and not based on an elevation/depression angle of the direction displayed in the display region and a view region based on the azimuth and the elevation/depression angle of the direction displayed in the display region.

(A16)

The electronic device according to (A15), wherein a second view region by default is based on an azimuth of a direction displayed in the display region and is not based on an elevation/depression angle of the direction displayed in the display region.

(A17)

The electronic device according to any one of (A1) to (A16), further including a setting unit configured to set a position of a display region, which is to be initially displayed, of the edited VR content in accordance with a direction designation instruction from a user.

(A18)

The electronic device according to any one of (A1) to (A17), wherein the display controlling unit performs control in accordance with a fine adjustment instruction from a user so as to display a boundary of the second view region on a third screen for finely adjusting the second view region.

(A19)

The electronic device according to any one of (A1) to (A18), wherein the display controlling unit performs control in accordance with a magnification change instruction from a user so as to display the VR content by changing to a display magnification that enables the entire second view region to be displayed.

(A20)

A control method of an electronic device, including:

performing control so that, on a first screen, a region of a part of a VR content having a first view region is displayed on a display as a display region and a position of the display region is changed in accordance with an orientation change of the electronic device or a display region change operation by a user;

accepting a clipping instruction from a user while the VR content is being displayed on the first screen; and generating an edited VR content including a second view region which is narrower than the first view region in the VR content and which is based on a position of the display region upon accepting the clipping instruction.

(A21)

A program that causes a computer to function as each unit of the electronic device according to any one of (A1) to (A19).

(A22)

A computer readable medium storing a program that causes a computer to function as each unit of the electronic device according to any one of (A1) to (A19).

Japanese Patent Application Laid-open No. 2016-19249 discloses a technique for clipping an omnidirectional image (a VR content) so as to remove a portion which includes a photographer or expanding the omnidirectional image (a VR content) with a side faced by the photographer (a direction of the eyes of the photographer) as a center. However, no consideration is given for clipping a VR content with a narrower region from the omnidirectional image (the VR content). In consideration of such problems, according to the embodiment described above, the following configurations are also disclosed in order to provide a technique that enables a VR content with a narrower region to be generated from a VR content with good operability. Specifically, (B1)

An electronic device including:

a display controlling unit configured to perform control so that, on a first screen, a region of a part of a VR content having a first view region is displayed on a display as a display region and a position of the display region is changed in accordance with an orientation change of the electronic device or a display region change operation by a user, and on a second screen, a first image with a second view region that is narrower than the first view region in the VR content and a second image with a region outside of the second view region in the first view region are displayed side by side;

a generating unit configured to generate an edited VR content including the second view region; and a changing unit configured to changes the second view region in accordance with a view region change operation by the user in a state where the first image and the second image are being displayed on the second screen.

(B2)

The electronic device according to (B1), wherein the first image is an image into which the second view region is entirely fitted, and the second image is an image into which the region outside of the second view region is entirely fitted.

(B3)

The electronic device according to (B1) or (B2), wherein the first image and the second image are distorted circular images.

(B4)

The electronic device according to any one of (B1) to (B3), wherein the second view region is wider than a region included in the display region upon start of display of the first screen.

(B5)

The electronic device according to any one of (B1) to (B4), wherein the display controlling unit performs control so that, on the second screen, in a case of displaying one of the first image and the second image by enlarging or reducing the one image, other of the first image and the second image is displayed without enlarging and reducing the other image.

(B6)

The electronic device according to any one of (B1) to (B5), wherein the display controlling unit performs control so that, on the second screen, the second image is displayed in such a manner that the second image be identifiable as an image of the region outside of the second view region.

(B7)

The electronic device according to any one of (B1) to (B6), further including a recording unit configured to generate and record a file storing the edited VR content generated by the generating unit.

(B8)

The electronic device according to (B7), wherein the recording unit generates one still image file storing a plurality of images on based on the second view region.

(B9)

The electronic device according to (B8), wherein a character string ".vr" is described before an extension in a file name of the still image file.

(B10)

The electronic device according to any one of (B7) to (B9), wherein the recording unit generates one moving image file in which a plurality of moving images on based on the second view region are arranged.

(B11)

The electronic device according to (B10), wherein a character string ".vr" is described before an extension in a file name of the moving image file.

(B12)

A control method of an electronic device, including:

performing control so that, on a first screen, a region of a part of a VR content having a first view region is displayed on a display as a display region and a position of the display region is changed in accordance with an orientation change of the electronic device or a display region change operation by a user, and on a second screen, a first image with a second view region that is narrower than the first view region in the VR content and a second image with a region outside of the second view region in the first view region are displayed side by side;

generating an edited VR content including the second view region; and changing the second view region in accordance with a view region change operation by the user in a state where the first image and the second image are being displayed on the second screen.

(B13)

A program that causes a computer to function as each unit of the electronic device according to any one of (B1) to (B11).

(B14)

A computer readable medium storing a program that causes a computer to function as each unit of the electronic device according to any one of (B1) to (B11).

In conventional art, when performing an operation for clipping a VR content with a narrower region from a VR content, it is difficult to confirm which region of the VR content prior to the clipping is included at an edge of a region of a video of the VR content after the clipping. In consideration of such problems, according to the embodiment described above, the following configurations are also disclosed in order to provide a technique that enables a region of a video of a VR content to be clipped to be more readily confirmed when generating a VR content with a narrower region from a VR content. Specifically, (C1)

An electronic device including:

a display controlling unit configured to perform control so that, on a first screen, a region of a part of a VR content having a first view region is displayed on a display as a display region and a position of the display region is changed in accordance with an orientation change of the electronic device or a display region change operation by a user;

a generating unit configured to generate an edited VR content including a second view region which is narrower than the first view region in the VR content; and a control unit configured to perform control so as to display, on a second screen, a region of a part which is narrower than the second view region that is generated by the generating unit and which includes an edge of the second view region in the VR content so that the edge can be identified, and change a position of the second view region in the VR content in accordance with a user operation in a state where the region of the part including the edge is being displayed.

(C2)

The electronic device according to (C1), wherein the control unit performs control, when the region of the part including the edge is being displayed on the second screen, so as not to change a position in the display that corresponds to the edge of the second view region even though the position of the second view region in the VR content is changed in accordance with a user operation.

(C3)

The electronic device according to (C1) or (C2), wherein the control unit performs control so that, on the second screen, regions of a plurality of parts including each of a plurality of different locations of the edge of the second view region are displayed such that respective edges can be identified.

(C4)

The electronic device according to (C3), wherein
the plurality of different locations are mutually discontinuous locations among the edge of the second view region.

(C5)

The electronic device according to (C4), wherein
the plurality of different locations include a plurality of locations of which directions, in which the VR content is viewed, differ from each other by 180 degrees among the edge of the second view region.

(C6)

The electronic device according to any one of (C1) to (C5), wherein
the control unit performs control in accordance with a user operation in a state where the region of the part including the edge is being displayed on the second screen so as to change a position but not to change a size of the second view region that is generated by the generating unit in the VR content.

(C7)

The electronic device according to any one of (C1) to (C6), wherein
the second view region is wider than the display region upon start of display of the first screen.

(C8)

The electronic device according to any one of (C1) to (C7), wherein
the control unit performs control so as to
change a position of the second view region in the VR content in accordance with a movement operation in a first direction from a user with respect to a display region of the region of the part including the edge on the second screen, and
change a position of the region of the part including the edge of the second view region that is displayed in the display region without changing a position of the second view region in the VR content in accordance with a movement operation in a second direction that is perpendicular to the first direction from a user with respect to the display region.

(C9)

The electronic device according to any one of (C1) to (C8), wherein
the control unit is capable of switching between vertically displaying and horizontally displaying a position corresponding to the edge of the second view region when displaying the region of the part including the edge on the second screen.

(C10)

The electronic device according to (C9), wherein
the control unit performs control so that
when a position corresponding to the edge of the second view region is being vertically displayed on the second screen, the region of the part to be displayed in the second view region is reset to a region of a part including an edge that corresponds to a horizontal direction in accordance with an instruction to reset a display position from a user, and
when a position corresponding to the edge of the second view region is being horizontally displayed on the second screen, the region of the part to be displayed in the second view region is reset to a region of a part including an edge that corresponds to a vertical direction in accordance with an instruction to reset a display position from a user.

(C11)

The electronic device according to (C9) or (C10), wherein
the control unit performs control so that
when a position corresponding to the edge of the second view region is vertically displayed on the second screen, among a first region and a second region into which a display region is vertically divided, the partial region including the edge of the second view region is displayed in the second region that is adjacent to the first region indicating an outside of the second view region,
when a position corresponding to the edge of the second view region is horizontally displayed on the second screen, among a third region and a fourth region into which the display region is horizontally divided, the partial region including the edge of the second view region is displayed in the fourth region that is adjacent to the third region indicating an outside of the second view region, and
without displaying a display item for accepting an operation from a user in a portion in which the first region and the third region do not overlap with each other, the display item is displayed in a portion in which the first region and the third region overlap with each other.

(C12)

The electronic device according to any one of (C1) to (C11), further including
a recording unit configured to generate and record a file storing the edited VR content generated by the generating unit.

(C13)

The electronic device according to (C12), wherein
the recording unit generates one still image file storing a plurality of images based on the second view region.

(C14)

The electronic device according to (C13), wherein
a character string ".vr" is described before an extension in a file name of the still image file.

(C15)

The electronic device according to any one of (C12) to (C14), wherein
the recording unit generates one moving image file in which a plurality of moving images based on the second view region are arranged.

(C16)

The electronic device according to (C15), wherein
a character string ".vr" is described before an extension in a file name of the moving image file.

(C17)

A control method of an electronic device, including:
a display controlling step of performing control so that, on a first screen, a region of a part of a VR content having a first view region is displayed on a display as a display region and a position of the display region is changed in accordance with an orientation change of the electronic device or a display region change operation by a user;
a generating step of generating an edited VR content including a second view region which is narrower than the first view region in the VR content; and
a control step of performing control so as to display, on a second screen, a region of a part which is narrower than the second view region that is generated in the generating step and which includes an edge of the second view region in the VR content so that the edge can be identified, and change a position of the second view region in the VR content in accordance with a user operation in a state where the region of the part including the edge is being displayed.

(C18)

A program that causes a computer to function as each unit of the electronic device according to any one of (C1) to (C16).

(C19)

A computer readable medium storing a program that causes a computer to function as each unit of the electronic device according to any one of (C1) to (C16).

According to the embodiment described above, the following configurations are also disclosed. Specifically, (D1)

An electronic device including:

a display controlling unit configured to perform control so that, on a first screen, a region of a part of a VR content having a first view region is displayed on a display as a display region and an azimuth and an elevation/depression angle that correspond to a position of the display region with respect to the VR content are changed in accordance with an orientation change of the electronic device or a display region change operation by a user; and a generating unit configured to generate an edited VR content including a second view region which is narrower than the first view region in the VR content and which is based on an azimuth that corresponds to the display region regardless of an elevation/depression angle that corresponds to the display region.

(D2)

The electronic device according to (D1), wherein the generating unit generates an edited VR content including the second view region which is based on an elevation/depression angle that corresponds to a horizontal direction regardless of an elevation/depression angle that corresponds to the display region and on an azimuth that corresponds to the display region.

(D3)

The electronic device according to (D1) or (D2), wherein the second view region based on an azimuth that corresponds to the display region is a region that straddles neither a zenith nor a nadir regardless of an elevation/depression angle that corresponds to the display region.

(D4)

The electronic device according to any one of (D1) to (D3), further including a setting unit configured to set whether to enable or disable an elevation/depression angle, wherein the generating unit generates an edited VR content including a second view region which is not related to an elevation/depression angle that corresponds to the display region when the elevation/depression angle is being disabled by the setting unit, and generates an edited VR content including a second view region based on an elevation/depression angle and an azimuth that correspond to the display region when the elevation/depression angle is being enabled by the setting unit.

(D5)

An electronic device including:

a display controlling unit configured to perform control so that, on a first screen, a region of a part of a VR content having a first view region is displayed on a display as a display region and an azimuth and an elevation/depression angle that correspond to a position of the display region with respect to the VR content are changed in accordance with an orientation change of the electronic device or a display region change operation by a user; and a generating unit configured to generate an edited VR content including a second view region which is narrower than the first view region in the VR content and which is based on an azimuth based on an operation for designating a region having been performed by a user and on an elevation/depression angle that corresponds to a horizontal direction.

(D6)

The electronic device according to (D5), wherein the second view region based on an azimuth based on an operation for designating a region and on an elevation/depression angle that corresponds to a horizontal direction is a region that straddles neither a zenith nor a nadir.

(D7)

The electronic device according to (D5) or (D6), further including a setting unit configured to set whether to enable or disable an elevation/depression angle, wherein the generating unit generates an edited VR content including a second view region which is not related to of an elevation/depression angle that corresponds to the operation for designating a region when the elevation/depression angle is being disabled by the setting unit, and generates an edited VR content including a second view region based on an elevation/depression angle and an azimuth that correspond to the operation for designating a region when the elevation/depression angle is being enabled by the setting unit.

(D8)

The electronic device according to (D4) or (D7), wherein a setting made by the setting unit is switched over by a switching instruction by a user, and an initial setting prior to accepting the switching instruction is a disabled setting.

(D9)

The electronic device according to any one of (D1) to (D8), wherein the display controlling unit controls the second view region in the VR content so as display a guidance that guides using a graphic representing a sphere.

(D10)

The electronic device according to any one of (D1) to (D9), further including a recording unit configured to generate and record a file storing the edited VR content generated by the generating unit.

(D11)

The electronic device according to (D10), wherein the recording unit generates one still image file storing a plurality of images based on the second view region.

(D12)

The electronic device according to (D11), wherein a character string ".vr" is described before an extension in a file name of the still image file.

(D13)

The electronic device according to any one of (D10) to (D12), wherein the recording unit generates one moving image file in which a plurality of moving images based on the second view region are arranged.

(D14)

The electronic device according to (D13), wherein a character string ".vr" is described before an extension in a file name of the moving image file.

(D15)

A control method of an electronic device, including:

a display controlling step of performing control so that, on a first screen, a region of a part of a VR content having a first view region is displayed on a display as a display region and an azimuth and an elevation/depression angle that correspond to a position of the display region with respect to the VR content are changed in accordance with an orientation change of the electronic device or a display region change operation by a user; and a generating step of generating an edited VR content including a second view region which is narrower than the first view region in the VR content and which is based on an azimuth that corresponds to the display region regardless of an elevation/depression angle that corresponds to the display region.

(D16)

A control method of an electronic device, including:

a display controlling step of performing control so that, on a first screen, a region of a part of a VR content having a first view region is displayed on a display as a display region and an azimuth and an elevation/depression angle that correspond to a position of the display region with respect to the VR content are changed in accordance with an orientation change of the electronic device or a display region change operation by a user; and a generating step of generating an edited VR content including a second view region which is narrower than the first view region in the VR content and which is based on an azimuth based on an operation for designating a region having been performed by a user and on an elevation/depression angle that corresponds to a horizontal direction.

(D17)

A program that causes a computer to function as each unit of the electronic device according to any one of (D1) to (D14).

(D18)

A computer readable medium storing a program that causes a computer to function as each unit of the electronic device according to any one of (D1) to (D14).

According to the embodiment described above, the following configurations are also disclosed. Specifically, (E1)

An electronic device including:

a display controlling unit configured to perform control so that, on a first screen, a region of a part of a VR content having a first view region is displayed on a display as a display region and a position of the display region is changed in accordance with an orientation change of the electronic device or a display region change operation by a user;

an accepting unit configured to accept a clipping instruction from a user;

a generating unit configured to generate an edited VR content including a second view region which is narrower than the first view region in the VR content; and a control unit configured to perform control so as to display a second screen that displays, within one screen, a region which is wider than the region of the part in the VR content and which includes the entire second view region so that an extent of the second view region can be identified.

(E2)

The electronic device according to (E1), wherein the control unit performs control so that, on the second screen, before accepting the clipping instruction, a region which includes the entire second view region in the VR content and which is wider than the second view region is displayed, and an identifiable display which enables an extent of the second view region to be identified is performed.

(E3)

The electronic device according to (E2), wherein the identifiable display is at least one of a display indicating a boundary of the second view region and a display that enables a region outside of the second view region to be identified.

(E4)

The electronic device according to (E2) or (E3), wherein the control unit performs control so that, on the second screen, an outside of the second view region in the VR content is hidden after accepting the clipping instruction.

(E5)

The electronic device according to any one of (E1) to (E4), wherein the control unit performs control in a state where the second screen is being displayed so as to change a position of the second view region in the VR content in accordance with a user operation.

(E6)

The electronic device according to any one of (E1) to (E5), wherein the second screen is a screen on which the VR content is displayed at a predetermined display magnification that is lower than a display magnification on the first screen.

(E7)

The electronic device according to (E6), wherein the control unit performs control in a state where a VR image is being displayed on the first screen at a first display magnification so as to lower the display magnification of the VR content in a stepwise manner involving a plurality of steps which are at least three steps in accordance with a first user operation, and performs control in a state where a VR image is being displayed on the first screen at a first display magnification so as to switch to the second screen in accordance with a second user operation that differs from the first user operation.

(E8)

The electronic device according to (E7), wherein the control unit performs control in a state where the second screen is being displayed so as to switch to the first screen and display the VR content at a display magnification prior to switching to the second screen in accordance with the second user operation.

(E9)

The electronic device according to (E7) or (E8), wherein the first display magnification is a display magnification upon start of display of the first screen.

(E10)

The electronic device according to any one of (E1) to (E9), further including a recording unit configured to generate and record a file storing the edited VR content generated by the generating unit.

(E11)

The electronic device according to (E10), wherein the recording unit generates one still image file storing a plurality of images based on the second view region.

(E12)

The electronic device according to (E11), wherein a character string ".vr" is described before an extension in a file name of the still image file.

(E13)

The electronic device according to any one of (E10) to (E12), wherein the recording unit generates one moving image file in which a plurality of moving images based on the second view region are arranged.

(E14)

The electronic device according to (E13), wherein a character string ".vr" is described before an extension in a file name of the moving image file.

(E15)

The electronic device according to any one of (E1) to (E14), wherein the control unit performs control so that, on the second screen, an item indicating a center position of the second view region is displayed at a predetermined position on the screen regardless of a position of the second view region in the VR content.

(E16)

A control method of an electronic device, including:

a display controlling step of performing control so that, on a first screen, a region of a part of a VR content having a first view region is displayed on a display as a display region and a position of the display region is changed in accordance with an orientation change of the electronic device or a display region change operation by a user;

an accepting step of accepting a clipping instruction from a user;

a generating step of generating an edited VR content including a second view region which is narrower than the first view region in the VR content; and a control step of performing control so as to display a second screen that displays, within one screen, a region which is wider than the region of the part in the VR content and which includes the entire second view region so that an extent of the second view region can be identified.

(E17)

An electronic device including:

a display controlling unit configured to perform control so that, on a first screen, a region of a part of a VR content having a first view region is displayed on a display as a display region and a position of the display region is changed in accordance with an orientation change of the electronic device or a display region change operation by a user;

a generating unit configured to generate an edited VR content including a second view region which is narrower than the first view region in the VR content; and a control unit configured to perform control so as to display a region of a part which includes an edge of the second view region that is generated by the generating unit in the VR content so that the edge can be identified and change a position of the second view region in the VR content in accordance with a user operation in a state where the region of the part including the edge is being displayed.

(E18)

A control method of an electronic device, including:

a display controlling step of performing control so that, on a first screen, a region of a part of a VR content having a first view region is displayed on a display as a display region and a position of the display region is changed in accordance with an orientation change of the electronic device or a display region change operation by a user;

a generating step of generating an edited VR content including a second view region which is narrower than the first view region in the VR content; and a control step of performing control so as to display a region of a part which includes an edge of the second view region that is generated in the generating step in the VR content so that the edge can be identified and change a position of the second view region in the VR content in accordance with a user operation in a state where the region of the part including the edge is being displayed.

(E19)

A program that causes a computer to function as each unit of the electronic device according to any one of (E1) to (E15) and (E17).

(E20)

A computer readable medium storing a program that causes a computer to function as each unit of the electronic device according to any one of (E1) to (E15) and (E17).

In conventional art, when clipping a VR content with a narrower region from a VR content, it is difficult to set a clipping region so as to exclude a video that is desirably excluded from the VR content after the clipping. In consideration of such problems, according to the embodiment described above, the following configurations are also disclosed in order to provide a technique that enables a VR content with a narrower region to be generated from a VR content with good operability. Specifically, (F1)

An electronic device including:

a display controlling unit configured to perform control so that, on a first screen, a region of a part of a VR content having a first view region is displayed on a display as a display region and a position of the display region is changed in accordance with an orientation change of the electronic device or a display region change operation by a user;

an accepting unit configured to accept a designation operation for designating a reference position in the VR content;

a generating unit configured to generate an edited VR content including a second view region which is narrower than the first view region in the VR content and which is based on the reference position having been designated by the designation operation;

a registering unit configured to register, in accordance with a user operation, an unnecessary section in the VR content, the unnecessary section being a section that is not to be included in the edited VR content; and a control unit configured to perform control so as to identifiably display, prior to accepting the designation operation, a first region, in the VR content, which may possibly cause, when designated as the reference position, the unnecessary section having been registered by the registering unit to be included in the edited VR content or a second region in the VR content which does not cause, when designated as the reference position, the unnecessary section having been registered by the registering unit to be included in the edited VR content.

(F2)

The electronic device according to (F1), wherein the control unit performs control so as to adopt, as the first region, a region with a predetermined size that is at least a size of the second view region using the unnecessary section, having been registered by the registering unit, as a reference.

(F3)

The electronic device according to (F2), further including a margin setting unit configured to set by how much the predetermined size is to be wider than the size of the second view region in accordance with a user operation.

(F4)

The electronic device according to (F2) or (F3), wherein the registering unit is capable of registering a plurality of unnecessary sections, and the control unit performs control so as to adopt, as the first region, a region which merges a plurality of regions with the predetermined size that use each of the plurality of unnecessary sections, having been registered by the registering unit, as a reference.

(F5)

The electronic device according to (F4), wherein
the registering unit does not newly register the unnecessary section when a size of the second region is smaller than a threshold.

(F6)

The electronic device according to (F4) or (F5), wherein
the display controlling unit performs control so as to perform an error display indicating that additional registration of the unnecessary section cannot be performed when the size of the second region is smaller than a threshold.

(F7)

The electronic device according to any one of (F1) to (F6), wherein
the display controlling unit performs control so as to display, on the first screen, an indicator for designating the reference position by superimposing the indicator on the VR content, and differentiate a display mode of the indicator in accordance with whether the indicator is in the first region or the indicator is in the second region.

(F8)

The electronic device according to (F7), wherein
the indicator is displayed at a specific position on the first screen regardless of which position of the VR content constitutes the display region, and
the display controlling unit performs control so that, when the indicator is positioned within the first region, the display region is changed so that the indicator is positioned outside of the first region in accordance with a touch operation that is not accompanied by a movement of a touch position.

(F9)

The electronic device according to any one of (F1) to (F8), wherein
the control unit performs control so as to display a warning to the effect that the unnecessary section is to be included in the edited VR content when a designation operation that designates the inside of the first region as a reference position is performed.

(F10)

The electronic device according to any one of (F1) to (F9), wherein
the generating unit does not generate the edited VR content when the reference position is within the first region.

(F11)

The electronic device according to any one of (F1) to (F10), further including
a recording unit configured to generate and record a file storing the edited VR content generated by the generating unit.

(F12)

The electronic device according to (F11), wherein
the recording unit generates one still image file storing a plurality of images based on the second view region.

(F13)

The electronic device according to (F12), wherein
a character string ".vr" is described before an extension in a file name of the still image file.

(F14)

The electronic device according to any one of (F11) to (F13), wherein
the recording unit generates one moving image file in which a plurality of moving images based on the second view region are arranged.

(F15)

The electronic device according to (F14), wherein
a character string ".vr" is described before an extension in a file name of the moving image file.

(F16)

A control method of an electronic device, including:
a display controlling step of performing control so that, on a first screen, a region of a part of a VR content having a first view region is displayed on a display as a display region and a position of the display region is changed in accordance with an orientation change of the electronic device or a display region change operation by a user;
an accepting step of accepting a designation operation for designating a reference position in the VR content;
a generating step of generating an edited VR content including a second view region which is narrower than the first view region in the VR content and which is based on the reference position having been designated by the designation operation;
a registering step of registering, in accordance with a user operation, an unnecessary section in the VR content, the unnecessary section being a section that is not to be included in the edited VR content; and
a control step of performing control so as to identifiably display, prior to accepting the designation operation, a first region, in the VR content, which may possibly cause, when designated as the reference position, the unnecessary section having been registered in the registering step to be included in the edited VR content or a second region in the VR content which does not cause, when designated as the reference position, the unnecessary section having been registered in the registering step to be included in the edited VR content.

(F17)

A program that causes a computer to function as each unit of the electronic device according to any one of (F1) to (F15).

(F18)

A computer readable medium storing a program that causes a computer to function as each unit of the electronic device according to any one of (F1) to (F15).

According to the present disclosure, (1) a VR content with a narrower region can be generated from a VR content with favorable operability; (2) when generating a VR content with a narrower region from a VR content, a region of a video of the VR content after clipping can be more easily confirmed; or (3) a VR content with a narrower region can be more suitably generated from a VR content.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention is not limited to the embodiment described above, and various changes and modifications can be made without departing from the spirit and the scope of the present invention. Therefore, in order to make the scope of the present invention public, the following claims are attached thereto.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An electronic device comprising at least one memory and at least one processor which function as:
   a display controlling unit configured to perform control so that, on a first screen, a region of a part of a VR content having a first view region is displayed on a display as a display region and an azimuth and an elevation/depression angle that correspond to a position of the display region with respect to the VR content are changed in accordance with an orientation change of the electronic device or a display region change operation by a user; and
   a generating unit configured to generate an edited VR content including a second view region which is narrower than the first view region in the VR content and which is based on an azimuth that corresponds to the display region regardless of an elevation/depression angle that corresponds to the display region.

2. The electronic device according to claim 1, wherein the generating unit generates an edited VR content including the second view region which is based on an elevation/depression angle that corresponds to a horizontal direction regardless of an elevation/depression angle that corresponds to the display region and on an azimuth that corresponds to the display region.

3. The electronic device according to claim 1, wherein the second view region based on an azimuth that corresponds to the display region is a region that straddles neither a zenith nor a nadir regardless of an elevation/depression angle that corresponds to the display region.

4. The electronic device according to claim 1, wherein the at least one memory and the at least one processor further function as a setting unit configured to set whether to enable or disable an elevation/depression angle, and
   the generating unit
   generates an edited VR content including a second view region which is not related to an elevation/depression angle that corresponds to the display region when the elevation/depression angle is being disabled by the setting unit, and
   generates an edited VR content including a second view region based on an elevation/depression angle and an azimuth that correspond to the display region when the elevation/depression angle is being enabled by the setting unit.

5. An electronic device comprising at least one memory and at least one processor which function as:
   a display controlling unit configured to perform control so that, on a first screen, a region of a part of a VR content having a first view region is displayed on a display as a display region and an azimuth and an elevation/depression angle that correspond to a position of the display region with respect to the VR content are changed in accordance with an orientation change of the electronic device or a display region change operation by a user; and
   a generating unit configured to generate an edited VR content including a second view region which is narrower than the first view region in the VR content and which is based on an azimuth based on an operation for designating a region having been performed by a user and on an elevation/depression angle that corresponds to a horizontal direction.

6. The electronic device according to claim 5, wherein the second view region based on an azimuth based on an operation for designating a region and on an elevation/depression angle that corresponds to a horizontal direction is a region that straddles neither a zenith nor a nadir.

7. The electronic device according to claim 5, wherein the at least one memory and the at least one processor further function as a setting unit configured to set whether to enable or disable an elevation/depression angle, and
   the generating unit
   generates an edited VR content including a second view region which is not related to an elevation/depression angle that corresponds to the operation for designating a region when the elevation/depression angle is being disabled by the setting unit, and
   generates an edited VR content including a second view region based on an elevation/depression angle and an azimuth that correspond to the operation for designating a region when the elevation/depression angle is being enabled by the setting unit.

8. The electronic device according to claim 4, wherein a setting made by the setting unit is switched over by a switching instruction by a user, and an initial setting prior to accepting the switching instruction is a disabled setting.

9. The electronic device according to claim 1, wherein the display controlling unit controls the second view region in the VR content so as display a guidance that guides using a graphic representing a sphere.

10. The electronic device according to claim 1, wherein the at least one memory and the at least one processor further function as a recording unit configured to generate and record a file storing the edited VR content generated by the generating unit.

11. The electronic device according to claim 10, wherein the recording unit generates one still image file storing a plurality of images based on the second view region.

12. The electronic device according to claim 11, wherein a character string ".vr" is described before an extension in a file name of the still image file.

13. The electronic device according to claim 10, wherein the recording unit generates one moving image file in which a plurality of moving images based on the second view region are arranged.

14. The electronic device according to claim 13, wherein a character string ".vr" is described before an extension in a file name of the moving image file.

15. A control method of an electronic device, comprising:

a display controlling step of performing control so that, on a first screen, a region of a part of a VR content having a first view region is displayed on a display as a display region and an azimuth and an elevation/depression angle that correspond to a position of the display region with respect to the VR content are changed in accordance with an orientation change of the electronic device or a display region change operation by a user; and a generating step of generating an edited VR content including a second view region which is narrower than the first view region in the VR content and which is based on an azimuth that corresponds to the display region regardless of an elevation/depression angle that corresponds to the display region.

16. A control method of an electronic device, comprising:

a display controlling step of performing control so that, on a first screen, a region of a part of a VR content having a first view region is displayed on a display as a display region and an azimuth and an elevation/depression angle that correspond to a position of the display region with respect to the VR content are changed in accordance with an orientation change of the electronic device or a display region change operation by a user; and a generating step of generating an edited VR content including a second view region which is narrower than the first view region in the VR content and which is based on an azimuth based on an operation for designating a region having been performed by a user and on an elevation/depression angle that corresponds to a horizontal direction.

\* \* \* \* \*